US011429953B2

(12) United States Patent
Isaacson et al.

(10) Patent No.: US 11,429,953 B2
(45) Date of Patent: *Aug. 30, 2022

(54) SYSTEM AND METHOD FOR PROCESSING A GIFT INVOLVING SEPARATE TRANSACTIONS

(71) Applicant: GiftYa LLC, Pittsburgh, PA (US)

(72) Inventors: Thomas M. Isaacson, Huntingtown, MD (US); Ryan C. Durham, Dunkirk, MD (US); Jason Wolfe, Sewickley, PA (US); Patrick Ledbetter, Arlington, VA (US); Adam Ludwig, San Francisco, CA (US)

(73) Assignee: GiftYa LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,753

(22) Filed: Nov. 8, 2019

(65) Prior Publication Data
US 2020/0074445 A1 Mar. 5, 2020

Related U.S. Application Data

(63) Continuation of application No. 15/882,597, filed on Jan. 29, 2018, now Pat. No. 10,489,776, which is a
(Continued)

(51) Int. Cl.
*G06Q 30/00* (2012.01)
*G06Q 20/34* (2012.01)
(Continued)

(52) U.S. Cl.
CPC ........... *G06Q 20/342* (2013.01); *G06Q 20/10* (2013.01); *G06Q 20/105* (2013.01); *G06Q 20/12* (2013.01);
(Continued)

(58) Field of Classification Search
CPC ................................................ G06Q 20/342
(Continued)

(56) References Cited

U.S. PATENT DOCUMENTS 5,580,196 A 12/1996 Thompson
5,590,196 A 12/1996 Moreau
(Continued)

FOREIGN PATENT DOCUMENTS

GB 2376787 12/2002
JP 2002/222377 8/2002
(Continued)

OTHER PUBLICATIONS

ProQuestDialogNPL Search History.*
(Continued)

*Primary Examiner* — John H. Holly

(57) ABSTRACT

Disclosed herein are systems, methods, and non-transitory computer-readable storage media for processing a gift involving separate transactions. A system configured to practice the method first associates a policy with a giver having a giver account and a recipient having a recipient account, wherein the giver account is independent of the recipient account, and wherein the policy requires at least two transactions prior to applying a gift amount. Then the system monitors transactions using the recipient account to identify at least two separate qualifying transactions according to the policy. Upon identifying the at least two separate qualifying transactions, the system applies the gift amount to the recipient account according to the policy.

20 Claims, 36 Drawing Sheets

Related U.S. Application Data continuation-in-part of application No. 15/882,597, filed on Jan. 29, 2018, now Pat. No. 10,489,776, which is a continuation-in-part of application No. 14/335,358, filed on Jul. 18, 2014, now Pat. No. 9,881,299, which is a continuation of application No. 14/219,276, filed on Mar. 19, 2014, now abandoned, which is a continuation-in-part of application No. 14/193,068, filed on Feb. 28, 2014, now Pat. No. 8,751,392, and a continuation-in-part of application No. 13/771,791, filed on Feb. 20, 2013, now abandoned, and a continuation-in-part of application No. 13/754,401, filed on Jan. 30, 2013, now abandoned, and a continuation-in-part of application No. 13/686,189, filed on Nov. 27, 2012, now abandoned, which is a continuation of application No. 13/470,969, filed on May 14, 2012, now abandoned, and a continuation-in-part of application No. 13/301,327, filed on Nov. 21, 2011, now abandoned, and a continuation-in-part of application No. 13/175,234, filed on Jul. 1, 2011, now abandoned, which is a continuation of application No. 12/967,253, filed on Dec. 14, 2010, now Pat. No. 8,285,643, and a continuation of application No. 12/967,253, filed on Dec. 14, 2010, now Pat. No. 8,285,643, and a continuation-in-part of application No. 12/967,253, filed on Dec. 14, 2010, now Pat. No. 8,285,643, and a continuation-in-part of application No. 12/475,122, filed on May 29, 2009, now abandoned, and a continuation of application No. 12/075,655, filed on Mar. 13, 2008, now Pat. No. 8,676,704.

(60) Provisional application No. 61/057,106, filed on May 29, 2008.

(51) Int. Cl.
*G06Q 40/02* (2012.01)
*G06Q 20/10* (2012.01)
*G06Q 20/24* (2012.01)
*G06Q 20/12* (2012.01)
*G06Q 20/38* (2012.01)
*H01L 21/683* (2006.01)
*H01L 21/687* (2006.01)

(52) U.S. Cl.
CPC ............. *G06Q 20/24* (2013.01); *G06Q 20/34* (2013.01); *G06Q 20/387* (2013.01); *G06Q 40/02* (2013.01); *H01L 21/6833* (2013.01); *H01L 21/68757* (2013.01); *H01J 2237/20* (2013.01)

(58) Field of Classification Search
USPC ...... 705/41, 1.1, 44, 14.32, 39, 26.1, 67, 40; 235/380, 381; 455/466
See application file for complete search history.

(56) References Cited

U.S. PATENT DOCUMENTS

| | | |
|---|---|---|
| 5,696,366 A | 12/1997 | Ziarno |
| 5,794,219 A | 8/1998 | Brown |
| 5,848,396 A | 12/1998 | Gerace |
| 5,861,841 A | 1/1999 | Gildea et al. |
| H1794 H | 4/1999 | Claus |
| 5,963,647 A | 10/1999 | Downing et al. |
| 5,984,180 A | 11/1999 | Albrecht |
| 6,000,608 A | 12/1999 | Dorf |
| 6,014,634 A | 1/2000 | Scroggie et al. |
| 6,014,635 A | 1/2000 | Harris et al. |
| 6,044,360 A | 3/2000 | Picciallo |
| 6,068,183 A | 5/2000 | Freeman et al. |
| 6,173,269 B1 | 1/2001 | Soloki |
| 6,175,823 B1 | 1/2001 | Van Dusen |
| 6,182,895 B1 | 2/2001 | Albrecht |
| 6,189,787 B1 | 2/2001 | Dorf |
| 6,292,786 B1 | 9/2001 | Deaton et al. |
| 6,321,211 B1 | 11/2001 | Dodd |
| 6,330,543 B1 | 12/2001 | Kepecs |
| 6,370,514 B1 | 4/2002 | Messner |
| 6,408,307 B1 | 6/2002 | Semple et al. |
| 6,454,165 B1 | 9/2002 | Dawson |
| 6,484,148 B1 | 11/2002 | Boyd |
| 6,487,538 B1 | 11/2002 | Gupta et al. |
| 6,505,046 B1 | 1/2003 | Baker |
| 6,526,335 B1 | 2/2003 | Treyz et al. |
| 6,546,257 B1 | 4/2003 | Stewart |
| 6,571,279 B1 | 5/2003 | Herz et al. |
| 6,587,835 B1 | 7/2003 | Treyz et al. |
| 6,594,644 B1 | 7/2003 | Van Dusen |
| 6,601,037 B1 | 7/2003 | Kolls |
| 6,606,602 B1 | 8/2003 | Kolls |
| 6,609,106 B1 | 8/2003 | Robertson |
| 6,672,507 B1 | 1/2004 | Walker et al. |
| 6,711,474 B1 | 3/2004 | Treyz et al. |
| 6,775,539 B2 | 8/2004 | Deshpande |
| 6,795,710 B1 | 9/2004 | Creemer |
| 6,805,289 B2 | 10/2004 | Noriega et al. |
| 6,865,546 B1 | 3/2005 | Song |
| 6,889,054 B2 | 5/2005 | Himmel et al. |
| 6,947,976 B1 | 9/2005 | Devitt et al. |
| 6,970,871 B1 | 11/2005 | Rayburn |
| 7,010,512 B1 | 3/2006 | Gillin et al. |
| 7,021,531 B2 | 4/2006 | Myttenaere |
| 7,039,601 B2 | 5/2006 | Gary |
| 7,089,208 B1 | 8/2006 | Levchin et al. |
| 7,127,236 B2 | 10/2006 | Khan et al. |
| 7,165,049 B2 | 1/2007 | Slater |
| 7,200,566 B1 | 4/2007 | Moore et al. |
| 7,204,412 B2 | 4/2007 | Foss, Jr. |
| 7,213,027 B1 | 5/2007 | Kominek et al. |
| 7,280,984 B2 | 10/2007 | Phelan, III et al. |
| 7,357,331 B2 | 4/2008 | Blossom |
| 7,512,552 B2 | 3/2009 | Karas et al. |
| 7,559,465 B2 | 7/2009 | Rosenblatt |
| 7,593,862 B2 | 9/2009 | Mankoff |
| 7,603,292 B1 | 10/2009 | Bragg et al. |
| 7,698,221 B2 | 4/2010 | Blinn et al. |
| 7,792,751 B2 | 9/2010 | Tan |
| 7,831,439 B1 | 11/2010 | Bryar |
| 7,860,789 B2 | 12/2010 | Hirka et al. |
| 7,861,919 B2 | 1/2011 | Spaeth et al. |
| 7,870,022 B2 | 1/2011 | Bous et al. |
| 7,873,573 B2 | 1/2011 | Realini |
| 8,046,266 B1 | 10/2011 | Geller et al. |
| 8,112,315 B2 | 2/2012 | Dooley et al. |
| 8,452,707 B2 | 5/2013 | Sharma |
| 8,473,380 B2 | 6/2013 | Thomas |
| 8,478,638 B2 | 7/2013 | Postrel |
| 8,577,735 B2 | 11/2013 | Wilen et al. |
| 8,589,267 B2 | 11/2013 | Hurst |
| 8,639,629 B1 | 1/2014 | Hoffman |
| 9,760,936 B1 | 9/2017 | Shaw |
| 2001/0039519 A1 | 11/2001 | Richards |
| 2001/0054066 A1 | 12/2001 | Spitzer |
| 2002/0035605 A1 | 3/2002 | McDowell et al. |
| 2002/0040438 A1 | 4/2002 | Fisher, Jr. |
| 2002/0042775 A1 | 4/2002 | Nelson |
| 2002/0046341 A1 | 4/2002 | Kazaks et al. |
| 2002/0062246 A1 | 5/2002 | Matsubara |
| 2002/0174016 A1 | 11/2002 | Cuervo |
| 2003/0028515 A1 | 2/2003 | Nishikado et al. |
| 2003/0028518 A1 | 2/2003 | Mankoff |
| 2003/0040959 A1 | 2/2003 | Fei et al. |
| 2003/0083941 A1 | 5/2003 | Moran et al. |
| 2003/0130907 A1 | 7/2003 | Karas et al. |
| 2003/0171997 A1 | 9/2003 | Eaton |
| 2003/0182191 A1 | 9/2003 | Oliver et al. |

(56) References Cited

U.S. PATENT DOCUMENTS

| | | |
|---|---|---|
| 2003/0216960 A1 | 11/2003 | Postrel |
| 2004/0002897 A1 | 1/2004 | Vishik |
| 2004/0073482 A1 | 4/2004 | Wiggins et al. |
| 2004/0078283 A1 | 4/2004 | Gary |
| 2004/0089714 A1 | 5/2004 | Raadsen |
| 2004/0111361 A1 | 6/2004 | Griffiths et al. |
| 2004/0148228 A1 | 7/2004 | Kwei |
| 2004/0162775 A1 | 8/2004 | Winklevoss et al. |
| 2004/0203852 A1 | 10/2004 | Janskiraman |
| 2004/0225605 A1 | 11/2004 | Rowe |
| 2004/0249712 A1 | 12/2004 | Brown et al. |
| 2004/0254891 A1 | 12/2004 | Blinn |
| 2005/0075932 A1 | 4/2005 | Mankoff |
| 2005/0092828 A1 | 5/2005 | Phillips |
| 2005/0097005 A1 | 5/2005 | Fargo |
| 2005/0108121 A1 | 5/2005 | Gravett et al. |
| 2005/0108159 A1 | 5/2005 | Gravett |
| 2005/0131761 A1 | 6/2005 | Trika et al. |
| 2005/0177493 A1 | 8/2005 | Sung |
| 2005/0197919 A1 | 9/2005 | Robertson |
| 2005/0199712 A1 | 9/2005 | Rosenblatt |
| 2005/0209958 A1 | 9/2005 | Michelsen et al. |
| 2005/0234771 A1 | 10/2005 | Register et al. |
| 2006/0015405 A1 | 1/2006 | Bala et al. |
| 2006/0059070 A1 | 3/2006 | Petruck |
| 2006/0074767 A1 | 4/2006 | Fortney et al. |
| 2006/0095338 A1 | 5/2006 | Seidel |
| 2006/0122856 A1 | 6/2006 | Rushton et al. |
| 2006/0178932 A1 | 8/2006 | Lang |
| 2006/0208065 A1 | 9/2006 | Mendelovich et al. |
| 2006/0229950 A1 | 10/2006 | Pabbisetty |
| 2006/0253320 A1 | 11/2006 | Heywood |
| 2006/0258397 A1 | 11/2006 | Kaplan et al. |
| 2006/0293963 A1 | 12/2006 | Hoblit |
| 2007/0012759 A1 | 1/2007 | Allarea et al. |
| 2007/0017976 A1 | 1/2007 | Peyret et al. |
| 2007/0022007 A1 | 1/2007 | Lawe |
| 2007/0050711 A1 | 3/2007 | Walker et al. |
| 2007/0063020 A1 | 3/2007 | Barrafato |
| 2007/0073589 A1 | 3/2007 | Vergeyle et al. |
| 2007/0088610 A1 | 4/2007 | Chen |
| 2007/0088801 A1 | 4/2007 | Levkovitz et al. |
| 2007/0103993 A1 | 5/2007 | Mount et al. |
| 2007/0140176 A1 | 6/2007 | Bachenberg |
| 2007/0143177 A1 | 6/2007 | Graves et al. |
| 2007/0150413 A1 | 6/2007 | Morgenstern |
| 2007/0158413 A1 | 7/2007 | Hastie |
| 2007/0168265 A1 | 7/2007 | Rosenberger |
| 2007/0174120 A1 | 7/2007 | Asmar et al. |
| 2007/0175984 A1 | 8/2007 | Khandaker et al. |
| 2007/0179888 A1 | 8/2007 | Angelovich |
| 2007/0192182 A1 | 8/2007 | Monaco et al. |
| 2007/0210152 A1 | 9/2007 | Read |
| 2007/0255620 A1 | 11/2007 | Tumminaro et al. |
| 2007/0255653 A1 | 11/2007 | Tumminaro et al. |
| 2007/0264991 A1 | 11/2007 | Jones et al. |
| 2007/0270165 A1 | 11/2007 | Poosala |
| 2007/0288313 A1 | 12/2007 | Brodson et al. |
| 2008/0004888 A1 | 1/2008 | Davis et al. |
| 2008/0004984 A1 | 1/2008 | Sendo et al. |
| 2008/0010114 A1 | 1/2008 | Head |
| 2008/0010120 A1 | 1/2008 | Chung |
| 2008/0027820 A1 | 1/2008 | Brill |
| 2008/0033817 A1 | 2/2008 | Billmaier et al. |
| 2008/0033857 A1 | 2/2008 | Moses |
| 2008/0040240 A1 | 2/2008 | Covington |
| 2008/0048023 A1 | 2/2008 | Russell et al. |
| 2008/0082424 A1 | 4/2008 | Walton |
| 2008/0091528 A1 | 4/2008 | Rampell et al. |
| 2008/0091535 A1 | 4/2008 | Heiser et al. |
| 2008/0097851 A1 | 4/2008 | Bemmel et al. |
| 2008/0099551 A1 | 5/2008 | Harper |
| 2008/0133257 A1 | 6/2008 | Adkisson et al. |
| 2008/0189189 A1* | 8/2008 | Morgenstern ...... G06Q 30/0643 705/27.2 |
| 2008/0223922 A1 | 9/2008 | Weitzman |
| 2008/0235122 A1 | 9/2008 | Weitzman |
| 2008/0243628 A1 | 10/2008 | Wiseman |
| 2008/0243630 A1 | 10/2008 | Farney |
| 2008/0255948 A1 | 10/2008 | Garner |
| 2008/0288406 A1 | 11/2008 | Sequin et al. |
| 2008/0301005 A1 | 12/2008 | Nieda et al. |
| 2008/0301044 A1 | 12/2008 | Vardi |
| 2009/0006212 A1 | 1/2009 | Krajicek |
| 2009/0018916 A1 | 1/2009 | Seven et al. |
| 2009/0018959 A1 | 1/2009 | Doran et al. |
| 2009/0032581 A1 | 2/2009 | Esslinger et al. |
| 2009/0048926 A1 | 2/2009 | Salesky et al. |
| 2009/0063295 A1 | 3/2009 | Smith |
| 2009/0094134 A1 | 4/2009 | Toomer et al. |
| 2009/0112709 A1 | 4/2009 | Barhydt |
| 2009/0125410 A1 | 5/2009 | Perlman |
| 2009/0132387 A1 | 5/2009 | Majdoub |
| 2009/0132415 A1* | 5/2009 | Davis ...................... G06Q 40/12 705/43 |
| 2009/0138397 A1 | 5/2009 | Sharma |
| 2009/0159698 A1 | 6/2009 | Mullen et al. |
| 2009/0164589 A1 | 6/2009 | Shroff |
| 2009/0171683 A1 | 7/2009 | Hoyos et al. |
| 2009/0192928 A1 | 7/2009 | Abifaker |
| 2009/0234771 A1* | 9/2009 | Ledbetter ............ G06Q 20/105 705/41 |
| 2009/0271265 A1 | 10/2009 | Lay et al. |
| 2009/0287579 A1 | 11/2009 | Walker et al. |
| 2009/0307130 A1 | 12/2009 | Tan |
| 2009/0307143 A1 | 12/2009 | Reistad et al. |
| 2009/0313109 A1 | 12/2009 | Bous et al. |
| 2009/0327067 A1 | 12/2009 | Berger et al. |
| 2009/0327129 A1 | 12/2009 | Collas et al. |
| 2010/0010918 A1 | 1/2010 | Hunt |
| 2010/0017278 A1 | 1/2010 | Wilen et al. |
| 2010/0023341 A1 | 1/2010 | Ledbetter et al. |
| 2010/0023418 A1 | 1/2010 | Bader et al. |
| 2010/0036524 A1 | 2/2010 | Chirco |
| 2010/0057580 A1 | 3/2010 | Raghunathan |
| 2010/0076833 A1 | 3/2010 | Nelsen |
| 2010/0106592 A1 | 4/2010 | Brown |
| 2010/0299194 A1 | 11/2010 | Snyder |
| 2010/0299208 A1 | 11/2010 | Carlson et al. |
| 2010/0299227 A1* | 11/2010 | Smith .................... G06Q 30/02 705/26.8 |
| 2010/0299228 A1 | 11/2010 | Smith |
| 2010/0325006 A1* | 12/2010 | White .................. G06Q 20/349 705/26.1 |
| 2011/0004512 A1 | 1/2011 | Postrel |
| 2011/0011931 A1 | 1/2011 | Farley et al. |
| 2011/0016023 A1 | 1/2011 | Zakas |
| 2011/0029370 A1 | 2/2011 | Roeding |
| 2011/0106698 A1 | 5/2011 | Isaacson et al. |
| 2011/0282784 A1 | 11/2011 | Nelsen |
| 2011/0295749 A1 | 12/2011 | Scalisi |
| 2011/0311164 A1 | 12/2011 | Badharudeen |
| 2012/0029990 A1 | 2/2012 | Fisher |
| 2012/0066041 A1 | 3/2012 | Mankoff |
| 2012/0066212 A1 | 3/2012 | Jennings |
| 2012/0150728 A1 | 6/2012 | Isaacson |
| 2012/0197716 A1 | 8/2012 | Rampell et al. |
| 2012/0197754 A1 | 8/2012 | Kalin |
| 2012/0226614 A1 | 9/2012 | Guru |
| 2012/0265625 A1 | 10/2012 | Pletz |
| 2012/0316975 A1 | 12/2012 | Schorr |
| 2013/0073369 A1 | 3/2013 | Begum |
| 2013/0096997 A1 | 4/2013 | Benedikt |
| 2013/0132294 A1 | 5/2013 | Schvey |
| 2013/0166445 A1 | 6/2013 | Isaacson |
| 2013/0179268 A1 | 7/2013 | Hu |
| 2013/0211890 A1 | 8/2013 | Heitmueller |
| 2013/0254068 A1 | 9/2013 | Scipioni et al. |
| 2014/0019283 A1 | 1/2014 | Daley |
| 2014/0058873 A1 | 2/2014 | Sorensen |
| 2015/0039493 A1 | 2/2015 | Crum |

(56) References Cited

U.S. PATENT DOCUMENTS

2015/0154587 A1 6/2015 Chetty
2018/0005303 A1 1/2018 Shaw

FOREIGN PATENT DOCUMENTS

| JP | 2002/334287 | 11/2002 |
|---|---|---|
| JP | 2004/265294 | 9/2004 |
| KR | 2002/0070232 | 9/2002 |
| KR | 2002/0094340 | 12/2002 |
| KR | 2004/0076556 | 9/2004 |
| KR | 2006/0061515 | 6/2006 |
| KR | 2006/0083825 | 7/2006 |
| KR | 2007/0030467 | 3/2007 |
| KR | 2010/0045666 | 5/2010 |
| WO | WO 02/073489 | 9/2002 |
| WO | WO 03/014982 | 2/2003 |
| WO | WO 2006/065037 | 6/2006 |
| WO | WO 2013/033266 | 3/2013 |

OTHER PUBLICATIONS

"Digital Island Corrects and Replaces Previous News Release, BW2059, CA-Digital-Island", Business Wire, Jan. 22, 2001.
"AOL Digital City Kicks Off Major Expansion to Widen Lead in Fast-Growing Local Online Market", Business Wire, Mar. 21, 2000.
"WindWire Launches WindCaster; Wireless Ad Network Delivers Marketing and Advertising Over the New Wireless Web Medium", Business Wire, Jun. 27, 2000.
Launch of WindWire Undisputed Success; Leader in Wireless Advertising Solutions Serves Over One Million Ads With Click-Through Rates of More Than 15 Percent in First Week of Launch:, Business Wire, Oct. 17, 2000.
"Alcatel Introduces Advanced Version of Its Intelligent Location-Based Server", Canadian Corporate News, Mar. 20, 2001.
"Smart AdServer Targets Quova for Geolocation Needs; Adserving Innovator Switches to Quova for Reliability and Depth of Data", CCNMatthews Newswire, Feb. 5, 2008.
Susan Glairon, "New Marketing Scheme Brings Online Ads to Boulder, Colo., Wireless Customers", Knight Rider/Tribune Business News, Aug. 6, 2000.
Sarah Littman, "On the Verge: The Users are Catching Up with the Technology in the U.S. Mobile Marketing Arena. Are You Ready to Capitalize on a New Marketing Medium that is Almost Ready for its Close-Up? (Mobile Technology)", Response, Feb. 1, 2008.
"Personalized Information to Mobile Users—Add2Phone and Setec to Co-Operate in Mobile E-Commerce", M2 Presswire, Apr. 20, 2000.
Sarah McCammon, "Ladies, It's Your Night for a Bargain (Neighbor)", Daily Herald (Arlington Heights, IL), Feb. 5, 2004.
"The Next Wave in Advertising", New Straits Times, Jul. 2, 2000.
Sanjay Parekh, "Personalization: Turn Browsers Into Buyers: Gathering Customer Intelligence is an art and a Science (Customer Relationship Management)", e-Business Advisor, Sep. 1, 2002.
"[x + 1] Personalizes Web Optimization with New, Patented Technology", PR Newswire, Sep. 18, 2007.
"Power of Real Time (Brief Article)", Crain's New York Business, Oct. 30, 2000.
Michelle Speir, "BlackBerry pushes a Sweet Solution", Nov. 6, 2000, Federal Computer Week, pp. 40-42.
"Consumers Can Show Their Support for Small Business This Holiday Season on "Small Business Saturday(SM)"". Retrieved from http://about.americanexpress.com/news/pr/2010/sbs.aspx Nov. 28, 2011.
"Developments in cyberbanking" By: Adams, Lee S.; Martz, David J.; Poindexter, Obrea O.—The Business Lawyer 56.3, May 2001.
ProQuestNPL Search History, 54 pages, dated Aug. 10, 2021.
ProQuestNPL Search History, 1 page, dated Jul. 24, 2021.
ProQuestDialogNPL Search History, 52 pages, dated Jul. 16, 2021.
ProQuestNPL Search History, 21 pages, dated May 22, 2021.
ProQuestNPL Search History, 111 pages, dated May 21, 2021.
Horne, Daniel R., "Gift cards: Disclosure one step removed." Journal of Consumer Affairs, 41.2 (2007): 341-350. (Year: 2007).
ProQuestNPL Search History, 4 pages, dated Mar. 24, 2021.
ProQuestNPL Search History, 4 pages, dated Apr. 19, 2021.
ProQuestNPL Search History, 6 pages, dated May 8, 2021.
ProQuestDialogNPL Search History, 4 pages, dated Apr. 26, 2021.
ProQuestNPL Search History, 4 pages, dated May 8, 2021.
STIC Scientific & Technical Information Center, EIC Search Report, 10 pages, dated Dec. 16, 2021.
STIC Scientific & Technical Information Center, EIC Search Report, 9 pages, dated Nov. 1, 2021.
STIC Scientific & Technical Information Center, EIC 3600 Search Report, 27 pages, dated Nov. 1, 2021.
STIC Scientific & Technical Information Center, EIC 3600 Search Report, 4 pages, dated Nov. 23, 2021.
STIC Scientific & Technical Information Center, Search Strategy from Dialog, 2 pages, dated Dec. 18, 2021.
STIC Scientific & Technical Information Center, Search Strategy from Dialog, 4 pages, dated Apr. 26, 2021.
ProQuestNPL Search History, STIC Scientific & Technical Information Center, EIC 3600 Search Report, dated Oct. 25, 2021, 4 pages.
ProQuestDialogNPL Search History, dated Mar. 12, 2021, 7 pages.
ProQuestNPL Search History, dated Mar. 24, 2021, 4 pages.
ProQuestNPL Search History, STIC Scientific & Technical Information Center, EIC 3600 Search Report, dated Aug. 20, 2021, 17 pages.
ProQuestDialogNPL Search History, dated Aug. 10, 2021, 54 pages.
ProQuestNPL Search History, STIC Scientific & Technical Information Center, EIC 3600 Search Report, dated Jul. 22, 2021, 4 pages.

* cited by examiner

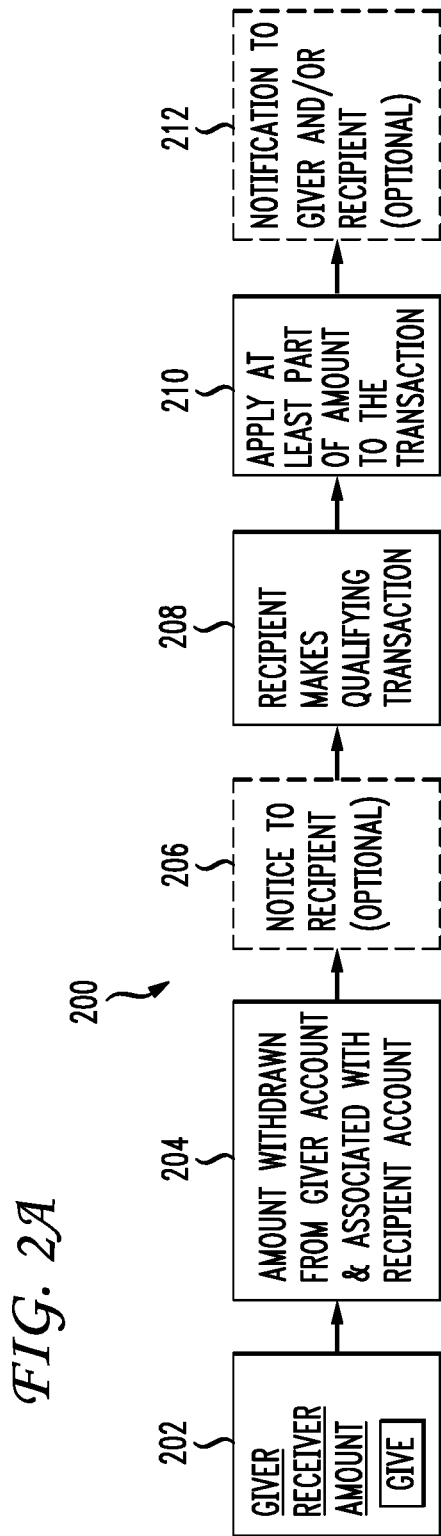

FIG. 4C

| 472 | 474 | 476 | 478 | 480 | 482 | 484 | 486 | 488 |
|---|---|---|---|---|---|---|---|---|
| SECURITY | HEADER | GIVER | RECIPIENT | AMOUNT | PAYMENT MODE | TIME | LOCATION | OTHER OPTIONS |

Figures 5A, 5B:
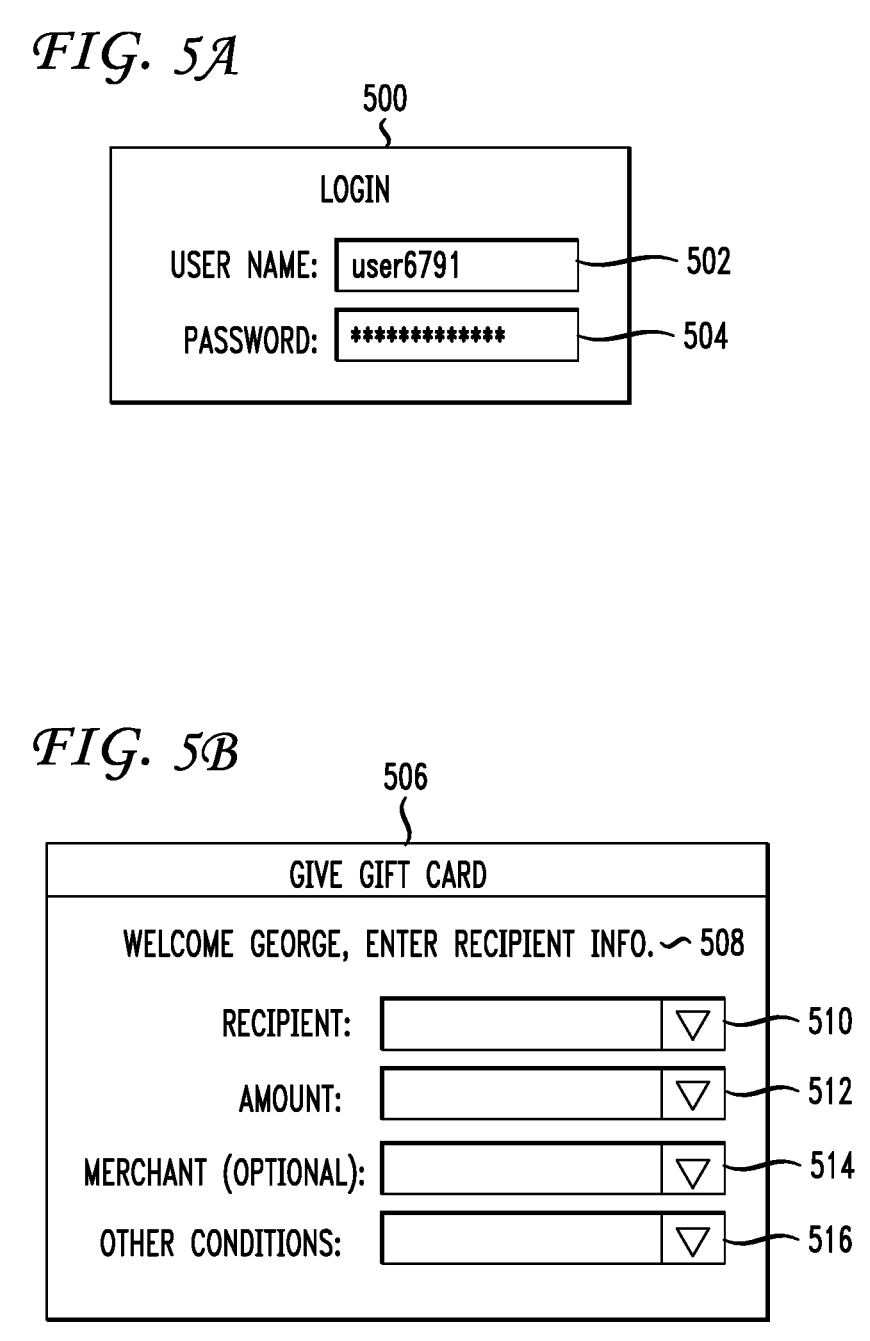

| LOGIN | |
|---|---|
| USER NAME: | user6791 — 502 |
| PASSWORD: | ************ — 504 |

| GIVE GIFT CARD | |
|---|---|
| WELCOME GEORGE, ENTER RECIPIENT INFO. — 508 | |
| RECIPIENT: | ▽ — 510 |
| AMOUNT: | ▽ — 512 |
| MERCHANT (OPTIONAL): | ▽ — 514 |
| OTHER CONDITIONS: | ▽ — 516 |

520 → From: Gift Card Services
To: rachel@email.com
522 → cc: george@email.com
Subject: Gift Card from George for Home Depot Rachel,
524 → George has sent you a gift card for Home Depot for $75 You can use the gift card by simply using your Visa card at any Home Depot or at Home Depot.com Best Regards,
Gift Card Services

From: Gift Card Services
To: rachel@email.com
cc: george@email.com
Subject: Gift Card Funds Applied Rachel,
528 → We have applied gift card funds of $29.64 to Your recent transaction for a shovel at Home Depot. $45.36 remains available for use at Home Depot. Just use your Visa and the remaining funds will be applied to that purchase. Click Here to manage your gift card.

Best Regards,
Gift Card Services

536

From: Gift Card Services
To: rachel@email.com
cc: george@email.com
Subject: Gift Card Reminder Rachel,
538 — This is a reminder that you have $45.36 available for a Home Depot purchase. Just use your Visa to make the purchase After Dec 1 the amount will be applied to any transaction at any merchant using your Visa.

Best Regards,
Gift Card Services

FIG. 7

Management Portal for Received Gift Cards

GIFT CARDS FOR RACHEL

702 — Gift Card from George
to Home Depot ..........................$175.00 (use Visa to redeem)

704 — Gift Card from Ryan
to Best Buy ..........................$42.17 (use debit card to redeem)
706 — Purchased "Boom Blox Wii" on 09/17/10

708 — Gift Card
Linens & Things .................$25.00 (use Mastercard to redeem)
expires 12/11/10

Option ▽
710 — Regift
Send Thank You Note
Return to Giver

FIG. 8

Sent Gift Card Portal — George

| | | | | |
|---|---|---|---|---|
| 802 — 3/8/10 | Tom Jones | Home Depot | Unused | Send Reminder or Suggestion |
| 804 — 4/25/10 | Nora Jackson | Barnes & Noble | Used for "War & Peace" on 4/26/10 | Send Message |
| 806 — 6/7/10 | Chris Williams | Target | $49.99 Used for Clothing. $50.01 unused. | Send Message |
| 808 — 8/31/10 | Jade Murphy | any Video Game Purchase | Used on 9/12/10 at Gamestop for "Super Mario Galaxy 2" | Send Message |

Sent Gift Card Portal – George

| 3/8/10 | Tom Jones | Home Depot | Unused | Send Reminder or Suggestion |

- ☒ Valid Merchants: Home Depot
- ☐ Expiration Date: none
- ▦ Split Gift Card
- ☒ Notification Settings   Send me an email notification when Tom uses the gift card
- ☐ Available Promotions   Require Tom to use MasterCard for a bonus 4% on the gift card

[ Change Policy Permissions ]

— 900

— 902

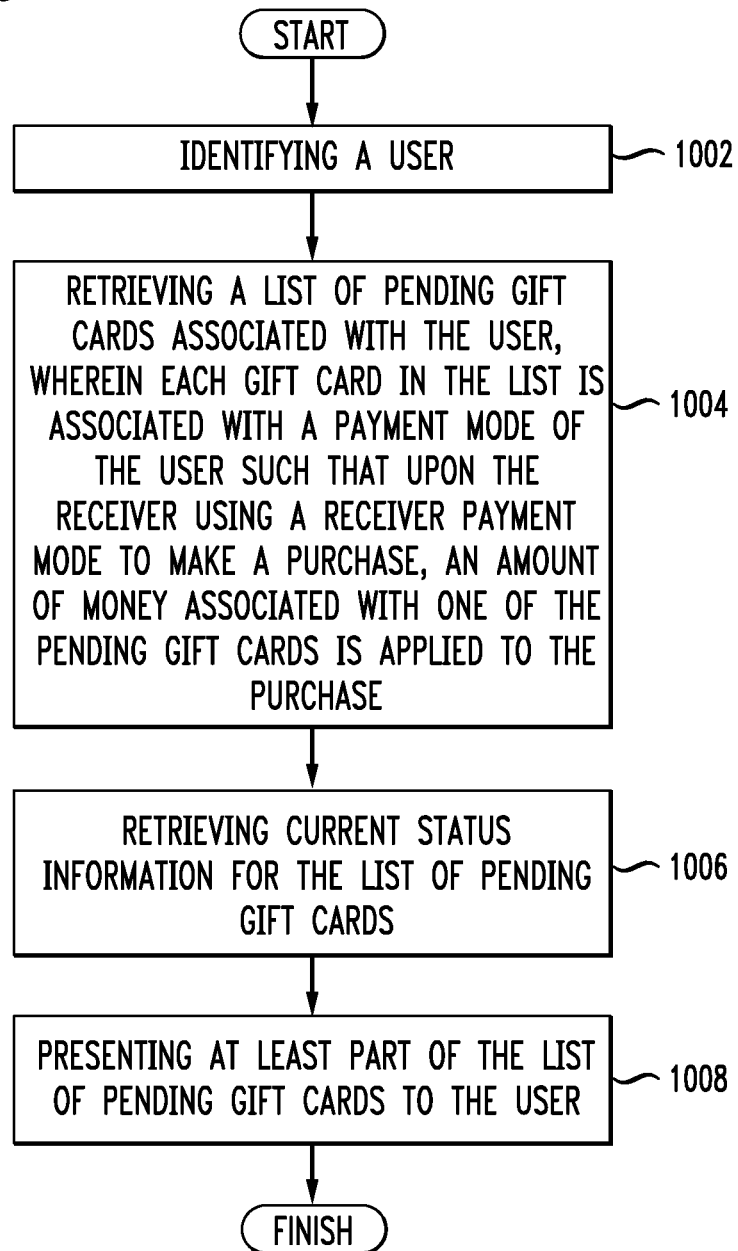

| GIFT CARD PROMOTIONAL OFFERS |
|---|
| Give $50.00 to Rachel for use at Sizzler |

PROMO FROM AMERICAN EXPRESS:
1102 — ☒ Require Rachel to pay via AMEX & get an extra $5.00 added to the gift card amount.

PROMO FROM SIZZLER:
1104 — ☒ Require Rachel to use on a weekday (Monday–Thursday) evening & Rachel will get free dessert.

| GIFT CARD PAYMENT MODE OPTIONS |
|---|

Giver: George
Receiver: Rachel.
Merchant: Olive Garden
Rachel. has two credit cards,
Please apply the virtual Gift Card using
1108 — ○ Visa (+$2.00 to the card)
○ Master Card (+1.00 to the card)

[SEND]

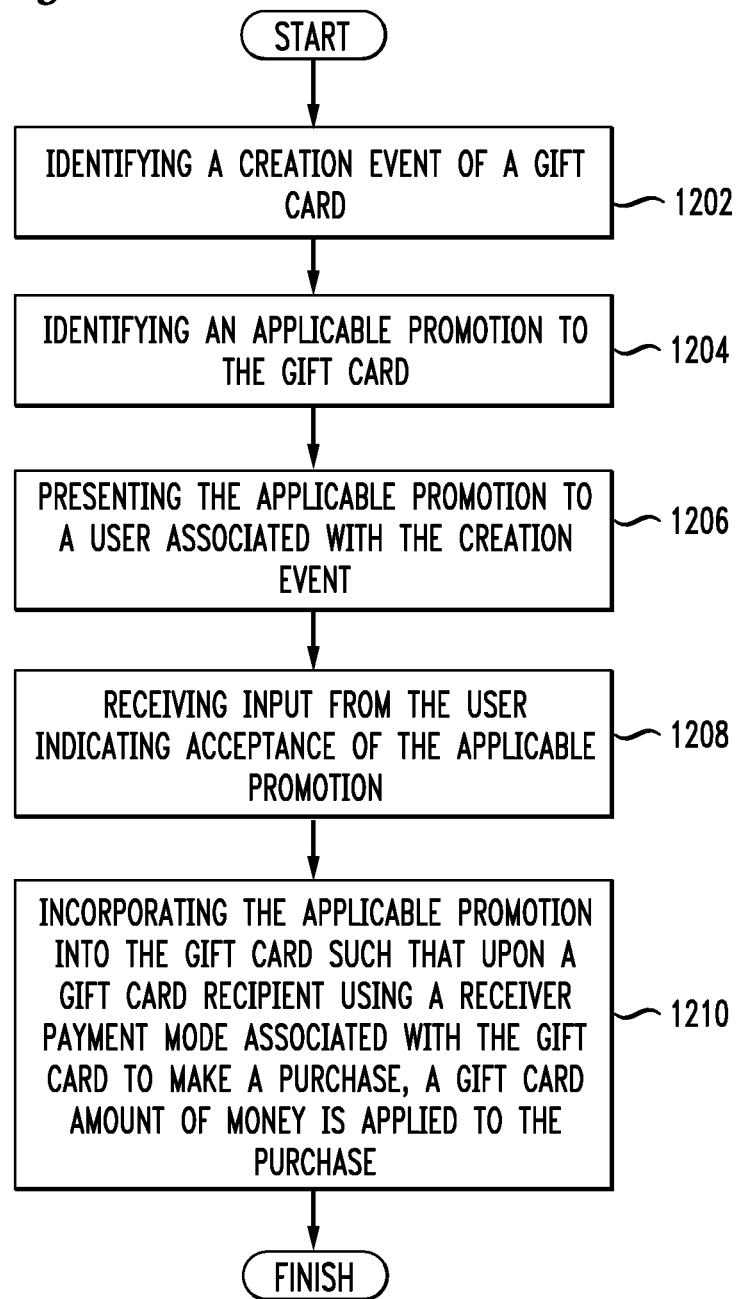

FIG. 15A  1500

---
GROUP GIFT CARD FOR TOM'S B-DAY
---

Total $61
Largest Giver – Ginny $10
22 total Contributors
<expand> suggested amount – $10 for Business acquaintance

[Give $10]
or
[Give] [$20] — 1516

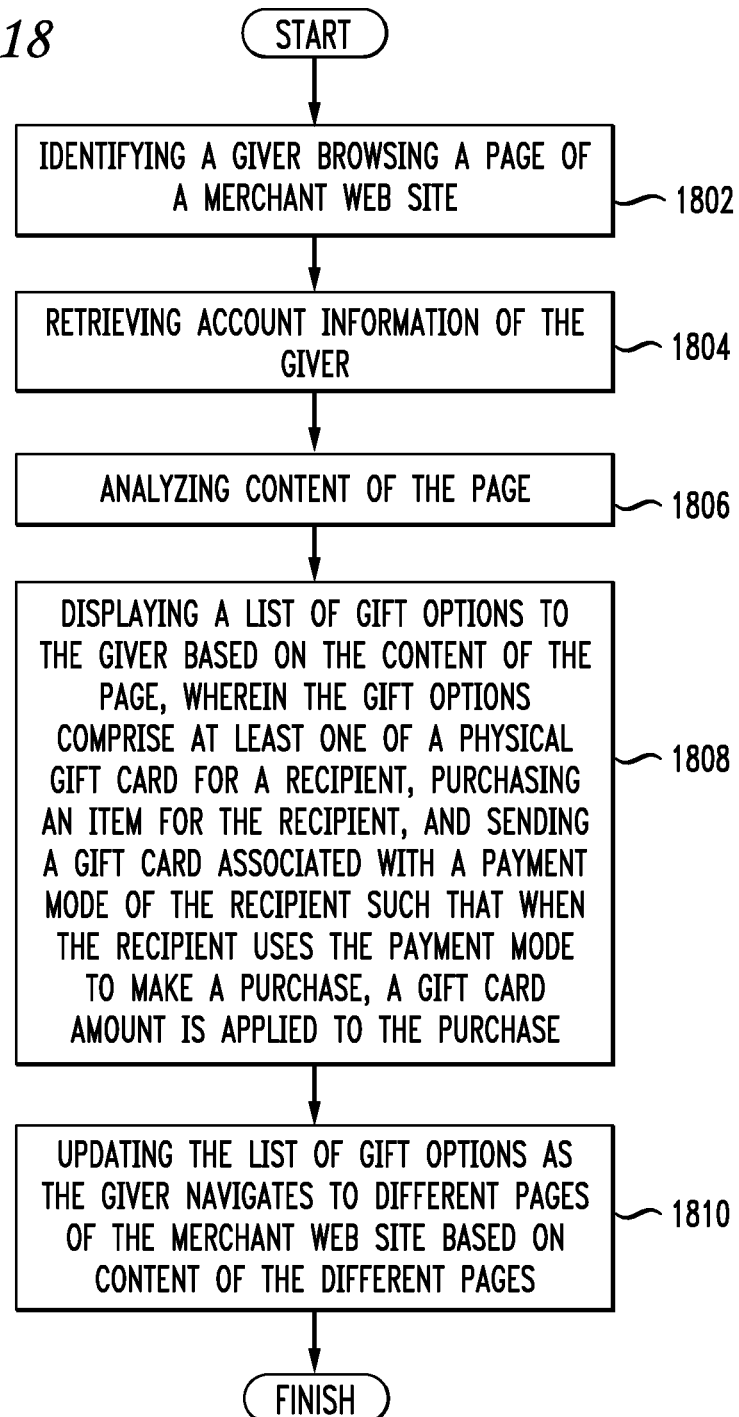

| DINNER PAYMENT |
| --- |
| 3002 — Bob Jones  ⊙⊙ — 3004 |
| 3006 — Giver 1 ▽ |
| $15 ▽ |
| 3008 — Giver 2 ▽ |
| $20 ▽ |
| 3010 — Add Giver ▽ |
| Total Remaining: $18 — 3012 |

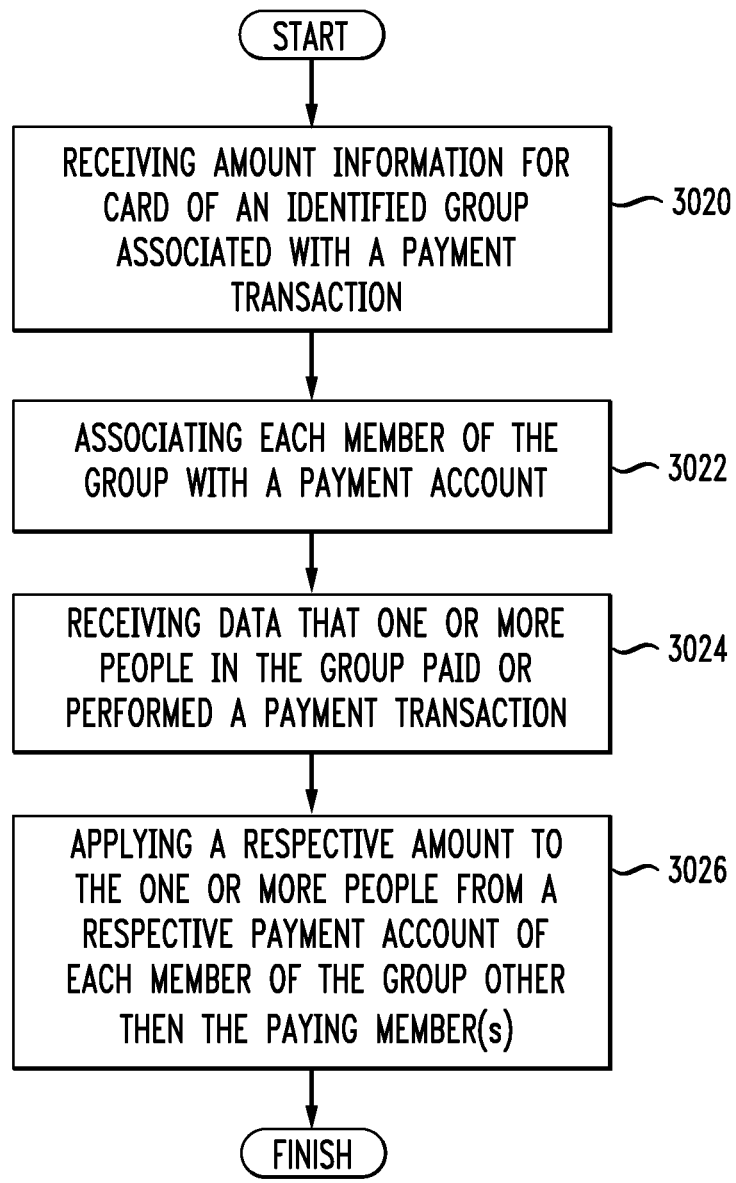

SYSTEM AND METHOD FOR PROCESSING A GIFT INVOLVING SEPARATE TRANSACTIONS

PRIORITY INFORMATION

The present application is a continuation of U.S. patent application Ser. No. 15/882,597, filed Jan. 29, 2018, which is continuation-in-part of U.S. patent application Ser. No. 14/335,358, filed Jul. 18, 2014, which is a continuation of U.S. patent application Ser. No. 14/219,276, filed Mar. 19, 2014, which is a continuation-in-part application claiming priority to U.S. Non-provisional application Ser. No. 14/193,068, filed 28 Feb. 2014, now U.S. Pat. No. 8,751,392, issued 10 Jun. 2014, which is a continuation of U.S. Non-provisional application Ser. No. 12/075,655, filed 13 Mar. 2008, now U.S. Pat. No. 8,676,704, issued 18 Mar. 2014, the contents of each of which are herein incorporated by reference in their entireties.

The present application is a continuation of U.S. patent application Ser. No. 15/882,597, filed Jan. 29, 2018, which is continuation-in-part of U.S. patent application Ser. No. 14/335,358, filed Jul. 18, 2014, which is a continuation of U.S. patent application Ser. No. 14/219,276, filed Mar. 19, 2014, which is a continuation-in-part application of U.S. Non-provisional application Ser. No. 12/475,122, filed 29 May 2009, which claims priority to U.S. Provisional Application 61/057,106, filed May 29, 2008, the contents of each of which are herein incorporated by reference in their entireties.

The present application is a continuation of U.S. patent application Ser. No. 15/882,597, filed Jan. 29, 2018, which is continuation-in-part of U.S. patent application Ser. No. 14/335,358, filed Jul. 18, 2014, which is a continuation of U.S. patent application Ser. No. 14/219,276, filed Mar. 19, 2014, which is a continuation-in-part application of U.S. Non-provisional application Ser. No. 13/301,327, filed 21 Nov. 2011, which is a continuation-in-part of U.S. Non-provisional application Ser. No. 12/967,253, filed 14 Dec. 2010, now U.S. Pat. No. 8,285,643, issued 9 Oct. 2012, the contents of each of which are herein incorporated by reference in their entireties.

The present application is a continuation of U.S. patent application Ser. No. 15/882,597, filed Jan. 29, 2018, which is continuation-in-part of U.S. patent application Ser. No. 14/335,358, filed Jul. 18, 2014, which is a continuation of U.S. patent application Ser. No. 14/219,276, filed Mar. 19, 2014, which is a continuation-in-part application of U.S. Non-provisional application Ser. No. 13/754,401, filed 30 Jan. 2013, which is a continuation-in-part of U.S. Non-provisional application Ser. No. 13/175,234, filed 1 Jul. 2011, which is a continuation of U.S. Non-provisional application Ser. No. 12/967,253, filed 14 Dec. 2010, now U.S. Pat. No. 8,285,643, issued 9 Oct. 2012, the contents of each of which are herein incorporated by reference in their entireties.

The present application is a continuation of U.S. patent application Ser. No. 15/882,597, filed Jan. 29, 2018, which is continuation-in-part of U.S. patent application Ser. No. 14/335,358, filed Jul. 18, 2014, which is a continuation of U.S. patent application Ser. No. 14/219,276, filed Mar. 19, 2014, which is a continuation-in-part application of U.S. Non-provisional application Ser. No. 13/771,791, filed 20 Feb. 2013, which is a continuation-in-part of U.S. Non-provisional application Ser. No. 13/686,189, filed 27 Nov. 2012, which is a continuation of U.S. Non-provisional application Ser. No. 13/470,969, filed 14 May 2012, which is a continuation of U.S. Non-provisional application Ser. No. 12/967,253, filed 14 Dec. 2010, now U.S. Pat. No. 8,285,643, issued 9 Oct. 2012, the contents of each of which are herein incorporated by reference in their entireties.

BACKGROUND

1. Technical Field

The present disclosure relates to gift cards and more specifically to gift cards that are redeemable without use of a physical gift card, gift certificate, or electronic gift code but rather via the use of a gift card recipients' existing credit/debit card or credit/debit card number according to an established policy.

2. Introduction

Gift cards have been used for many years as a mechanism for individuals to give a certain amount of money to a recipient. One example platform that illustrates the current variety of available gift cards is Amazon.com. At the Amazon.com website, a gift card link sends a giver of a gift card to a mechanism in which the giver can purchase gift cards in a variety of forms. Examples include personalized physical gift cards that a giver can print and/or have mailed to a recipient. Amazon.com provides email gift cards in which the giver enters an amount and a quantity and recipient email address with a message. The redemption process is only through Amazon.com or its affiliated website www.endless.com and the website deducts purchases from the gift card balance. They explain that they will place any unused balance in the recipient's gift card account when redeemed. They expressly state that such gift cards cannot be reloaded, resold, transferred for value, redeemed for cash, or applied to any other account, except to the extent required by law. In some cases, even email gift cards from Amazon.com require various steps in order to redeem the gift cards. Amazon.com sends the recipient an email that requires the recipient to click on a link to a principal gift card. In some cases, Amazon.com sends a long gift code to the recipient that the recipient must input in a special gift code field when making a purchase. These long codes can be difficult to enter accurately because they are alphanumeric. Other problems can arise when using any kind of link or code or requiring the user to perform any additional steps to redeem the gift card.

Amazon.com also offers a variety of gift cards from resellers such as Home Depot, Applebee's, P.F. Chang's, and so forth. These physical gift cards are mailed to the recipient and are for a specific amount. Similar gift cards can be printed on a printer for similar use. However, a number of problems exist with these different approaches to gift cards. For example, consider the case when a physical gift card for a restaurant such as P.F. Chang's for $50 is given and the recipient only spends $40 at P.F. Chang's. No easy mechanism exists for the recipient to know how much money is left on a particular gift card. Over time throughout the country millions of dollars are left unused due to this excess money associated with gift cards. Additionally, money is left unused when the recipient fails to keep track of gift cards or throws them away.

As noted in the Nov. 19, 2010, New York Times article "The More Convenient Gift Card", found at http://bucks.blogs.nytimes.com/2010/11/19/the-more-convient-gift-card/, many solutions are being proposed for making "gift cards easier and more convenient to use", including an iPhone based alternative to manage gift cards. However, the iPhone application requires recipients to upload their gift cards by entering their gift card numbers such that retailers can use the bar codes as shown on the iPhone. The problem of users losing track of gift cards still exists. The article ends with the question "How do you make gift cards more convenient, so you don't forget to use them or don't lose track of them?" This article succinctly summarizes the current state of the art. The current approaches and improvements to gift cards are helpful and make gift cards somewhat easier, but still require complicated steps. Current approaches do not solve the fundamental problem of the recipient forgetting to use a gift card or losing track of a gift card. A solution is required.

SUMMARY

Additional features and advantages of the disclosure will be set forth in the description that follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Often a giver desires to give a recipient more than a single item. For example, a giver wants to give her brother a night out, including dinner and a movie. The approaches set forth herein provide a way to accomplish such a gift that involves two or more separate transactions.

Disclosed herein are system, method, and non-transitory computer-readable storage media for processing a gift involving separate transactions. A system configured to practice the method first associates a policy with a giver having a giver account and a recipient having a recipient account, wherein the giver account is independent of the recipient account, and wherein the policy requires at least two transactions prior to applying a gift amount. The policy can include an associated time frame for the at least two transactions. A first qualifying transaction according to the policy can start the associated time frame.

Then the system monitors transactions using the recipient account to identify at least two separate qualifying transactions according to the policy. Transactions using the recipient account can be monitored according to the associated time frame. The at least two separate qualifying transactions can include a first transaction at a first merchant and a second transaction at a second merchant.

Upon identifying the at least two separate qualifying transactions, the system applies the gift amount to the recipient account according to the policy. Further, upon identifying a first qualifying transaction of the at least two separate qualifying transactions, the system can send a notification to the recipient. The notification can indicate requirements associated with the policy for a second qualifying transaction. Upon identifying a first qualifying transaction of the at least two separate qualifying transactions, and upon a threshold elapsed time after the first qualifying transaction, the system can optionally send a reminder to the recipient to complete a second qualifying transaction according to the policy. The reminder can indicate at least one of a qualifying merchant, a qualifying product category, a remaining time to complete the second qualifying transaction, a maximum gift amount for the second qualifying transaction, and other terms of the policy.

If a purchase price of the at least two separate qualifying transactions is less than a maximum gift amount, the system can apply the purchase to the recipient account and return the unused portion to one of the recipient account and the giver account.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof that are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2A illustrates an example flow for processing a virtual gift card;

FIG. 4C illustrates an exemplary packet structure for communicating virtual gift card transactions with a server;

FIG. 5A illustrates an example login prompt in a process for sending a virtual gift card;

FIG. 5B illustrates an example virtual gift card configuration screen in a process for sending a virtual gift card;

FIG. 5C illustrates an example notification email to a recipient of a virtual gift card;

FIG. 5D illustrates an example confirmation email to a recipient of a virtual gift card that the virtual gift card was successfully applied to a transaction;

FIG. 7 illustrates an example management portal for received virtual gift cards;

FIG. 8 illustrates an example management portal for sent virtual gift cards;

FIG. 9 illustrates an example interface for managing policies associated with virtual gift cards;

FIG. 10 illustrates an exemplary method for managing virtual gift cards;

FIG. 11A illustrates a first exemplary user interface for adding promotions to a virtual gift card;

FIG. 11B illustrates a second exemplary user interface for adding promotions to a virtual gift card;

FIG. 12 illustrates an exemplary method embodiment for adding a promotion to a virtual gift card;

FIG. 15A illustrates an example interface for a group virtual gift card;

FIG. 18 illustrates an example method embodiment for intelligently populating and transitioning between what to offer a potential giver as they navigate an online merchant site;

FIG. 30 illustrates an exemplary user interface for requesting a reverse virtual gift card; and FIG. 31 illustrates a method embodiment of managing a group payment associated with a payment transaction.

DETAILED DESCRIPTION

Figure 1:
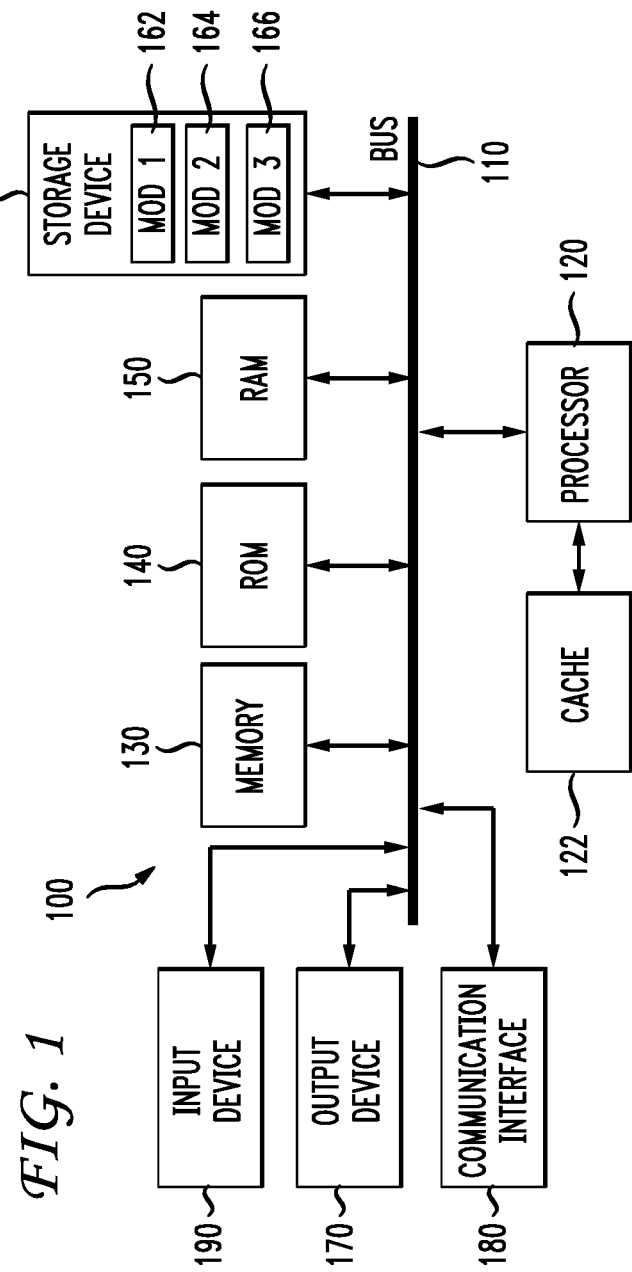
FIG. 1 illustrates an example system embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Any particular function disclosed in connection with one embodiment or aspect can expressly be integrated into another disclosed embodiment, function or aspect. This disclosure considers mixing and matching of the various functions although particular functions are not specifically discussed in one example.

The present disclosure addresses the need in the art for removing hurdles in giving, redeeming, and processing gift cards and particular to gift cards that are given and redeemed without a physical gift card or gift code. A brief introductory description of a basic general-purpose system or computing device in FIG. 1 that can be employed to practice the concepts is disclosed herein. A more detailed description will then follow of the various credit/debit processing infrastructure, the exemplary methods, and other financial processing infrastructure and concepts in conjunction with virtual gift cards that are redeemed using an existing payment mechanism transparently, that is, without any additional physical gift card, gift certificate or any gift code. A recipient of a virtual gift card can simply purchase a qualifying good or service with her Visa card, for example, and the payment processing infrastructure associated with the Visa card applies the virtual gift card amount automatically to the transaction. This disclosure involves more than just a direct transfer of money from one person to another, or from a gift card to a credit card account, but rather focuses on a gift card approach in which a gift card is established at a first time having a policy, and a recipient, at a second time that is later than the first time, executes a purchasing transaction according to the policy. When that transaction is detected, the system will implement the policy and apply the gift card funds at a third time which is later than the first time, and can be approximately around the second time or later than the second time. The implementation and use of such a policy to guide/manage gift card payment through a recipient's use of an existing account introduces many novel features that are disclosed herein.

The policy can include at least one of: a class of goods or services, an amount of money, a merchant or group of merchants, a ceiling amount of money to be used in the gift card, a time frame for use of the gift card, one or more recipient accounts that when used can trigger the transfer of money from the giver account to the one or more recipient accounts, and a predetermined period of time in which if all the amount of money associated with the gift card is not used according to the policy, a remainder amount of money is transferred from the giver account to the recipient account.

A new result of this approach is to render a recipient open-loop credit/debit card account into a hybrid open-loop/closed-loop account. The system monitors the activity of the account such, that for average purchase, the account is open-loop and not restricted, but the application of the gift card to specific purchases according the policy is considered closed loop.

For the sake of clarity, the methods herein are discussed in terms of an exemplary system 100 as shown in FIG. 1 configured to practice the method. The steps of each method outlined herein are exemplary and can be implemented in any combination and/or permutation thereof, including combinations that exclude, add, or modify certain steps. These and other variations are discussed herein as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high-speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs hard disk 160, those skilled in the art should appreciate that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general-purpose DSP circuit, may also be provided.

The logical operations of the various embodiments are implemented as: (1) a sequence of computer-implemented steps, operations, or procedures running on a programmable circuit within a general use computer, (2) a sequence of computer-implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

The term "system" or similar terms also apply to the herein disclosed systems for processing various types of transactions. There are differences in systems for processing credit card and debit card transactions. It is assumed that with the policies and processing disclosed herein, that appropriate adaptations are made for specific systems where necessary. Those of skill in the art will understand the hardware components used for accomplishing such transactions.

The physical systems performing the functions disclosed herein can be found in any geographic location. For example, one or more of the banks, servers, and physical infrastructure performing the steps herein may be outside the United States. Therefore, all processes should be interpreted as also including the concept of a recipient performing a purchase in the United States, communications leaving the United States (confirmation, authorization, instructions, etc.)

for a foreign entity, and communications being received from the foreign entity that achieves the results discussed herein.

Virtual Gift Cards

Having disclosed some components of a computing system, the disclosure now turns to FIG. 2, which illustrates an example flow 200 of the basic approach disclosed herein for processing a virtual gift card. The embodiments disclosed herein are discussed in terms of an exemplary system 100 or computing device as shown in FIG. 1 configured to practice the various embodiments. A more specific exemplary system for implementing this flow 200 is illustrated in more detail in FIG. 4 with respect to a control engine that manages the redemption and processing of each gift card according to its policy via communications and instructions with various accounts and/or merchants accounts. Feature 202 represents a giver interface. An example will be used to step through the various blocks. Assume that a giver desires to give a $50 virtual gift card to a recipient. The interface 202 enables the giver to either input identification information and recipient account information or have it prepopulated based on a previous login. The interface 202 can be a web interface, a software client interface, a point of sale interface that a store employee uses on behalf of a giver, a self-service kiosk, a voice-based interface, an interface via a handheld device, a multi-modal interface, speech interface, or any other suitable interface. The system 100 identifies, via the giver selection, a predictive approach, or some other approach, a recipient such as a mother, sister, or friend of the giver, etc., and an amount that the giver desires to give to the recipient. The recipient credit/debit card data/account is identified via a secure communication to a database or inserted by the giver or recipient if necessary or possible. Through one or more different methods, the giver account and recipient account are identified.

The timing of the creation and redemption of the gift card is relevant. In one example, the creation of the gift card by the giver occurs at a first time, say Monday morning at 9:00 AM. The policy is established at that time or perhaps relatively close to that time, such as the gift card is good for purchases at restaurants. The recipient then will at a second time, which is later than the first time, execute a purchasing transaction at a restaurant, say Friday night at 6:00 PM. The policy can then be implemented (money transferred, paid, etc.) at the time of the transaction around Friday at 6:00 PM, or the system may scan the recipient transaction history say every Saturday to determine whether qualifying transactions exist. Assuming that the system can identify restaurant transactions on the recipient transaction history, it would then detect the Friday night restaurant purchase and implement the policy for that purchase.

The recipient bank might desire such scanning of the recipient purchasing history to remain anonymous. In this case, a secure communication between a central control entity and the recipient account holder can simply provide higher level policy data. For example, a participating recipient bank can have a module in place to perform such scanning and receive data from a central control entity to monitor Rachel's account for purchases at the Olive Garden and notify us of such a purchase. Rachel's bank or credit card issuing entity can then monitor her account and simply provide the basic data of such a transaction at the level needed. For example, the control entity can instruct the bank that the gift card is for $40 at Olive Garden and to monitor for 6 months and report back (1) whether a purchase was made at Olive Garden, and if it was under $40, then the amount, or if it was over $40. Assume one month later Rachel makes a $42 purchase at Olive Garden. Her bank can notify the control entity that a purchase was made for over $40 dollars (thus maintaining the secrecy of the total amount). The control entity can then apply the policy for the entire gift card. If Rachel spent $35, her bank can report the purchase and the amount as $35. The policy then causes $35 of the gift card to be applied to the transaction and maintains the record that $5 is still available. If after 6 months no other purchase is made by Rachel, the control entity can simply transfer the rest of the funds to Rachel's account or take some other action based on the policy. Since Rachel's bank was instructed to monitor her accounts for gift card related activity for six months, once the six month expires, that monitoring simply expires as well. This approach can simplify and separate the implementation of the policy from a control entity and a giver or recipient bank.

Preferably, the interface has access to the giver and recipient accounts such that the giver does not have to enter credit/debit card or checking account information. Either way, the interaction can confirm to the giver that a sufficient level of information exists to carry out the gift card transaction. This can include that an authorization communication has confirmed that the recipient has a valid credit/debit card. The specific recipient card to be used to redeem the gift card can be provided, optionally without the card number, to the giver. The interface can optionally tell the giver that the recipient Visa credit card is to be used for the gift card or can enable the giver to select which payment mode the recipient should use. I.e., the system may instruct the giver that the recipient's Visa Credit card and MasterCard Debit card are both available, and to choose which one is to be used. The giver can click a "give" button that begins the transaction. Upon triggering the transaction, information is transmitted to block 204 that will withdraw, hold the amount ($50), or reserve in a line of credit from a giver account and associate it with the recipient credit/debit card account and the policy for managing the gift card. The particular process of retrieving the gift card amount from the giver account will depend on the type of account is used or other policy considerations. Applying the gift card amount, depending on the types of accounts involved, may include processes as reserving an amount of available credit, reserving an amount of money in an account, transferring money from one account to a holding account, transferring money to a merchant account directly, handling a transaction immediately such as is done with a debit card, handling a transfer of money in a batch mode a period of time after a qualifying transaction, and so forth. Any combination of these and other transactional components can be applied to carry out the policy for any specific gift card.

If the recipient does not have an account, the system can either send a notification to a recipient indicating that someone wants to give them a virtual gift card and encouraging the recipient to set up an account. If the recipient does not have an account because the recipient is a child, for example, who is not old enough to have a credit/debit card, the system can suggest to the giver a suitable proxy recipient who has an account, such as a parent or guardian. If the recipient is unable or unwilling to set up an account and no suitable proxy recipient is available or known, the system can take some default action. The default action can include mailing a check or a traditional physical gift card to the recipient.

The information received from block 202 is sufficient to identify a giver account from which to draw or hold the $50 for giving to the recipient. Also, the information received from block 202 can identify a recipient account such as a bank account, credit/debit account, specialty credit card such as a Macy's credit card or an Old Navy credit card, online payment account, or other suitable device or mechanism associated with purchases and/or payments so that the recipient can receive the money. As noted above, the terms "credit card" and "debit card" encompass credit cards and debit cards as well as PayPal, cash, club cards, checks, merchant-specific credit cards, and other payment modes as well. Accordingly, in block 204 the system identifies and associates the various accounts with this virtual gift card in preparation for completing the transaction. Optional block 206 involves sending a notice to the recipient. Because no physical gift card is given, if the giver wants to give a virtual gift card of $50 to the recipient for use at a restaurant, such as Olive Garden, the system can provide an email or other notification via text or voicemail or other mechanism. One example notification simply states "George has given you a $50 virtual gift card to Olive Garden, please use your Visa and $50 will be applied to your purchase at Olive Garden." No interaction is necessary with any notification. Indeed, no notification is required for the transaction to work. The recipient may only know about the gift card after it is redeemed, or when the giver or the system tells them. The merchant can inform the recipient when the virtual gift card is redeemed as well. The redemption of the gift card is independent of any communication to the recipient or of any notification mechanism although accessory features, upselling, or optional variations to the policy of the gift card can be applied through such notifications and interactions between the giver and/or seller that can occur via such communication.

A policy associated with the gift card can be as simple as applying the gift card amount to the transaction by the recipient at any merchant. Other policies and variations are further disclosed. Several other aspects are associated with the optional notification 206 to the recipient. As has been noted, the notification is optional inasmuch as the information associated with the giver and the recipient is already obtained and can be processed without any automatic or other notification at all. The giver can simply call up the recipient and tell the recipient that the recipient got a $50 virtual gift card for use at Olive Garden and all the recipient needs to do is use their credit card or any of the designated payment modes or accounts. As noted above, the giver interface can notify the giver that the card is redeemable through the recipient's credit card. The policy can cover several accounts and a multitude of scenarios. The gift card is redeemable through using the recipient's credit/debit card at the merchant as though they were making a normal payment without the existence of the gift card. The policy is implemented through control mechanisms on a server, distributed at various banks, or associated with the various banks involved to monitor the recipient purchasing activity to identify a triggering transaction to implement the policy of the gift card. For example, the recipient credit card account can have a monitoring module associated with it when a gift card is redeemable with that account. The monitoring module can identify when a purchase is made and notify a central control entity, which can cause the system to apply the gift card funds according to the policy.

In another aspect, however, given the framework disclosed herein, email or other electronic notification to the recipient can provide other features. The email can be a simple notification such that the recipient does not have to interact with the email at all in order to use the virtual gift card. The notification can have no mechanism (or no mandatory mechanism) for feedback, reply, or confirmation. In other aspects, communication or interaction with the recipient can be desirable for security or other purposes. For example, the email can provide some information such as "George has given you a $50 virtual gift card to Olive Garden. Do you know George and do you want to accept this gift card?" The system can require the recipient to click a confirmation button link or perform some other interaction to confirm that the recipient desires to use the gift card. Interactions with the notification can modify or confirm the policy. The recipient may receive a communication that says, "George has given you a virtual gift card for $50, do you want to redeem it through your Visa credit card (and add $5) or through your debit card (and add $3)." Based on the selection of the recipient, the policy is established and accessory features are added, if any. These interactions are optional and, even when present, the interactions, communications, and notifications with the recipient are not required for redemption of the virtual gift card.

As a value-added service, the system can, as part of the interaction, allow the recipient to reserve a table at Olive Garden, invite others to join the dinner at Olive Garden, show a custom menu including updated prices for items based on the gift card amount (which would be free for items under $50), a meal planner application to see an estimated total cost (after the $50 virtual gift card) of a specific set of items (such as an appetizer, two entrees, drinks, dessert, etc), and the like. The interactions can include verification questions to further confirm that the recipient is the appropriate person and that they know the giver, and so forth. Those of skill in the art can understand various mechanisms for confirming and authorizing the transfer of funds from the giver to the recipient.

In yet another aspect, the notification 206 can include options presented to the recipient for how the gift card will be managed. The notification to the recipient can state, "George has provided you with a $50 virtual gift card to any restaurant of your choice. If desirable, please select from the following options." In this example, the giver did not specify a particular restaurant but only provided that the gift card was for the recipient to go out to dinner. Thus, the card was provided for a class of goods or services (food). The notification is one opportunity for specific restaurants (as members of the class) to seek to obtain additional business. The notification can include an option selectable by the giver or the recipient, e.g.: for Olive Garden, Red Lobster, or P.F. Chang's. Additionally, communication with the various databases associated with these restaurants can include additional information such as P.F. Chang's offers an additional $5 if the virtual gift card is used at P.F. Chang's. This provides an upselling opportunity available to the merchants. The method can include receiving information associated with a giver giving a virtual gift card for a class of items such as restaurants, or hardware stores, or grocery stores, etc. Data is then retrieved for the specific species of that class and potential offers that can be associated with each of those species.

Thus, a database is accessible while processing the gift card, in which offers from Olive Garden, P.F. Chang's and Red Lobster are determined to be available. Options can be presented to the giver for selection to upsell or cause them to want to add the offers to the base gift card. These offers are combined with the notification that is sent to the recipient, if any optional notification is sent. The system presents a communication to the recipient and receives a selection of one of the species. Assume that the recipient sees an offer for the Olive Garden in which an additional $5 is added to the virtual gift card amount. The system then handles the entire transaction such that when the recipient uses their credit/debit card at the Olive Garden. The $50 is applied to the transaction as well as an additional $5 from the Olive Garden. This $5 can be a coupon discount or an additional transfer of money to the recipient's account from the Olive Garden or some other entity during or following the transaction. The policy can manage the final transaction with all the various participants, giver, recipient, merchant, and others.

The system can present an additional option in the communication where the recipient does not select any of the species of the class but merely desires to receive the virtual gift card for use at any restaurant. This option can be a default setting. In such a case, the recipient receives the notification they received a virtual gift card for a restaurant but selects no specific restaurant. The next time the recipient goes to any restaurant and uses an appropriate payment mechanism according to the policy for the gift card, the system (such as an acquiring bank or other node or control engine in the system) applies the virtual gift card for $50 to that transaction and the species options which were presented in the communication are cancelled at that stage and no longer viable.

Where a genus (such as restaurants) are applied in the policy, and where the system scans the recipient transaction history to determine whether a triggering transaction exists, there may be some ambiguity in the recipient payment history regarding whether a purchase was at a restaurant. In such a case, the system may initiate a confirming interaction via a communication with the recipient to confirm that the purchase last night at 6 PM at "Mama Lucia's" was a restaurant. If that is confirmed by the recipient, then the system implements the gift card policy for that transaction.

In one aspect, the virtual gift card is associated with a group of payment mechanisms for a single giver and/or recipient or for multiple givers and/or recipients. For example, the virtual gift card can be tied to a VISA debit card and an American Express credit card. A transaction at the restaurant using either one can trigger the application of the funds associated with virtual gift card to the recipient account, the merchant account or in any other fashion. In another aspect, the virtual gift card is tied to a checking account shared by a husband and a wife as a recipient pair. A transaction at a restaurant made via either spouse's check card or a physical check can trigger the virtual gift card. The giver can specify a recipient routing number, such as the routing number printed on the bottom of a physical check, so that the system can apply the virtual gift card to the recipient's checking account. A debit card used on that checking account can also trigger the gift card transaction. In each case, the virtual gift card can have a policy associated with its redemption that the system monitors recipient purchasing transactions and follows with respect to transferring funds.

When the system receives information associated with the giver and the recipient, the species options that are presented in the above scenario can also be geographically selected. The location of the recipient is known based on information in the database, a mobile device location, a recent purchase, and/or other sources, and the system can identify and present an initial set of specific businesses to the recipient. This option can also be dynamic. A recipient living in Virginia can be notified of receipt a virtual gift card for any of a series of species restaurants that are within 10 miles of their home. If the recipient travels to Italy, and use of their credit card or other location-based mechanism indicates that they are now in Rome, a follow up email can be provided with a new set of offers associated with restaurants within the vicinity of where the credit card is actually being used. In this scenario, the earlier offer can be cancelled, modified, or maintained. In any event it is preferable that once in Italy, if the restaurant in Italy provides an additional upsell offer for use in association with the virtual gift card, then once that payment mechanism is used according to the new offer, all offers are then cancelled and considered fulfilled. The merchants can attach additional limitations to their upsell offers as well, such as "minimum $25 purchase", "valid until November $31^{st}$", "for use at the Baltimore location" or "valid Wednesdays only". These variations represent different features illustrating how the policy can manage any given gift card. As can be appreciated, the variety of policies that can be applied to a gift card to manage how its payment is triggered is endless and all such variations are considered within the scope of this disclosure. Policies can mix timing, geography, classes/species of goods and services, individuals, groups of purchases (i.e., a series of items purchased that are related or associated according to the policy) and so forth.

Location-based data can also trigger an offer to a giver. Assume a recipient, Rachel, who previously received a gift card for the Olive Garden from a giver George, is again at the Olive Garden. Rachel's location as identified by her mobile phone, either automatically or manually such as based on a check-in to FourSquare, can trigger a notice to George that states, "Rachel is at the Olive Garden. Do you want to treat her to dinner?" A preauthorized offer already associates the giver account to the recipient account. If George says "Yes" or otherwise confirms the notice, the system can trigger the transaction. A communication to Rachel of any type, including a connected telephone call, can notify Rachel that George is treating her to dinner and to use her Visa card in the normal fashion. However, no communication is necessary.

The system can notify the merchant from which the recipient is making the purchase, such as Red Lobster. Location-based services can identify that the recipient of a Red Lobster gift card is at a Red Lobster location. The notification can inform the wait staff at Red Lobster that it is the recipient's birthday and request that they sing "Happy Birthday" to the recipient. Alternatively, the notification to the merchant can provide some information regarding recipient preferences for food, products, or service, such as "the recipient prefers Diet Coke with no ice". Then the wait staff can act on the notification information to provide customized service to the recipient in such a way that the experience is a pleasant surprise to the recipient. In this manner, the merchant can know of people who are at their location and have gift cards. Such data can provide the merchant with a mechanism to identify the recipient, such as a photo because the recipient has yet to use their credit/debit card for the purchase. In this scenario, a location-based service can identify that the particular person is at the merchant because of their handheld device, and a communication with a control engine managing the gift cards can identify that a gift card for the merchant is available for that user. The merchant can receive a photo ID of that patron even before they would pay for their goods/services to provide the enhanced level of service based on the information they receive.

Next, block 208 indicates that the recipient makes a qualifying transaction. An example of a qualifying transaction is simply the recipient using their credit/debit card to purchase dinner at the Olive Garden. The simplicity of this approach is that there is no code, separate physical gift card, or any other step that needs to be taken in order for the recipient to enjoy the benefits of the $50 gift. The recipient simply needs to make the purchase in the normal manner in which they would purchase such an item. The new result of the concepts disclosed herein is a simplification of the giving and redemption of gift cards such that no money is ever lost or failed to be redeemed due to policies that can manage the process of handling any remainder funds such that they are never lost.

Block 210 indicates applying at least part of the amount to the transaction. Assume that the virtual gift card amount was $50 and the transaction was $40. The system applies $40 of the $50 to the dinner at Olive Garden. The system can hold the $10 for future purchases at the Olive Garden or handle the $10 in various other approaches according to the policy for the gift card as described further below. The recipient can establish, via policies, a preference to use only a portion of the gift card amount for a first transaction and reserve the remaining portion of the gift card amount for a second transaction at a later time.

Figure 2B:
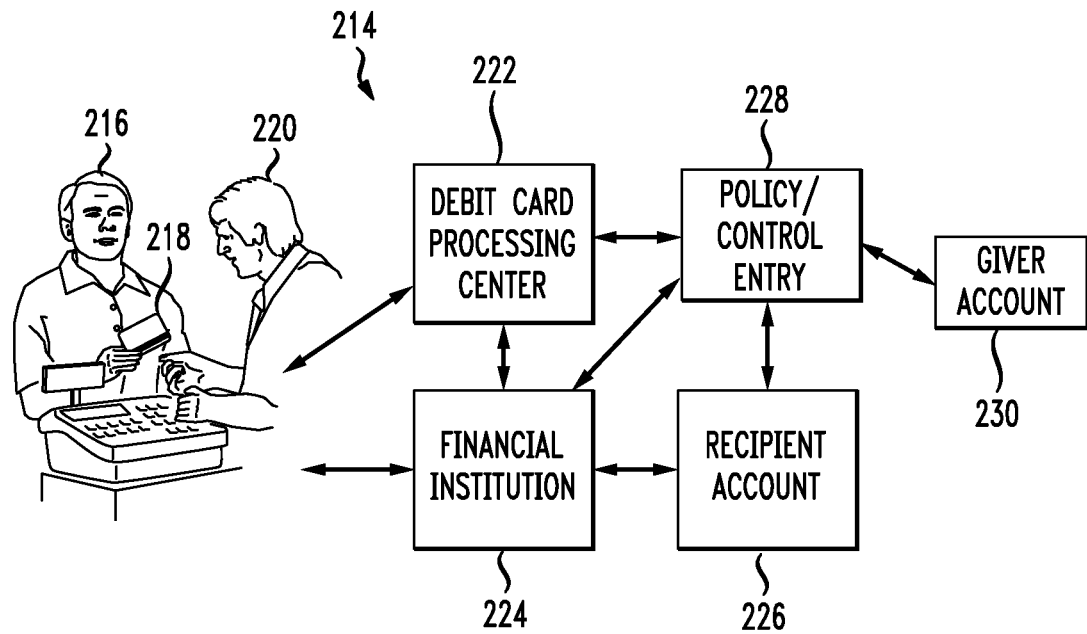
FIG. 2B illustrates an exemplary debit card processing architecture.

The system can apply at least part of the amount to the transaction in a variety of ways. FIG. 2B illustrates an exemplary debit card processing architecture 214. For example, assume the recipient 216 uses a debit card 218 for the qualifying transaction. In the debit card processing infrastructure 214, the recipient 216 presents the debit card 218 to a merchant 220 at a point of sale. The merchant 220 or recipient 216 swipes the debit card 218 through a scanner or otherwise obtains the debit card number, such as by entering the number into a computing device. The merchant system contacts the financial institution 224 indicated by the debit card number, either directly or through a debit card processing center 222. The financial institution 224 verifies that funds are available in the recipient account 226 and approves the transaction by immediately (or nearly immediately) withdrawing funds from the recipient account 226 and transferring the funds to the merchant 220. In this debit card processing infrastructure 214, if the debit card account only has $20 in the account (and the purchase was for $40), then the policy/control entity 228 can dictate to apply at least part of the gift card amount to the transaction. The system identifies that the recipient wants to use the debit card for a $40 transaction, whereas they only have $20 in their account, the system can credit $20 to the recipient account 226 from the giver account 230 prior to completing the transaction, at which point the debit card can be used to complete the transaction. If the recipient account 226 has sufficient funds, then the system can process the qualifying transaction in a normal fashion, and then credit the recipient account 226 the appropriate amount of $40 from the giver account 230 after the transaction with the merchant is completed.

In another aspect, a system directly pays the merchant 220 associated with the qualifying transaction at least a portion of the amount from the giver account 230 based on the transaction. For example, once the recipient uses their debit card 218 in the qualifying transaction, a separate transaction occurs in which the system pays $40 to the merchant from the giver account 230 at the time of the transaction and the $40 does not pass through the particular debit card account of the recipient. Other acquiring banks or intermediate accounts can be used to hold money and process it either immediately or in batch modes at a later time. The particular processing can depend on the characteristics (credit/debit/other) of the giver account, recipient account, merchant account, acquiring bank account, etc.

Additionally, the recipient can choose to apply the entire gift card amount, part of the gift card or none of the gift card in a purchase transaction. In this way, the recipient can control spending by choosing to pay from their own pocket for a purchase now and save their gift for later, when perhaps a particular item is on sale or when the recipient knows they will need additional funds, such as from a gift card to make purchases. For example, a recipient can inform a merchant to not apply a particular gift at the time of purchase since the recipient knows that on Black Friday the Dremel Multimax power tool at Home Depot will be half off. The recipient knows that Black Friday is a big spending day and that she typically overspends that day. She can choose to redeem her gift card on Black Friday to help control her spending.

Figure 2C:
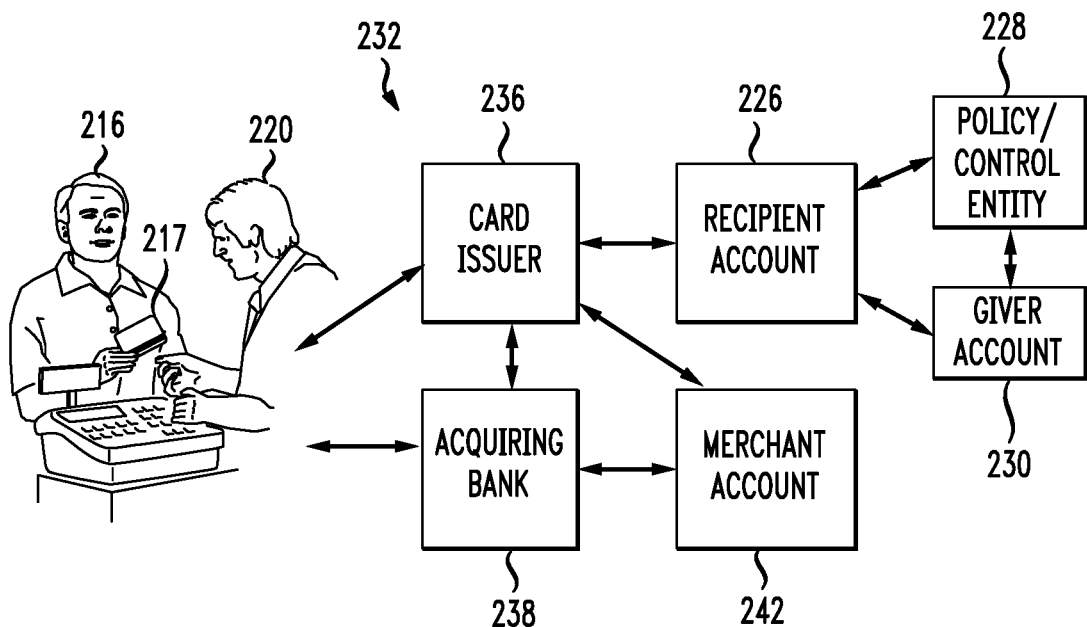
FIG. 2C illustrates an exemplary credit card processing architecture.

FIG. 2C illustrates an exemplary credit card processing infrastructure 232 in which the system can credit the recipient account at the time of sale or shortly thereafter. In a credit card processing infrastructure 232, the issuer 236 of the credit card 217 lends money to the recipient 216 to be paid to a merchant 220. In most cases, the merchant 220 and/or the recipient 216 swipes the credit card 217 through a machine known as reader. If the card issuer 236 approves the transaction, an acquiring bank 238, which receives credit card transactions from the merchant 220, then credits the merchant's account 242. A credit card association (not shown) may also be involved to set the terms of transactions for merchants, card-issuing banks and acquiring banks. The merchant 220 can pay the acquiring bank 238 a fee for processing the transaction. Once approved, the card issuer 236 posts the transaction to the recipient's account 226. At the end of the billing period, the cardholder 216 receives a credit card statement from the issuer 236, at which time payment for the transaction is due. In this credit card processing infrastructure 232, the system can credit the recipient account 226 when a bill is due, such as a monthly credit card bill, shortly before or on the due date. In this way, the system can hold on to the money, potentially earning interest on the money until the last minute it is needed to satisfy the gift card transaction. This floating period can be one source of revenue to fund the gift card system infrastructure and/or to provide a profit to the operators of the gift card system infrastructure. Also shown in FIG. 2C is a policy/control entity 228 and the giver account 230 which are used to communicate with, monitor and manage the gift card transactions according the principles and concepts disclosed herein.

If the system 214, 232 processes gift cards in a batch or delayed mode, it can on a periodic (daily, weekly, monthly, etc) or triggered basis (upon a large transaction, or two weeks after the creation of the gift card, or one week after a known birthday, etc.) review the transaction statement of the recipient to scan for qualifying transactions. For example, if a recipient makes a purchase at the Olive Garden, the structure and data in the credit/debit card statement is known. The system can scan the statements for Olive Garden transactions, identify dates, locations amounts and/or any other relevant data that is needed for a particular policy, and then apply the policy accordingly to transfer money from the giver account to the recipient account. Again, the variations between giver and recipient accounts being debit, credit accounts or other types of accounts can be considered such that the system achieves the transfer of money or available credit or other compensation to the recipient.

The system 214, 232 can process credit cards and apply virtual gift cards in real time (or substantially real time) or in batches. A merchant that processes credit cards typically has a merchant account for receiving credit card payments. If the merchant accepts many credit card payments, the merchant can process credit cards in batches rather than one at a time. In a batch-based approach, the merchant accepts payment via credit card from a customer and submits the payment to the merchant account. Then the acquiring bank, or an organization that accepts payment on behalf of the merchant, checks the customer's name and credit card number for authenticity. The acquiring bank can also check the transaction and the amount with the bank that issued the credit card. The acquiring bank holds onto the payment while validation takes place. If all checks are valid, the system generates an approval code and the merchant keeps that code together with information relating to the sale. The merchant can store authorized cards in batches and send the batch to the acquiring bank each day at close of business and/or at some other interval. The acquiring bank can send the batch to a credit card association (not shown) that debits the customer's accounts and credits the appropriate account. Once the acquiring bank receives payment from the credit card issuer, the acquiring bank pays the merchant, optionally minus a processing fee. Although batch processing can be convenient for a merchant, there are times when he or she may not benefit from it. The same or similar principles can be applied to process virtual gift cards in batches. The virtual gift card processing system can be a separate entity that intercepts the flow of the authorization process, or can be integrated as part of any or all of the acquiring bank, card issuer, merchant point of sale, giver/recipient accounts, credit card association control, and so on. In one example, as a gift card is established, a code or a module is established to monitor the recipient purchasing activity using the recipient credit/debit account(s) 226. When a triggering transaction occurs (purchase at a restaurant, particular merchant, or a series of purchases occur), the system can notify the policy/control entity 228 and then receive further instructions on how to consummate the transaction for the gift card and handle any further processes such as remainder amounts of money on the gift card, and so forth. All variations on actual implementation are included within the scope of this disclosure with respect to locations within the system where certain processes take place.

In all of these scenarios, the management of the transaction and transfer of funds are transparent to the giver and the recipient in that the system conducts the actual purchasing in the same way the recipient would purchase the product or service with the debit or credit card and without a separate gift card, code, or certificate. Just as credit card companies receive a small percentage of each transaction, the gift card system disclosed herein can also deduct a small percentage of each gift card transaction, share it with the credit card, or debit card system. The gift card managing entity 228 can obtain payment for use of the gift cards in a variety of ways.

Feature 212 of FIG. 2A is an optional feature that represents a notification to the giver and/or the recipient after the transaction. One example of this step includes providing information on a physical receipt associated with the qualifying transaction, stating something like "Happy Birthday Mom. I hope you enjoyed your dinner." The notification acts as a reminder that the giver provided the virtual gift card for that particular transaction. Email notifications can also be provided to the giver, recipient, and/or a third party. After the giver gives the virtual gift card, the giver may desire to receive a notification when the recipient redeems the. After the giver sends the virtual gift card, the giver can receive an email that identifies that the recipient used the gift card for dinner on a certain date. Any timing mechanism can be applied. Furthermore, the system can send an email or other communication to the recipient after the qualifying transaction that can provide a further personalized message from the giver such as "I hope that you enjoyed your dinner, thanks for all you do." The after purchase notification can also include details about the policy for any remainder amount. The notice can state "I hope you enjoyed your Olive Garden Gift Card! You have 15 remaining on this gift card for your next Olive Garden purchase. After 6 months, if not used, the 15 will be transferred to your debit account automatically [or be cancelled, or be transferred to a third party, or any other option according to the policy]."

Third party notifications are not limited, however, to the merchant and the system can send a notification to any other person or entity. For instance, a brother who gives his sister a gift card for her birthday can instruct the system to notify her husband when she has redeemed it and what it was redeemed for so that the husband does not purchase the same or similar item for her birthday or so the husband can purchase a matching accessory.

The new process outlined in FIG. 2A provides an easier mechanism to transfer a virtual gift card money amount from a giver account to a recipient account in a manner that is transparent to the recipient. This process can be managed by a specific policy such that even if the gift card amount or remainder is forgotten, it is never lost and always managed according to a policy. Reminders can be sent prior to the remainder amount being cancelled or transferred to an account. The gift card is redeemed through an existing payment mechanism for the recipient and requires no codes, physical gift cards or coupons, and includes policies, reminders or processes to assure no money is forgotten or lost.

Often recipients will have multiple gift cards with varying amounts that they lose track of or have little incentive to redeem. These approaches provide a new result of reducing the barriers to obtaining a greater benefit from a gift card with far less effort on the part of the recipient and/or the giver.

Figure 3:
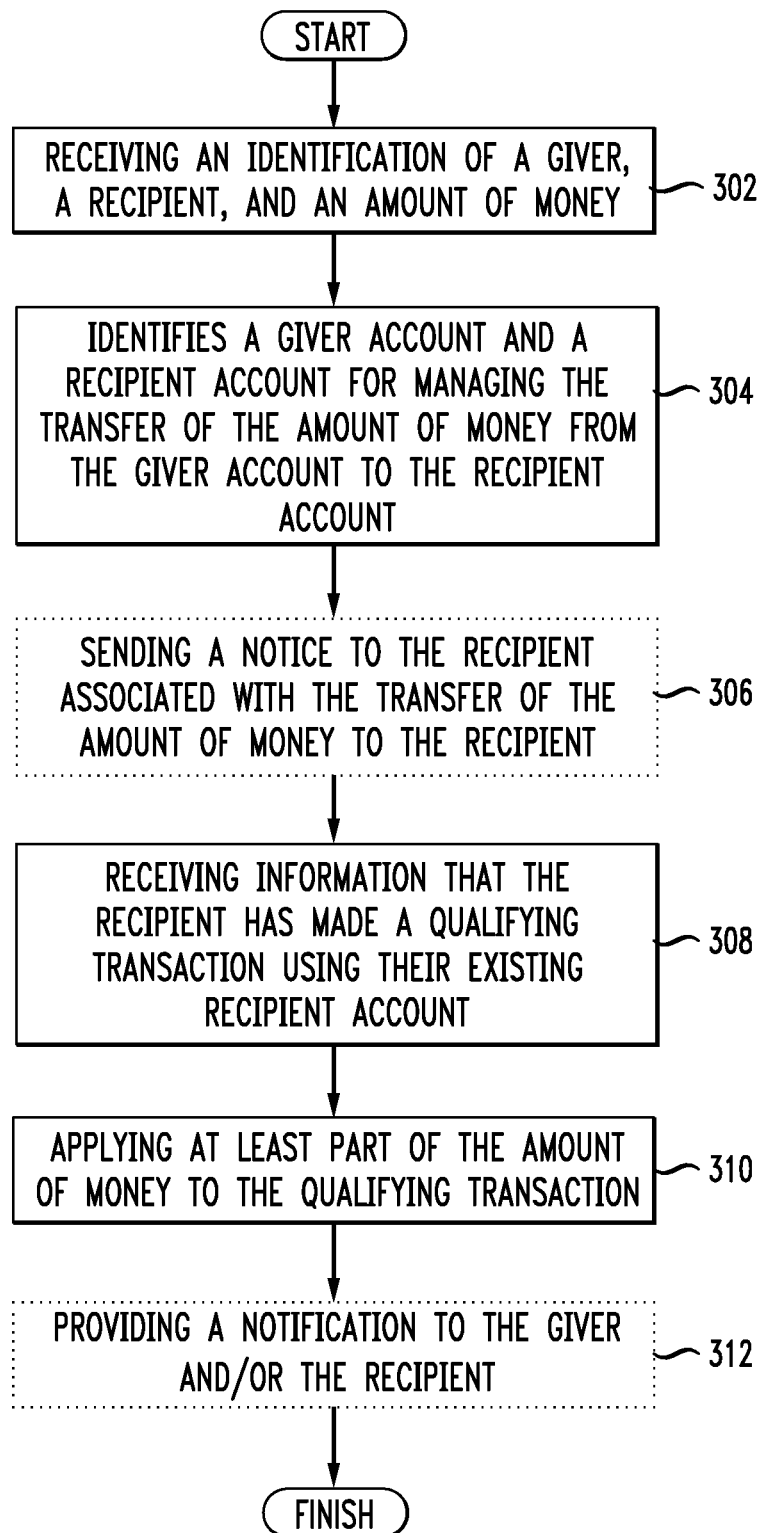
FIG. 3 illustrates an example method embodiment for processing a virtual gift card.

FIG. 3 illustrates an example method embodiment for processing a virtual gift card. The method may be practiced by an individual computing device or a computing device in communication with other computing devices within a network. One or more of the various computing devices can reside in a merchant bank, an acquiring bank, a giver account, a recipient account, a merchant, credit card association, a policy control entity or engine, and so forth. The system receives an identification of a giver of a gift card and a recipient of the gift card at a first time (302). The system identifies a giver account and a recipient account for managing the transfer of the amount of money from the giver account to the recipient account (304) or to a merchant bank according to a policy. The recipient account can exist prior to the first time and can be an open-loop payment mechanism that is not restricted to a particular merchant or shopping portal, such as a credit/debit card or checking account. An optional notice is sent to the recipient associated with the transfer of the amount of money to the recipient (306). As is shown above, the giver account and the recipient account each are an established account such as a Visa, MasterCard or American Express credit card and the like or a debit account. The information that is received in step 302 can further include a transaction processing policy such as how to handle the money amount if the recipient does not engage in a qualifying transaction within a certain period of time, and so forth. The policy can transfer any unused funds in the gift card to the recipient credit/debit card account after six months or based on any timeframe. One alternative to the method described in FIG. 3 is for the system to invite a potential recipient to establish a recipient account if one does not exist. The system can send a message in any form such as orally, text message, email, voicemail, etc. inviting the potential recipient to set up an account. The message can explain that someone wishes to give a gift to the potential recipient but that the potential recipient needs to setup an account for the gift giving to occur. The giver remains anonymous or the giver may reveal himself in the request for account setup. The message may optionally include a link to a page requesting the potential recipient's name and credit card information so that the recipient's account can be established easily. This scenario is useful when helping the technologically challenged navigate through the account set-up process.

Another alternative to the method described in FIG. 3 is for the system to set up accounts through another person for children or those that do not have credit/debit cards. For example, a mother can setup a giver or recipient account for her teenage daughter who does not yet have a credit/debit card with the mother's card information. The mother can make redeeming purchases on behalf of her daughter. In this way, it is possible to establish user accounts for the technologically challenged or underage givers and recipients.

The system receives information that the recipient has made a qualifying transaction using their existing recipient account (308), the transaction occurring at a second time which is later than the first time. The system then applies at least part of the amount of money to the qualifying transaction (310) in a manner according to whether the transaction is a credit or debit transaction for both the giver and the recipient. The system can apply the amount of money to the purchase to yield a remaining amount of money. Upon the recipient using the recipient payment mode to make an additional purchase, the system can apply the remaining amount of money to the additional purchase in a manner associated with the recipient payment mode or transfer the remaining amount to the recipient. Alternatively, the system can apply the amount of money to a purchase by processing a purchase history associated with the payment mode to identify a previously made purchase, and applying the amount of money to the previously made purchase.

An optional feature is the system providing a notification to the giver and/or the recipient (312). In one aspect, a transaction can trigger the use of more than one virtual gift card. For example, if the recipient purchases an item from Home Depot for $95 and has two virtual gift cards to Home Depot, one for $20 and one for $40, then the system can apply all available virtual gift cards up to the purchase price. The system can apply both gift cards for a total of $60 such that the recipient ends up paying $35 for the item.

The system can receive an identification of a giver of a gift card and a recipient of the gift card, and associate the giver with a giver account and the recipient with a recipient account. The system can associate a policy with the gift card and monitor transactions of the recipient using the recipient account. Then the system can receive information based on the monitoring that the recipient has made a transaction using the recipient account according to the policy, and apply an amount of money from the giver account for the transaction according to the policy.

The system can optionally receive a condition from the giver, and apply the amount of money to the purchase if the purchase satisfies the condition or according to a policy. The system can implement this optional step via one or more policy enforced at a merchant, acquiring bank, control engine, merchant bank, issuing bank, and/or other level in the virtual gift card processing infrastructure. The condition that dictates the policy can restrict the virtual gift card to a retailer, a group of retailers, a geographical region, a class of goods or services, an item, a time range, a date range, and/or a maximum per-transaction value. The system can apply gift cards based on policy limitations. For example, if a recipient has multiple virtual gift cards to a same merchant, when the recipient makes a purchase at that merchant, the system can apply the virtual gift card with the earliest expiration date. Alternatively, the system can credit the merchant at the time of the transaction, and then initiate a dialog with the recipient at a later time to determine which of the available virtual gift cards to apply to the transaction. If the recipient does not indicate which virtual gift card to apply, the system can apply a default virtual gift card. Any entity within the virtual gift card processing infrastructure can subtract a service fee (flat fee and/or a percent) from the amount of money associated with the virtual gift card. The service fee can be a recurring fee, a one-time fee, a per-purchase fee, and so forth.

The system can optionally receive from the giver a request to establish a subscription, the request indicating at least one subscription requirement. Then the system can establish the subscription to automatically apply a subscription amount of money to transactions of the recipient or applies a gift card amount according to a policy based on the at least one subscription requirement. The policy may involve just transferring money from a giver account to the recipient account. For example, the giver can set up at the beginning of every year a schedule of gift cards one week before the birthday of his or her family members and five best friends. The system can automatically carry out the notice and processing of the gift cards throughout the year. If a parent has a child at college, the gift card can be for any grocery store and a subscription causes $200 to be applied at the beginning of each month. This policy easily enables the recipient to simply use their virtual gift card (credit/debit card) at a qualifying merchant (grocery store) and it is applied on schedule according to the subscription policy.

Givers and recipients can receive notifications associated with the virtual gift card. For example, the system can notify the recipient of at least one of the amount of money, a condition associated with the amount of money, the payment mode, and the giver. The system can also notify the recipient that the amount of money was applied to the purchase, transmit a stored message to the recipient from the giver, and/or send a notification to the giver that the amount of money was applied. Notifications can include a description of an object of the purchase to which the amount of money was applied, a purchase time, a purchase date, and a merchant. The system can send notifications via email, SMS, instant message, tweet, social networking, automated voice call, physical mail, and/or any other suitable communication medium. The giver or recipient can interact with the notifications to be presented with options or information about the current policy for the gift card, and can interact with the notification to change the policy or modify how the gift card will be handled in the future. The recipient may want to regift the remainder amount to a third party and such option can be presented via a notification and then carried out under a new policy for the remainder gift card.

The system can provide for regifting of a virtual gift card by receiving a request from the recipient to transfer at least part of the amount of money to a third party and/or another virtual gift card still belonging to the recipient but having different policies. The transfer can be not as part of a purchase. Then the regifted gift card can then associate the at least part of the amount of money with a third party payment mode. Upon the third party using the third party payment mode, the system applies the at least part of the amount of money to the purchase in a manner associated with the third party payment mode. Part of the gift card may be managed by one policy and another part (the regifted part) by another policy.

Virtual gift cards can include bonus offers from third parties. The system can receive a bonus from a third party and add the bonus to the amount of money. The bonus portion of the virtual gift card can include its own policy or policies separate from other policies associated with the virtual gift card amount, such that when the bonus policy is satisfied on top of the other virtual gift card policies, the system applies both the virtual gift card amount plus a bonus amount to a purchase. The system can also provide notification to the giver, recipient, and/or a third party associated with the bonus that the bonus was applied by transmitting a stored message to the recipient, for example, from the third party. Such a message can be something like "I added $20 to Dad's gift card for dinner, have a big dessert!" In this manner, the system presents to the bonus giver, if authorized, information about the recipient gift cards and the identity of the primary giver.

The recipient of the virtual gift card can, in some circumstances, manage, change, or remove a policy associated with a virtual gift card. The system can receive a request from the recipient to use the amount of money to make the purchase outside the purchase condition, deduct a penalty from the amount of money according to the purchase condition to yield a reduced amount of money, and apply the reduced amount of money to the purchase in a manner associated with the recipient payment mode. As can be appreciated, the processing system disclosed herein provides much greater flexibility and possibilities when processing gift cards.

Gift Card Processing Infrastructure

Figure 4A:
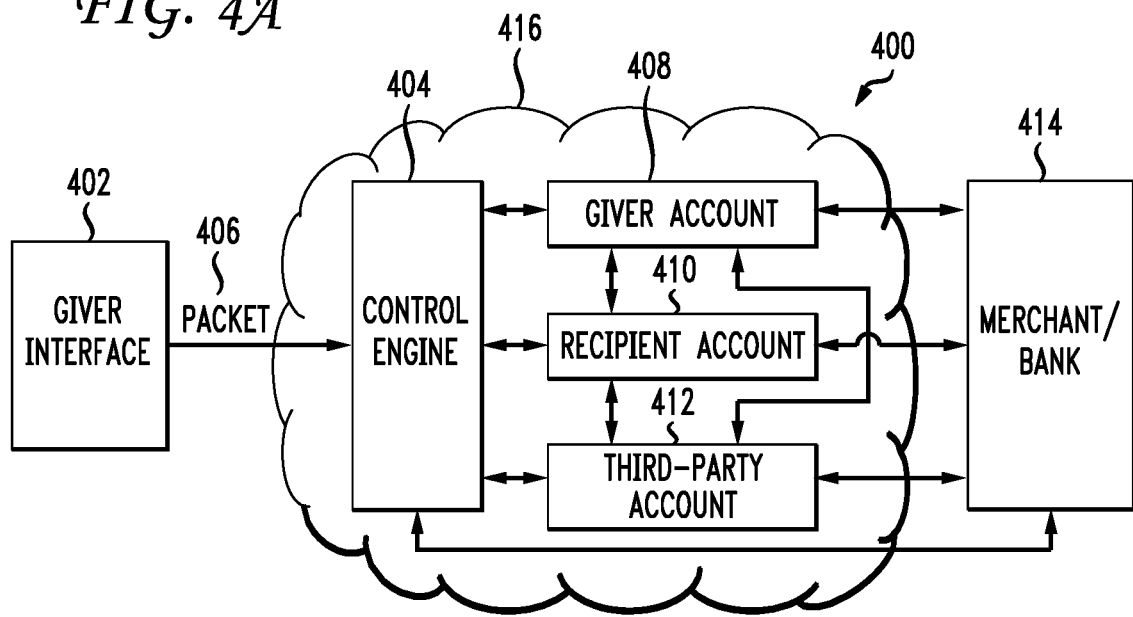
FIG. 4A illustrates a sample system configuration for processing virtual gift cards.

FIG. 4A illustrates an example block diagram 400 of a network 416 in which the system can operate. Network 416 includes various components that make the processing disclosed herein possible. A giver interface 402 is used in a variety of ways to receive initial information about the giver. For example, the giver interface 402 can simply be a web site accessible via a web browser in which there is an opportunity for the giver to provide the basic information to identify the recipient, the amount associated with the virtual gift card and so forth. The giver interface 402 can be a device such as kiosk, ATM machine, or gas pump.

The giver interface can function in different ways as well. A giver can come to a kiosk or an ATM with a physical gift card to use at a company such as the Olive Garden. The giver wants to transfer those funds for use according to the methods disclosed herein, effectively converting a physical gift card to a virtual gift card having a policy for its management. The giver can insert the physical gift card into a card reader of the kiosk that reads the amount left on the card, identifying information for the account and the restaurant such as Olive Garden. The giver can then insert their credit/debit card and the interface would therefore have the necessary information with respect to the giver (which in this case would be the actual physical gift card, a gift code, and/or a gift certificate as the "giver", the recipient, the amount and the recipient account). Optionally, the giver only needs to identify the recipient such that the recipient account can receive the gift card amount. This interaction enables a same person to be both the giver and the recipient when they have a physical gift card. This process easily facilitates the transfer of those funds from a physical gift card into a virtual gift card allowing usage of those funds via their standard credit/debit card. This provides a way for both givers and recipients to avoid the pitfalls associated with physical gift cards or with gifts requiring gift codes. This transaction, however, in one aspect, does not just transfer the money to the credit/debit card account. If the physical gift card is for the Olive Garden, the system retrieves that information from the gift card and applies it as a policy for the recipient. Therefore, the closed-loop nature of the physical gift card is carried over to the virtual gift card such that it is redeemed only at the merchant. The other aspects of the policy can also be applied, such as after six months of non purchases at the designated merchant, then the money is transferred to the recipient account, or any other desired policy.

Similarly, a giver interface 402 can include a website in which a giver types into a web interface a particular gift code that may or may not be associated with a physical gift card. The system can receive this information to identify an amount, the giver, and the company to which the gift card applies. Then the giver can also add their information as the recipient and therefore provide the necessary information via the giver interface for the remaining transactions to occur under the processes defined herein. In this manner, any recipient of a physical gift card can easily transfer that gift card to the virtual gift card system disclosed herein. The recipient no longer has to worry about losing the gift card or forgetting to use all the money on the gift card.

The disclosure temporarily turns to FIG. 4C, which illustrates an example packet 406 as is introduced in FIG. 4A. FIG. 4C shows packet 406 with various data fields. The exact names, types, sizes, and order of data fields in the packet are exemplary. The packet can be implemented in any variation thereof, including any combination or permutation of these and/or other data elements. These example fields include a security header 472, a general header 474, information about the giver 476, information about the recipient 478, a currency amount 480, a payment mode 482, a time associated with the virtual gift card 484, a location or geographic limitation associated with the virtual gift card 486 and another optional field 488 or fields. The amount can be in any currency: domestic, foreign or virtual. The system can automatically handle conversion between currencies, if needed. Some of the packet fields shown are optional. The use of such a packet enables a central control engine 404 to receive a single set of data associated with a gift card and carry out all of the transactions associated with monitoring recipient purchasing activities, apply gift card money as guided by the policy, and credit or debit money from the appropriate accounts.

The packet structure can allow for the information about the giver 476 and the information about the recipient 478 to identify more than one individual. The packet can include information about each giver 476 and recipient 478 in the form of, for example, an email address, name, account number, or other unique identifier. Further, in the case of multiple givers, the amount field 480 can include one or more sub-amounts corresponding to each giver. The payment mode 482 can be identified by credit card number, bank account number, routing number, club or loyalty card number, PayPal address, and so forth. In one case, the payment mode can be a user profile such that any payment mode associated with that user profile is able to use the virtual gift card.

As has been noted above, this packet, in one aspect, does not include any account information or credit card information for the giver or recipient. However, the packet does include a sufficient amount of giver and recipient information such that a control engine 404 can receive that data, and in a secure manner, identify the various accounts that are needed to transfer the money and manage the distribution of the virtual gift card funds as instructed by the packet and/or a policy. The security information 472 can be used according to those of skill in the art to ensure that at the giver interface, a fraudulent giver cannot log into the system and thereby inappropriately gain access to giver, recipient, or third-party accounts. The packet can be transmitted to a secure environment that stores the account data and carries out the transaction.

Based at least in part on data received from the giver interface 402, the system can develop a packet 406 as discussed above and shown in FIG. 9. The packet 406 includes the basic information to manage, create, trigger, or perform other actions associated with the virtual gift card and optionally the additional information. At a basic level, the packet 406 provides information about the giver, the recipient, the amount, and other management information about how the amount is to be applied. The packet can identify whether the giver account and recipient account are credit or debit accounts. The network 416 receives this packet at a control engine 404. This can represent a computing device, acquiring bank, debit card bank, issuing bank, and/or server within the network 416 that can manage the policy of distribution, use, and/or notifications associated with the virtual gift card. The control engine 404 can be part of or in communication with an acquiring bank. Network 416 can be the Internet, an intranet, a virtual private network, an encrypted network, electronic or fiber-optic network, and/or any other kind of network that can include a wireline or wireless network. Therefore, the giver interface 402 can also be a wireless interface via a wireless device with the appropriate software to enable communication of such information.

The control engine 404 communicates with the giver account 408 and a recipient account 410 and optionally with a third party account 412 and/or a merchant or bank 414. The control engine 404 can communicate with or operate on any one or more of these systems. For example, the third-party account 412 does not necessarily need to be involved in each transaction. Furthermore, the control engine 404 can optionally communicate directly with the merchant or bank 414. Accordingly, when a giver gives a $50 virtual gift card for the Olive Garden to the recipient, the control engine can utilize a default processing mechanism in which the giver account 408 is deducted by $50 and that money is held in a third-party account 412. In an alternate mechanism, the system deducts $50 from the giver account 408 and credits the recipient account 410 with the $50 directly but with no or some restrictions on that $50. One example of $50 being restricted or reserved is if the recipient account is a debit account and the giver has only $75 left in the debit account after the $50 is deposited. If the giver tries to make a $30 purchase, which would leave only $45 in the account, that transaction can be rejected inasmuch as that $50 is reserved and unavailable for use except according to the policy for managing the gift card. In either scenario, when the recipient makes a purchase of $50, for example, at Olive Garden 414, then those funds can be released from the recipient account according to the policy, can be successfully processed and the $50 can be paid to the merchant either directly or indirectly. In a direct scenario, the system transfers the $50 to Olive Garden's account. In one indirect scenario, the $50 is paid to Olive Garden directly from the recipient's account, and the system transfers the $50 to the recipient's account, thereby effectively reimbursing the recipient after the fact. Thus, the system handles the transfer of money according to the giver account (credit, debit, or other) and the recipient account (credit, debit, checking, cash, or other).

As has been noted above, the system can guide the flow of funds from the giver account 408 to one or more recipient account 410, the third-party account 412 and/or the merchant bank 414 in a number of ways. These varieties are disclosed above and not repeated here. In each case where gift card funds are applied to a purchasing transaction, any of the various scenarios can be used to process the gift card. The gift card funds can also be applied to non-purchase fund transfers. For example, if the recipient chooses to donate to a particular charity, the system can apply the gift card funds, still according to any policies in place, even though the donation is not a "purchase" of a good or service.

Figure 4B:
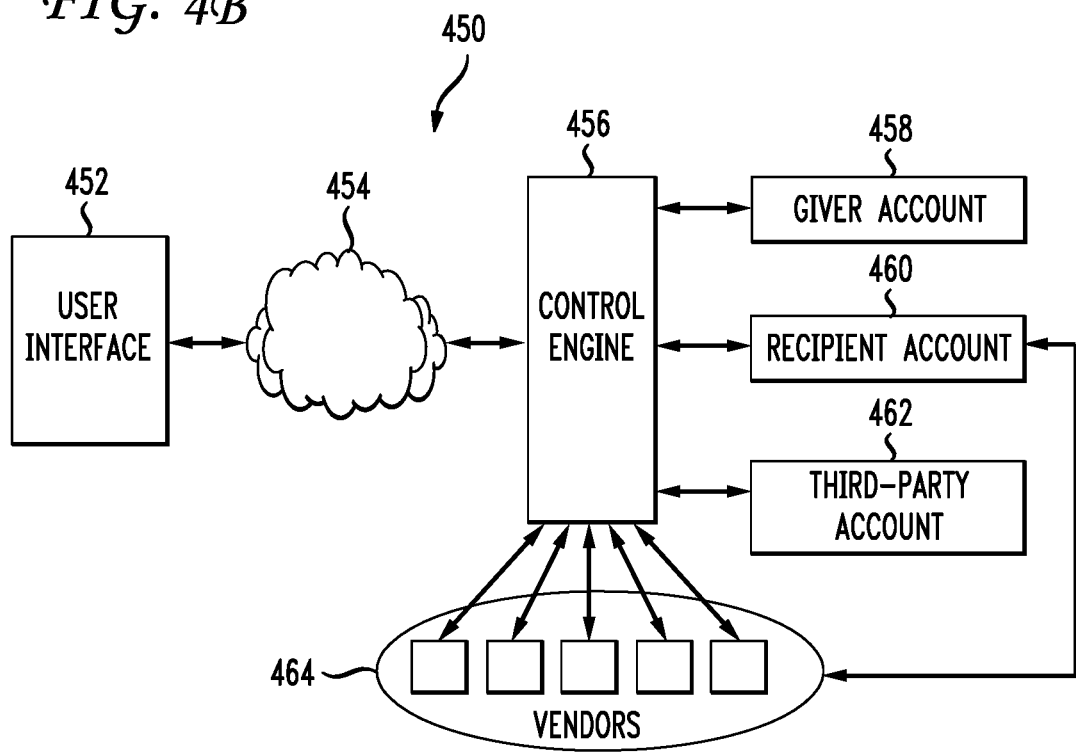
FIG. 4B illustrates a sample system configuration for processing virtual gift cards exclusively in an online retail environment.

FIG. 4B illustrates a second example block diagram 450 of an architecture 450 in which the system can operate. The architecture 450 represents a model operated by an online merchant such as Amazon.com. For purposes of illustration, Amazon is used herein to represent a generic online merchant in which the data about the giver and recipient are stored or received via a user interaction to process a gift card as disclosed herein. A giver of a gift card communicates with the control engine 456 through a network 454 via a user interface 452. The user interface 452 can be a web browser on a desktop computer or mobile device, an application on a desktop computer or mobile device, a telephonic interface, a text-message based interface, a kiosk interface, and so forth. The actual interface details can be implemented in any of a number of different ways, as can be appreciated by one of skill in the art. The giver has an account 458 with Amazon and desires to give a gift card to a recipient having a recipient account 460 with Amazon. Each of the user accounts for the giver and the recipient with Amazon can be associated with underlying bank accounts, credit cards, and/or PayPal accounts, for example. In an environment like Amazon, or Visa, MasterCard, PayPal, or any other universe of users in which account information is available, the system disclosed herein can be used to easily identify givers, recipients and apply policies to exchange gift cards easily and seamlessly.

The giver provides instructions to the control engine 456 through the user interface 452 to send a gift card to the recipient. The giver can provide partial information to the control engine 456 to identify the recipient, such as an email address, username or a first name, last name, and mailing address. The control engine 456 and the user interface 452 can provide the giver a way to select which types of information to provide. As the giver enters information, the control engine 456 and the user interface 452 can also provide feedback to the giver regarding the entered information. For example, if the giver enters a mailing address, the control engine 456 can look up the mailing address in the Amazon customer database and determine that three separate user accounts list the same mailing address. Thus, the control engine 456 can indicate to the giver that it needs additional information to disambiguate which of the three separate user accounts is desired and optionally prompt the giver to provide a specific type of information to disambiguate between the three separate user accounts. When the giver has entered sufficient information to identify the recipient, the control engine 456 can display, via the user interface 452, a confirmation of the identified recipient so that the giver is sure that the correct person has been identified. This confirmation can include any information, such as text, images, a purchase history, video, audio, personal metadata, a list of friends, and so forth, pulled from the recipient's Amazon account or other information available publicly or via other channels, such as a social network via an API call.

When the giver has identified a recipient with the control engine 456, the giver also indicates an amount of money to give as a gift card and, optionally, any restrictions, conditions, or limitations on the gift card. The amount can be fixed or dynamic. For example, as discussed above, the amount can be $50 to any item on Amazon.com. Alternatively, the amount can be a gift card including a restriction to a purchase of any HP inkjet printer from Amazon.com, up to a maximum of $200. The actual gift card amount is not determined until the recipient makes a purchase of the indicated item.

Because the control engine 456 controls the gift card implementation based on policies, handles the transactions, and controls (at least indirectly) giver and/or recipient payment accounts, the control engine 404 and the merchant or bank 414 of FIG. 4A are effectively merged into one entity in FIG. 4B. As part of the process of creating a gift card, the control engine 456 can withdraw funds from the giver account 458 and place them in a third-party account 462 until the recipient redeems or uses the gift card. Alternatively, the control engine 456 places a hold on the gift card amount in the giver account 458 until the gift card is redeemed. The hold can be a reservation of available credit on the giver account, which is charged when the recipient redeems the gift card. The control engine 456 can implement other fund processing variations as well. In one aspect, the user accounts 458, 460 at Amazon are proxies for actual bank accounts such that Amazon can deposit, withdraw, hold, and perform other operations on funds in the actual bank accounts. The control engine 456 generates a virtual gift card associated with the recipient account 460.

The control engine 456 can provide an optional notification to the recipient via email, the recipient's Amazon account, or some other medium. Then, the control engine 456 monitors each recipient purchase through Amazon.com to determine if the purchase matches the terms, if any, of the virtual gift card. When the control engine 456 detects a qualifying purchase, the control engine 456 can apply the gift card funds to the recipient account 460, keep the gift card funds as payment for a product or service Amazon provides, or transfer the gift card funds to one or more vendor 464 of the product or service purchased. The control engine 456 can redirect a payment to a vendor 464 for a purchase so that the purchase is made by the recipient as if the recipient pays with his own account 460 but the control engine 456 performs back-end manipulations to redirect the payment out of the giver account 458.

In one variation, the control engine 456 can update the interface for the recipient as the recipient browses the Amazon product catalog. For instance, if the virtual gift card is $50 for any item on Amazon.com, the control engine 456 can automatically reduce the prices listed on the various product pages as the recipient browses Amazon.com to reflect what the price would be if the $50 virtual gift card were applied. Therefore, the product page for a $120 boxed set of DVDs can show $70 instead of $120. If the virtual gift card has conditions, restrictions, or limitations associated with it, the automatically updated prices can reflect that too. For example, if the virtual gift card is $30 for a microwave oven, then the product page for the $120 boxed set of DVDs can still show $120, but a page for a GE countertop microwave oven is reduced by $30. Additionally, the control engine 456 can display automatically and/or manually generated promotions that are only redeemable when purchasing a product or service with all or part of a gift card. For example, Amazon may offer 10% off specific goods or services when purchasing with a gift card. A merchant may refund a certain money amount to Amazon when an item is purchased, thus awarding Amazon for directing sales to the merchant.

Gift Card User Interfaces

Figures 5E, 6:
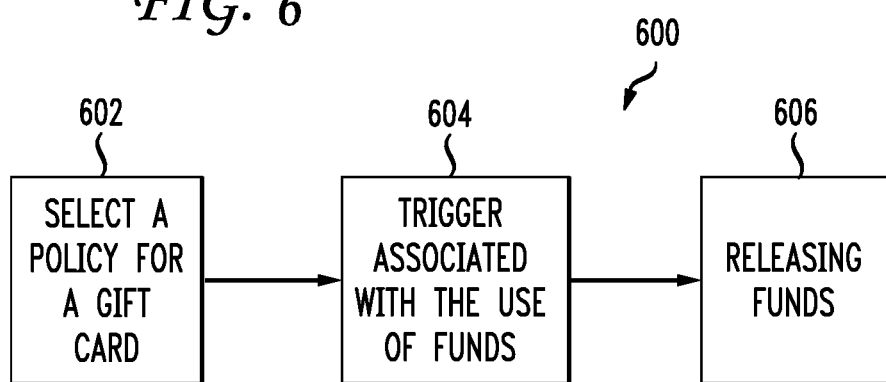
FIG. 5E illustrates an example reminder email to a recipient of an outstanding balance on a virtual gift card.
FIG. 6 illustrates a sample flow for a releasing funds of a virtual gift card.

The disclosure now turns to some example user interfaces, as shown in FIGS. 5A-5E. FIG. 5A illustrates a basic log in screen 500 where the giver enters credentials before entering into a giver interface to begin a gift card transaction. This provides basic information such as giver or recipient name 502 and a password 504, but can incorporate other authentication techniques, such as speaker verification, biometric identification, swiping a credit card (or other identification card) through a card reader, personal confirmation such as recipient high school, pet name, and so forth. The authentication can also be tied to a mobile phone number or other unique, user-identifying information.

FIG. 5B assumes that the giver has logged in and the giver's name is "George". Here, screen 506 illustrates a welcome screen for George, optionally including a greeting 508, and presents various specific options to George for giving a virtual gift card. The system can prepopulate various fields and menus using stored information about the user, George. If such a recipient name is not pre-populated, then the interface receives information from George that is sufficient via the packet or other appropriate approach, for the control center to identify an account for the recipient. The recipient list can be prepopulated based on previous gift cards or preentered names and information associated with various people that would receive a gift card from George. This can be presented in drop down menu 510 or via some other user interface component. George can identify recipients by name, address, email address, mobile phone number, bank routing number, credit card number, a gift-card specific account username, number, or address, any personal data from the recipient, and so forth. If the virtual gift card management entity is called VirtualGiftCard, potential recipients can register with VirtualGiftCard and establish a VirtualGiftCard identity such as recipient @VirtualGiftCard, www.VirtualGiftCard.com/recipient, or #recipient. These unique identifiers through a virtual gift card provider allow potential recipients a simple, easy to remember way to share their recipient identity with others for receiving gift cards. For example, a person who desires to be a gift card recipient can register their identity on VirtualGiftCard and share that identity with their friends, family, workplace, schoolmates, and even post it on Facebook or some other public forum or social network in order to elicit or otherwise promote others to give the recipient virtual gift cards. In an environment like Amazon.com, recipients can be identified based on existing user accounts very easily. Further, a person desiring to receive gift cards in this manner can create wish lists of desired items that the system shares with potential givers.

A recipient desiring to receive gift cards from a particular giver who does not have a user account can send a message via any communication medium such as email, text message, voicemail, etc. informing the giver that a gift card wish list exists for the recipient and encouraging the giver to establish a user account in order to give a virtual gift card. This solution solves the problem of a giver asking a recipient what they want for a special occasion and the recipient replying "I don't know". Once the recipient decides they would like to receive a gift card for particular goods or services, the recipient can send a message to the potential giver informing the potential giver that they have created a wish list for virtual gift cards.

The interface 506 shown can be an application or website, for example. Alternatively, the interface can be a JavaScript or other widget that pops up on another page, such as a Facebook profile page. In the example of a Facebook profile page widget, the interface can be pre-populated with the information of a person currently displayed on the Facebook page.

In one example of this scenario, George does not need to know the credit card number of the recipient. This provides a level of security with this interface in which George only knows the name, address, and/or other identifying data of the recipient. If such information is provided in packet 406 shown in FIG. 4A to the control engine 404, a certain threshold of confidence can be associated with identifying a particular recipient. The system can give some confirmation information to George, such as the recipient's city of residence, car model, spouse name, high school, pet name, or other information by which George can uniquely identify the recipient, to ensure that George knows that the system has identified the right person. However, such various security measures can be taken in manners to those of skill in the art in order to appropriately identify the correct recipient in field 510 so that thereafter the appropriate recipient account 410 can be utilized to process the virtual gift card.

Next, the giver fills in an amount field 512 or selects from a list of amounts from a drop down menu or other graphical or multimodal manner. The drop down menu can be pre-populated with a list of previous amounts given to this particular recipient, common amounts given, or suggested amounts based on the selected merchant, and so forth. The system can also analyze the recipient's purchase history and suggest an amount and/or a merchant. For example, if the recipient goes to a favorite restaurant every two weeks and spends an average of $65 per visit, the system can suggest a gift card to the favorite restaurant and base a suggested amount on the average, mean, mode, maximum or other suitable amount spent per visit.

Another field 514 provides a drop down menu (or other graphical or multimodal mechanism) of merchants, but other input forms can be used as well, such as predictive text entry, a web search, and so forth. Home Depot is shown but other merchants can certainly be used to fill in or prepopulate this menu. These can include merchants that have previously processed virtual gift cards or that have been used by the recipient.

The giver can enter other conditions 516 associated with the gift card based on a variety of factors. For example, George desires to provide a timing element for the virtual gift card. George can give the gift card to Rachel who is travelling to Italy for two weeks for her 10-year anniversary. As part of a gift, George wants to help support that vacation and limit the gift card's use to Rachel's purchases and costs incurred during that two weeks or related to that two weeks. For example, any purchase Rachel makes in Italy during those two weeks would qualify, but a purchase of swimming trunks 10 days before the trip can also qualify because it relates to the trip to Italy. Accordingly, George can attach other conditions, via a policy, in which a certain time frame and/or a geographic limitation is provided. Therefore, a variety of other conditions can be added to the virtual gift card to limit its use appropriately. If the conditions include a two-week window at a certain amount of time as well as a geographic location, then the conditional use of those funds can be based not on a merchant but rather on purchases made using the credit/debit card while in Italy during a two week period of time. In this way, George can tailor the gift card more specifically. A control engine, acquiring bank, card issuing bank, or other entity can monitor recipient transactions and compare them against the policy for applying the gift card funds. The recipient can also provide manual input to help implement a gift card policy. If the gift card is not used in the time frame, the policy can indicate that it is cancelled and the funds released, no longer held, or transferred back to the giver.

FIG. 5C illustrates an example notification email 518 which explains to the recipient 520, Rachel, that says, "George has sent you a gift card for Home Depot for $75. You can use the gift card by simply using your Visa card at Home Depot or at homedepot.com". The email can include a CC to the giver 522, in this case george@email.com. The notification is optional and can be provided via other communication modalities as well, such as voicemail, Facebook communication, tweet, SMS, personal call, a mailed letter or postcard, and so forth. The notification can include other instructions as well. For example, if Rachel is going on the 10-year anniversary trip mentioned above, then the message 524 can include, for example, "George has sent you a gift card for use on your 10-year Anniversary trip in Europe. The card is for $100 and will be credited or used for purchases made with your Visa during your two week trip only while you are in Italy. Enjoy your Anniversary!" In the case of purchases abroad, the virtual gift card can be converted to the foreign currency all at once or at each individual transaction, or however the system determines is the best fit given the cost of exchanging currency. For instance, if the $100 gift card is applied to multiple transactions, each exchange of currency can incur a $4 service charge plus a percentage of the amount exchanged. The system can wait until the two week trip to Italy is over, then exchange, in a single transaction, as much as is needed for the multiple transactions the recipients made to avoid incurring the currency exchange service charge multiple times. Alternatively, if the foreign currency is prone to fluctuations, the system can incur the service charge on a per transaction basis to avoid losing value due to a fluctuating exchange rate. A giver can choose to give a gift card in a foreign currency if they know the recipient will be in a foreign country to avoid per transaction charges and additional service fees.

These notifications can include targeted advertisements. For example, the system can perform an analysis of the recipient's general purchasing history, gift card based purchasing history, available balance on the gift card, interactions with the giver, an online shopping history, a location history, and other personal factors to generate a recipient advertising profile. Based on the recipient advertising profile, advertisers can target individual recipients and classes of recipients with custom tailored advertisements. The recipient advertising profile for gift card spending habits can be different than the recipient advertising profile for general spending habits. Thus, an advertiser can target the recipient based on the recipient's gift card spending history in order to extend a more attractive offer, promotion, or advertisement to the recipient.

FIG. 5D illustrates an email 526 that the system can optionally send to Rachel after she makes a purchase using her credit/debit card. The message 528 can include several details. For example, the message 528 explains how much of the virtual gift card has been applied to the purchase. Assume $29.64 has been applied to the transaction for a shovel purchased at Home Depot from a $75 gift card. The $29.64 is subtracted from the total $75 gift card amount to yield a balance of $45.36 remaining available for use at Home Depot or homedepot.com. The notice can provide this type of information as a reminder to use the remaining amount of the card or to provide the recipient with options to change the policy or apply part of the policy, such as reverting the remaining funds to go into their checking account. Optionally, the system adds a link to the communication so that Rachel can manage the gift card in a certain way. This also, as noted above, can include a CC to the giver of the virtual gift card.

FIG. 5E illustrates an exemplary optional reminder communication 536 from the virtual gift card services to the recipient, Rachel. This is one mechanism of managing the use of the gift card funds such that the funds do not go "stale" or get lost and thus never redeemed. The system can schedule gift card reminders to send to Rachel if she does not use the funds within two months or six months or any appropriate selectable time frame. The system can configure the optional reminders and their schedule, but the giver and/or the recipient can also configure the reminders. In one example, the giver sets a reminder schedule and the recipient modifies the reminder schedule via a web, telephone, SMS, or other interface. The message 538 explains that the email is a reminder of a $45.36 available gift card balance for the Home Depot purchase. There is also a further note that after December 1, the amount will revert to general applicability for any transaction at any merchant using the recipient's credit/debit card. This again is another optional safety mechanism so that the funds are never "lost" or remain unused. If the recipient never goes to Home Depot, ultimately at some point the system can simply apply the gift card funds to the recipient's first transaction that occurs after December 1. Other alternates exist in which the money can simply be credited to their account with a notice that George has given them a certain amount of money that is left over from the Home Depot gift card. The remaining amount can revert to the giver after certain conditions are met. The system can alternatively apply those funds as a refund or bill reduction on a credit card statement that is not tied to a specific transaction, but is instead simply a deposit.

FIG. 6 illustrates a series of steps 600 associated with the management of gift card funds. Step 602 includes selecting a policy for a gift card. This can occur via a default mode or a user selected mode to establish a certain policy or schedule for the distribution and use of the virtual gift card. One example of the policy is that the recipient is given six months in order to use the virtual gift card via their credit/debit card at a selected merchant or at a brick and mortar merchant location. In one variation, the system establishes a default policy for virtual gift cards. However, specific items, merchants, givers, recipients, or other entities or aspects can also include default and/or mandatory policies. The system can layer the different policies for a virtual gift card. For example, the gift card giver can impose a policy limiting the virtual gift card to clothing. The merchant can impose a policy limiting the virtual gift card to within one year of the date of the virtual gift card, and the credit/debit card issuer can enforce a policy that money spent with the virtual gift card does not apply to a frequent flyer or other rewards program. The system can combine each of these policies and enforce each of them on the virtual gift card. Each policy can include an expiration date after which the policy is not enforced. In one aspect, a minimum threshold of policies must be satisfied to trigger the application of the gift card funds, such as a transaction fulfilling at least 3 out of 5 policies in force. The system can notify the gift card recipient of the various policies when the card is received, when the virtual gift card is redeemed by making a purchase with the credit/debit card or at any other time. Merchants can also add incentives to those remaining amounts. The merchants would like to have the recipient come back to the store. So if $12.50 remains on the gift card, the merchant can offer to increase the amount to 15 or $20 to entice the recipient to come back. Such an offer can be for the next three weeks. As can be seen, a variety of was exist to use remaining amounts on gift cards and notifications with changes to encourage recipients to return to the merchant.

The system includes a trigger associated with the use of the funds in step 604. The trigger can be an actual transaction using the credit/debit card in which the funds have to now be applied and released for a transaction. The trigger can also be an internal time frame in which the funds have not been used or some external event. The trigger can include a series of triggers. In an incremental trigger example, each trigger in the series should be satisfied before the next trigger is evaluated. In a partial set of triggers example, a predetermined partial subset of the set of triggers will satisfy the set, such as "any single trigger" or "each of triggers 3, 4, and 8". In an entire set of triggers variation, every trigger must be met in order for the whole the series to be satisfied. Accordingly, the trigger can be after a period of time in which the recipient has not selected to use the funds. The system can arrange triggers to achieve complex functionality. For example, the system can arrange a first set of triggers indicating a date range of "January 1-January 31" and the merchant "Home Depot", a second set of triggers indicating a date range of "February 1-February 28" and any of the merchants "Home Depot, Lowe's, Ace, and Menards", and a third set of triggers indicating a date range of "March 1 or later" and no restrictions on merchant. The trigger can be a recipient, giver, or some other person's and/or device's location or some outside event for a specific purchasing transaction. This set of triggers provides a set of generality levels so that in January the gift card is applicable to a specific merchant, and if it is not used in January, then February the gift card is applicable to a specific set of merchants, and if it is not used in February, then the gift card is generally applicable to any merchant. One trigger can lead to another trigger. This incremental triggering approach could allow for the giver to receive awards when a purchase is made at a preferred store. For example, the giver could receive a certain dollar amount or discount from a preferred store when the recipient redeems his gift card at the preferred store. The giver could receive a 10% coupon for Home Depot when the recipient redeems a gift card of $200 or more. This scenario is a simple example and other variations on a giver reward program exist. The last step involves releasing or applying the funds 606 to a transaction which, as noted above, can either be releasing or using those funds for a particular purchase or can involve transferring those funds directly to the recipient account or to some other location. Then the policy can include a series of triggers that cause the system to apply funds according to the policy.

Gift card user interfaces can also enable the giver to blend a physical gift card with a virtual gift card. Often for birthdays, Christmas, Hanukkah or any gift giving the giver desires to have some physical object to wrap up. The system disclosed herein can enable a scenario where the giver buys a physical gift card having a code or a bar code. This can be a special gift card or a normal gift card purchased. Then the giver can enter the code or scan a bar code in an interface to identify that physical gift card. This can essential make the physical gift card the "giver." Then the giver can identify the recipient as disclosed herein. The interface can therefore identify the giver account as the physical gift card and the recipient with the associated recipient account. Absent any other user interaction, the policy for the recipient redeeming the gift card can be based on the physical gift card. For example, if the physical gift card was for a merchant such as Olive Garden for $50, then the policy will apply accordingly, with any additional settings such as how to handle remainder amounts. The giver may be also able to modify the policy for the physical gift card.

Under the above scenario—the giver can actually give the physical gift card for a present. However, the giver can then explain or send a message or communicate in some way that the physical gift card has been associated with the recipient credit/debit account and all the recipient needs to do is make the purchase at the merchant using their credit/debit card. The recipient can therefore throw away the physical gift card since it is no longer needed. This achieves all the goals of being able to give a physical gift for the moment, but then handle the possibility of losing the physical gift card or forgetting that money is still on the card since the policy is applied to monitor the recipient purchases and is applied for that gift card. Any recipient of a physical gift card could also associate the gift card with the credit/debit account in the same manner.

Gift Card Management Portals

The disclosure turns to a discussion of management interfaces for virtual gift cards. FIG. 7 illustrates an example portal 700 in which users, including givers and recipients, can manage their various gift cards. A network-based server and/or a local server can provide the portal 700 in which the recipient receives a number of different virtual gift cards. The prior art approach for dealing with such gift cards is to simply carry physical cards around in one's wallet or store them at home or elsewhere. The remaining amount on those particular gift cards is easily forgotten and not always easy to retrieve. This ultimately leads to wasted funds or the funds can revert to the merchant through fees or inactivity. It is almost impossible for the recipient of the gift card to remember how much money remains on the cards, especially if multiple gift cards are received at the same time. Accordingly, using the system disclosed herein, a recipient can manage, identify, and view a variety of gift cards all in one location. Portal 700 illustrates all of the gift cards for one recipient or for one payment mode (such as a checking account, Visa credit card, or PayPal account). Information 702 identifies a gift card from George to Rachel for use at Home Depot for $175. Information 704 identifies a gift card from Ryan to Rachel for use at Best Buy with $42.17 remaining. In this case, a purchase of Boom Blox Wii on 9/17/10 is identified and thus the history and use of that gift card is presented. Information 708 identifies a gift card from Linens'N'Things for $25 which is identified as expiring on 12/31/10. This gift card is actually one directly from a store (i.e., a merchant is the giver) and has an expiration date and such expiration date is identified on the report 700. Such merchant generated gift cards can be automatically or manually generated based on purchase history of the recipient, combined with inventory or other data.

In this portal 700 interface, the recipient can easily review and browse information about all of the various virtual gift cards that they have received and thereby easily be able to manage these gift cards, change policies if allowed, merge gift cards, regift, and obtain information about the use of these gift cards. This interface can also include a menu for additional options, such as regifting, merging, sending a thank you message to the giver, and rejecting or returning the virtual gift card to the giver. The recipient can even add money to his own gift card. The recipient can regift a received gift card even if the recipient has already purchased a desired item, Boom Blox Wii, from Best Buy using the gift card from Ryan 704 and has no further need for the remaining balance on the gift card. The portal can provide a way for the recipient to identify a regifting recipient and transfer all or part of the remaining balance to the regifting recipient as a new virtual gift card. The recipient can also add an amount to bump up the amount to a round number. For example, the recipient can add $7.83 to the remaining balance of the Best Buy virtual gift card 704 to make an even $50 virtual gift card for a new recipient. The portal 700 provides the recipient with an easy mechanism to view and manage each gift card according to policies associated with each gift card. The recipient can even be allowed to override the policies in some instances, such as for a fee or after a threshold duration, such that the system handles the gift card funds differently for the new recipient. Such opportunity may be set by the giver, system, or any appropriate entity. All the options disclosed herein for a giver are available to the recipient (as a new giver) who is regifting all or a portion of a received gift card to a new recipient.

FIG. 8 illustrates an example portal 800 for use by a giver. In one embodiment, both portals 700, 800 are integrated into a same web interface so that a giver can manage all received and sent gift cards in one location, but the portals 700, 800 can also be completely separate. Just as a receiving party can have a portal as shown in FIG. 7 to identify all of the received cards, a portal 800 can be presented for those who send gift cards. Here, information such as found in rows 802, 804, 806 and 808 can identify the date a gift card was sent, the recipient, the amount, the merchant, the current status, and additional optional actions which can be taken, such as send a message, send a reminder or suggestion, or any other additional communication option for the giver to communicate with the recipient. Accordingly, the system can present other options for such communication or using other communication means. For example, the interface can include a telephone in which the giver can directly call, such as via Voice over IP (VoIP) from this interface to the recipient and talk about the virtual gift card or any other topic. In one variation, the portal 800 can include an option to send a copy of the virtual gift card again in a year or at some other interval. In the case of birthdays, the option to send again can include the ability to increase the amount by a specific dollar amount, based on inflation, or based on some other criteria. In one embodiment, the virtual gift card can be triggered by some behavior, such as a recipient earning straight As on his or her report card. Such data can be defined by a social network or other general data source. The system can monitor the appropriate information source for fulfillment of the trigger, the system can activate the virtual gift card and/or send a notification to the giver and/or recipient that the virtual gift card is active. Further, the system can send a notification of the trigger to the giver for approval before activation.

FIG. 9 illustrates an example interface for managing policies associated with sent and/or received virtual gift cards. In the interface 800 of FIG. 8, the giver can click on the row 802 for Tom Jones to expand a list 902 of available and/or applicable policies. The list can be a compilation of different policies from different sources or a single policy encompassing each presented aspect. This interface is exemplary can be interchanged for other interfaces. This interface provides a list of valid merchants as a policy, which the giver can revise, add to, or remove before or after the virtual gift card has already been sent to the recipient. The interface provides a way to manage the expiration date. Some policies, such as the "split gift card" policy are controllable only by a recipient, so the giver interface disables and/or does not display these policies. Likewise, a giver interface can provide the giver a way to manage giver-controlled notification policies. Some aspects of notification are controlled by a third party or by the recipient, so they do not show up in the giver's interface. After the virtual gift card has been sent, the giver can modify the virtual gift card by applying promotions. Some of these promotions may not have been available at the time the virtual gift card was sent, but become available at a later time. At this later time, the giver can include these promotions in the virtual gift card. The giver can also indicate at any time that any promotions or class of promotions can be applied automatically when or if they become available. The recipient management interface can provide a similar corresponding way to view, add, manage, change, and remove policies on received virtual gift cards.

FIG. 10 illustrates an exemplary method for managing virtual gift cards. A system configured to practice the method identifies a user, which can be a giver and/or recipient of a gift card (1002) and retrieves a list of pending gift cards associated with the user, wherein each gift card in the list is associated with a payment mode of the user such that upon the recipient using a recipient payment mode to make a purchase, an amount of money associated with one of the pending gift cards is applied to the purchase (1004). The system retrieves current status information for the list of pending gift cards (1006). The system presents at least part of the list of pending gift cards to the user (1008). Users can access this information via a virtual gift card management portal such as a web site, smart phone application, automated speech interface, and so forth. In one aspect, the interface sorts the gift cards. For instance, the user can sort the gift cards by sent and received, date of the gift card, amount available or outstanding, merchant, friend, policies, etc. Through the interface, a giver can modify aspects of a sent gift card, such as increasing the amount on the gift card, changing the policies associated with the gift card, adding or removing payment modes with which the gift card is associated, etc. The virtual gift card management can be split into a section for sent gift cards and a section for received gift cards. The management interface can display the policies associated with each card, links to websites or applications of the financial institution providing the payment mode, such as American Express, Visa, MasterCard, a local bank, and so on.

Gift Card Promotions

The disclosure now turns to a discussion of adding promotions to a virtual gift card. FIGS. 11A and 11B illustrate interfaces for a giver to add promotions during a creation event of a virtual gift card, but a recipient can also view and accept promotional offers when the card is received, when managing a received card, when redeeming a received virtual gift card, when reviewing remaining amounts, and/or at any other suitable time. FIG. 11A illustrates a window 1100 for additional accessorizing, including promotions, or upselling of the virtual gift card. The giver, George, wants to give $50 to Rachel for use at the Sizzler restaurant. The system can identify different available promotions to "accessorize" the virtual gift card. Here, one promo 1102 is from American Express. A giver can select the promo 1102 with a checkbox or other input to require Rachel to pay via American Express and thus get an extra $5 added to the gift card amount.

It is presumed in one example that the system has already gathered information about Rachel and is aware that Rachel has an American Express card that can be selected. A promotion 1102 provides for an additional level of competition among credit card issuers. Rachel has a MasterCard, Visa and American Express credit cards. Clearly, American Express or any of the other card issuers desires to push more business their way for fees, rewards, loyalty, or other reasons. Card issuers can offer an additional bonus amount of money if the giver selects a card from that issuer. Therefore, if the giver selects promo 1102 then the ultimate notification that the system sends to Rachel can include the requirement that in order to redeem the virtual gift card, Rachel must using her American Express card at Sizzler. The system can optionally notify recipient Rachel that an extra $5 is being added by American Express to the virtual gift card amount. However, appropriate communication is made to instruct Rachel to use the American Express at Sizzler to redeem the virtual gift card. In this aspect, American Express either can increase the virtual gift card balance or apply a $5 credit to Rachel's American Express bill when the virtual gift card is used.

Similarly, the giver can limit the use by Rachel of the gift card to a weekday. Promo 1104 indicates that if Rachel uses the gift card on a weekday that he would get a free dessert. That box can be checked as a promotion by Sizzler in order to drive the recipient's behavior to come to the restaurant as a certain time, perhaps when it is normally slow. A communication would then have to be made to Sizzler, in which once the American Express (or other card) is used to make a purchase on the appropriate time (Monday-Thursday) and in the evening, then the dessert that would be ordered would be given free. Sizzler, or the merchant, either can increase the virtual gift card balance to cover the free dessert or handle the promotion side by applying the discount at the register or point of sale without affecting the virtual gift card balance.

FIG. 11B presents a potential widget in which the system has identified the giver as George, the recipient as Rachel, and the merchant as Olive Garden. The system has identified that Rachel typically uses, has used, or is eligible to use one of two payment mechanisms for purchases at Olive Garden: a Visa and a MasterCard. The opportunity presented to George in FIG. 11B enables George to choose between the Visa and the MasterCard. As is shown in the widget, Visa is offering an additional $2 to the virtual gift card and MasterCard is offering an additional $1 to the virtual gift card. The Olive Garden can offer an extra $10 if it is limited to lunchtime on Saturdays. This presents an opportunity for the credit card issuers to upsell or encourage the giver to select a particular card for redemption of the virtual gift card. The giver, George, can click the send button to complete the transaction. If George does not select either Visa or MasterCard, the system can present additional information to George that the most common card used by Rachel is the Visa card and that the Visa card is the default if no specific card is selected. The system can apply various algorithms in order to present this selection of Visa or MasterCard to the giver. For example, if the virtual gift card is for dinner at P.F. Chang's restaurant, the information presented to George can indicate that Rachel typically uses her MasterCard for restaurants and other such social or like purchases.

If Visa wants to shift that usage from MasterCard to Visa, Visa may be more willing to upsell the virtual gift card and offer more money in addition to the virtual gift card amount. In this respect, a system practicing this aspect of the disclosure receives information about the giver, the recipient including credit cards or debit cards as well as purchasing history associated with those credit cards and debit cards. An algorithm compares the purchasing history with information associated with the virtual gift card and the scope or the context in which the virtual gift card can be redeemed. The algorithm can then present to the giver options associated with the recipient's accounts that are tailored to the virtual gift card context and the purchasing history of the recipient. The system receives a selection from the giver of a selected payment mechanism (or no selection, which defers to a default mode) and then carries out the processing of the virtual gift card according to mechanisms disclosed herein.

FIG. 12 illustrates an example method of the promotion-related user interfaces of FIGS. 11A and 11B. The system identifies a creation event of a gift card (1202) and identifies an applicable promotion to the gift card (1204). Then the system presents the applicable promotion to a user, either a giver or a recipient, associated with the creation event (1206). The system receives input from the user indicating acceptance of the applicable promotion (1208). Then the system can incorporate the applicable promotion into the gift card such that upon a gift card recipient using a recipient payment mode associated with the gift card to make a purchase, a gift card amount of money is applied to the purchase according to the applicable promotion (1210). The system can present the promotions to a giver and/or a recipient. For example, when a giver is creating the virtual gift card, the system can present a first promotion, and when the recipient receives or after the recipient has received the virtual gift card (or notice of the virtual gift card), the system can present a second promotion which may be the same as or different from the first promotion.

A second example involves rewarding the giver when a recipient redeems the gift card at a preferred store or for a preferred service. For example, when the recipient redeems the gift card at Home Depot instead of letting the gift transfer to a dollar amount after a specific time frame, the giver earns a reward, such as a $5 gift card to Home Depot. The giver may choose to redeem it himself or give it to the same or different recipient that redeemed the original gift card. Not only does the recipient receive a benefit in this scenario, but the giver also receives a benefit when they give a gift card. Rewarding the giver provides the merchant a way to seek additional customers, i.e. the giver, to reward loyalty, and to track gift purchases in a more precise way. In this way, a healthy relationship can exist between a gift card giver and a merchant where all parties (the giver, the recipient, and the merchant) benefit from the giver giving a gift card to the merchant's store. While promotions can be handled manually, an automated promotions infrastructure can allow merchants, credit card issuers, and other potentially interested entities to set rules, policies, thresholds, and/or other guidelines for automatically generating promotions in a much more targeted and responsive way. The giver can build up over time rewards for giving gift cards. Entities offering promotions can manage these promotions and associated policies, rules, and so forth via a promotion interface. The promotion interface can also include analytics, statistics, billing, customer tracking, customer loyalty, overall retail performance, individual transaction performance, and other reports.

The system can also receive from a giver an identification of a recipient and a dollar amount for a virtual gift card. The system also receives from the giver an identification of one of a credit card/debit card issuer and a time frame associated with use of the identified card. Promotions can be time-sensitive, lasting for a limited duration. The system can also present to the giver various additional upselling items associated with one or more possible selections. The system then manages the redemption of the virtual gift card based on the received conditions in the policy set forth above.

Blanket upselling or offers can be provided with the gift card approach disclosed herein. For example, assume that Olive Garden, in their calculation, desires to bring more people in who have virtual gift card outstanding for their stores. The company can simple provide an announcement or an advertisement that states that anyone having a virtual gift card with money still on the account for the Olive Garden will receive an extra 10% off their meal if they come in the next week. The policy governing the Olive Garden gift cards can be centrally modified to handle such a promotion for everyone coming in and using their credit/debit card account. Such policies can also be modified on a store or region basis. For example, a study may show that there are an unusual number of gift cards for one city that are not being used. The scope of the offer can be for residents of that city. The policies for those gift cards based on geographic location (which can be determined by address of the recipients, address of the recipient account, or other factors) can be modified for such a promotion. Then if someone with an Olive Garden virtual gift card from a neighboring state uses their gift card, they may not then have that particular promotion applied to them because they do not fall within the regional scope of the offering.

The above idea provides an additional feature of how policies can be managed to upsell or add offerings to a single gift card or groups of gift cards. The offerings can be divided in any manner. There can be a "female" night at the merchant, or all patrons over 50 years old can get a discount. Such data can be identified in connection with the recipient account and so applied. Any personal or other kinds of data can be associated with a recipient account and therefore be used to modify policies or make additional offerings. In another example, the offering may be for any recipient who traveled to Mexico in the last year (and perhaps used their credit/debit card on the trip) gets a special discount on sporting goods. The activity of the recipient account can be tracked to trigger whether particular individuals comply with the offering.

All such recipient offerings discussed above also apply to the giver and giver accounts. Therefore, the offerings can be based on a study that givers of gift cards have been decreasing over time and that merchants desire to increase the numbers based on geography, demographics, usage history, or any other type of data that can be applied to a giver account. Thus, an example offering could be that any giver who went to a professional basketball game this year, (and perhaps purchasing their tickets using their credit/debit account), will get an extra $3 added to any gift card given in the next month. The system can obtain any such data about the giver or recipient through social networking, personal input to a website, tracking financial transactions, third party entry of data, or any other database. Such offerings for givers and/or recipients may also come from external events. For example, the offering may be if the Yankees win the World Series, then all gift card givers will have an extra $2 applied for all New York restaurant gift cards for the week after the game to celebrate. The combinations of triggering events for offerings and the scope of offerings is widely varied. The basic approach is that promotional offerings can be carefully crafted and controlled on any type of basis for a particular group of people to drive them to either purchase gift card, redeem gift cards, regift gift cards, or perform any event associated with gift cards as disclosed herein.

Such events could even include concepts such as modifying the policy associated with their cards. If a recipient has a gift card that is not tied to any merchant, a promotion may simply be that if that recipient will transfer that gift card to be only redeemable at the merchant establishment, then some value is added such as a free dessert or an amount of money added to the gift card.

An example of an external event is where the system may monitor web activity and determine that in a particular region, the number of web hits for certain cites such as Home Depot are on the rise or out of normal usage. The system can treat this as a trigger or be triggered by this detected data and cause a promotion accordingly. The promotion may be to all those in the region who have gift card money not yet used at Home Depot to come in and receive an additional value for using the gift card during a specific time. Such external events may include other things such as weather reports. If a storm is coming, this event can trigger a promotion to those with gift cards to Home Depot to get a discount when redeeming the gift cards in preparation for the storm.

To accomplish these functions set forth above, detecting systems for the various input can be used, which can then communicate with policy implementing and/or promotion intelligence engines which will determine a particular promotion and scope of distribution. Each individual may receive as part of a promotion a tailored promotion given various factors such as purchasing history, amount left on their gift card, income, circle of friends, policy for that card (such as 1 week left before it is going to expire or be distributed to the recipient account, or 6 months left), etc. The promotion can be therefore varied for individual cards and the policies associated with the gift cards or other factors.

In general, promotions can be triggered by manual input or automated input that is internal to the use of the gift card or external and/or based on group activities or trends. A promotion engine will receive the various input, compare the input to the group of outstanding gift cards and/or the policies of those gift cards. Data associated with the recipients and/or givers of the gift cards can be received. The promotions engine can then, based on the data, generate a promotion that has a high likelihood of encouraging recipients and/or givers to act to further use or give gift cards as urged by the promotion.

Gift Cards and Social Networking

Figure 13:
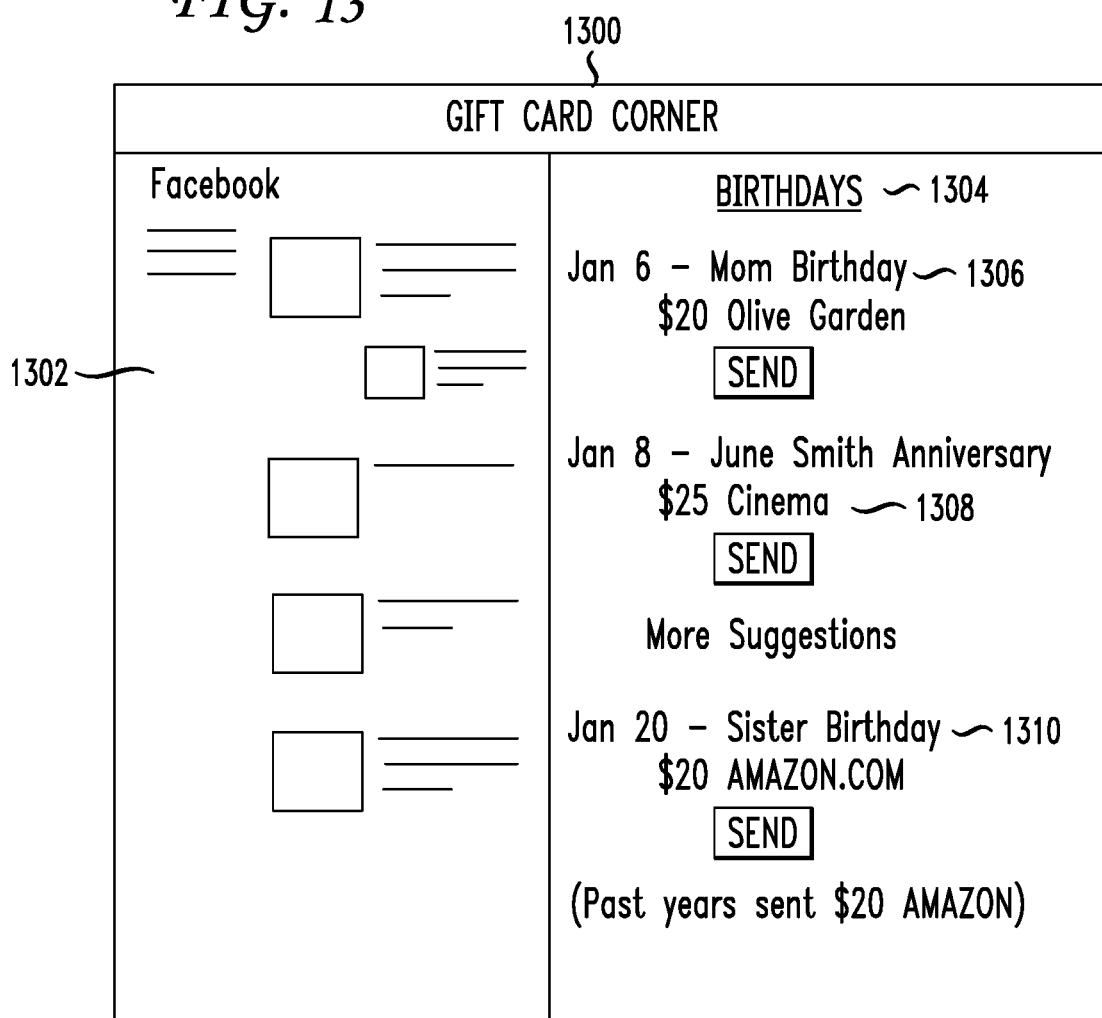
FIG. 13 illustrates an exemplary suggested recipient list of virtual gift cards in a social networking context.

The disclosure now turns to a discussion of virtual gift cards and social networking. The virtual gift cards identified herein also advantageously can be used in specific verticals and social networks. For example, FIG. 13 illustrates a Facebook page 1300 in which a virtual gift card can be applied. Window 1302 includes the typical Facebook information. The right portion of this page illustrates an example presentation of various pieces of information that can help the giver, a Facebook user who is currently logged in to Facebook, to give virtual gift cards in an efficient manner. Personalized information from Facebook about a giver, as well as various friends or family members identifiable via Facebook, other social networks, email contact lists, applications running on the Facebook platform, a gift card sent/received history, a calendar of upcoming events associated with friends and/or family, and/or other sources can be used to present opportunities to give a gift card and/or a predicted set of gift card recipients in window 1300.

For example, birthdays 1304 (or other special events such as anniversaries, graduations, engagements, weddings, holidays, and so forth) can be presented in a certain order in which Mom's birthday 1306 is identified as being January 6th, the system can present a suggested option of Olive Garden and $20 as a virtual gift card, in addition to the Send button. Because the system predicts information based on your friends and family, the gift card interface can present a "One-Click" virtual gift card. It is assumed that Mom has previously been identified in the Facebook system, the system knows who the giver's Mom is, and the system can appropriately identify Mom's account such that system can process the $20 from the giver's account to the Mom's account when a purchase is made at the Olive Garden using an existing credit/debit card. Where Facebook or an environment account does not have account information, then the system can communicate securely with a system that has the needed account data and/or can carry out the policies for gift cards. In this respect, a Facebook environment only needs sufficient data for the giver, recipient, account, and policies, to transfer that data to a system that can carry out the gift card process.

The birthday list 1304 can include other entries. One entry 1308 identifies June Smith has an anniversary coming up and suggests a $25 virtual gift card for Cinema 10. The system can generate other suggestions upon request based on an analysis of a number of factors, such as previous virtual gift card history, previous use of Facebook, previous amounts given via virtual gift card, what others have already given June Smith (gift card amounts and gift card merchants), and so forth. The system can identify and correlate this information in order to present suggestions in window 1300 for giving virtual gift cards from the giver.

The birthday list 1304 includes an entry 1310 for a $20 gift certificate for Sister through Amazon.com. Accordingly, the recipient can use that gift card in their next purchase on Amazon.com. The recipient does not need to keep track of and enter any gift card codes inasmuch as Facebook and/or other mechanisms appropriately identify the "Sister" to the giver such that the remaining processing can easily occur. This eliminates the need for the sister to enter a long alphanumeric code to receive a $20 virtual gift card associated with a transaction such as any purchase on Amazon. The display informs the giver that last year the giver sent a $20 Amazon gift card to the recipient. This information can help the giver determine an appropriate amount.

A social network site, such as Facebook, MySpace, Twitter, or the like, can provide individual "one-click" buttons to give a virtual gift card to a giver directly on the giver's profile page. For example, if George browses to Rachel's Facebook page on or shortly before her anniversary, the Facebook page can include a virtual gift card button that George can click to give her a $20 gift card instantly based on both of their account information available to Facebook. Inasmuch as the identity of the giver and recipient are already known, the system only needs to tap into the recipient account data and carry out the gift card polices. In one alternate embodiment, in conjunction with the "one click" option, the giver can click to expand and edit the gift card options. For example, George can click to expand the "one click" gift card, increase the amount from $20 to $40, and change the merchant from amazon.com to Macy's.

Scheduling Gift Cards

Figure 14:
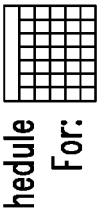
FIG. 14 illustrates an example virtual gift card scheduler interface.

FIG. 14 illustrates an interface 1400 that enables a giver of a virtual gift card or cards to schedule various recurring virtual gift cards. For example, a giver wants to schedule gift cards for significant events of certain close relatives or friends. The events can be scheduled for recurring events, such as a yearly birthday gift card or at some other interval such as an anniversary gift card every five years, or for one-time events such as a wedding, birth, or graduation. Row 1402 illustrates a schedule for the giver's Mom whose birthday is on April 1st. The giver can select various options such as reminder and preview, choose a dollar amount, choose identification of the card to be used by the recipient to redeem the gift card, and a merchant for redemption. Messages can be added such as "Happy Birthday" which can add to the personal nature of the communication. The giver can then schedule virtual gift card email to be communicated on a certain date in advance of the birthday. The reminder option instructs the system to remind the giver to send a gift card for a particular recipient and/or event. The reminder can include a gift card history for that recipient or event.

Further, the system can provide an optional pre-populated gift card request for the giver to confirm to initiate the gift card. The preview option is a variation in which the system sends a preview to the giver before sending the actual gift card. The giver does not need to do anything to confirm or approve the scheduled gift card. However, the giver can, based on the preview, transfer funds between bank accounts to cover the scheduled gift card, or log in to the gift card scheduler interface (or directly in the preview communication) to change any settings associated with the scheduled gift card, including cancelling the scheduled gift card. For example, the system can present a graphic or multimedia presentation to the giver illustrating the policy for that gift card. Changes to the policy would be shown in the graphic.

Row 1404 illustrates an example scheduled virtual gift card for Dad's birthday. Row 1406 illustrates a scheduled virtual gift card for Sister's anniversary at a certain date with a reminder box checked as well as the preview box checked. The amount is for $50 and is for a novel by John Grisham. The identification of what the virtual gift card is used for is not limited to a particular merchant but to a particular product regardless of the merchant providing the product. Whether the purchase is at a brick and mortar store or online, wherever there is a mechanism of identifying the item purchase, this virtual gift card would apply to that particular item. After the purchase of the novel, the system can apply the remaining funds, if any, to any purchase without limitations or transfer the remaining funds back to the giver, for example. The system can provide a message in the virtual gift card, in connection with a communication to the recipient associated with the virtual gift card, and/or on a store receipt.

Row 1406 also illustrates another point in which the scope of the virtual gift card can be modifiable. A typical physical gift card applies to a particular store or close group of stores such as the Olive Garden or any store within a mall. Because the recipient redeems the gift card by simply using a Visa card online or at a merchant store, the system can gather additional information about the purchase. Therefore, a grandfather gives a gift card of $500 to help his grandson simply buy a car. There is no particular merchant but the scope of the virtual gift card is based on the general description of an intended purpose for the virtual gift card. Therefore, as the grandson goes out and purchases a car, the system can process the $500 in any number of ways such that the virtual gift card is applied to that particular transaction for the grandson. In another example, a mother gives her daughter a monthly recurring virtual gift card of $100 for use at college. The mother can place a location-based restriction on the use of the virtual gift card to within 20 miles of the college campus and can also limit the use of the virtual gift card to purchases of text books, food, toiletries, and gas, regardless of the merchant or vendor. These types of more complex conditions or limitations on the gift card are unavailable with traditional physical gift cards. Thus, a variety of different ways exists for managing the scope of transactions to which the virtual gift card is applied.

Combined Gift Cards from Many to One

The disclosure turns to a discussion of another aspect of this disclosure, namely a group gift card. FIG. 15A illustrates an exemplary user interface 1500 for giving a group gift card to Tom for his birthday. In one example implementation, a group gift card is a way for multiple givers, such as friends, co-workers, or family members, to each contribute a small amount to a virtual gift card for one recipient. Thus, one friend contributes $2, another friend contributes $3, another friend contributes $1, a spouse can contribute $20, etc. The system takes all those contributions and combines them into a single virtual gift card for the recipient. This can be applied to weddings, honeymoons, baby showers, retirement gifts, and so forth.

While a group gift card can operate in many kinds of environments, the examples discussed herein are in the context of a social networking environment. For example, if Rachel's birthday is coming up, Facebook presents to all or part of Rachel's friends a popup window 1500 that includes information such as a title, a total amount of money collected from various givers in a group virtual gift card, and other information such as the largest giver. The largest giver is George who has contributed $10 to the virtual gift card. The display 1500 can include a number of total contributions as well. The system can analyze the relationship between the gift card recipient and the giver viewing the display to generate a suggested amount to contribute to the gift card. The relationship is a business acquaintance and the suggested amount is $10, but the system can suggest other amounts for personal or other types of acquaintances, family members, co-workers, and so forth, based on a variety of factors. The window 1500 can include a "one click" button to give the suggested (or other) amount, or the window 1500 can include a separate field or input element 1516 where the giver enters a certain dollar amount.

The group gift card works in the context of the present disclosure because the system gathers all of the various moneys into a single amount and gives that amount to the recipient as a single virtual gift card. Therefore, following the development of a group gift card, the system can present the recipient Rachel with an email or other communication that lists the 22 people that have contributed to a gift card of $61. There may be no identifiable scope to this use and it may immediately go into Rachel's Visa account or debit account. In one variation, each giver votes for a particular restaurant, merchant, vendor, or for a particular use. The givers' votes can have a one person, one vote weight or the vote weights can be associated with the amount of money contributed to the gift card. The social network, such as Facebook, can present a "game" to givers where each is encouraged to contribute more money to "beat" another giver for first place. One variation to encourage this type of game is to allow only the top contributor (or top N contributors) to select the ultimate gift card. In one aspect, the system can establish a contribution period during which social network friends can contribute to the group gift card. In another aspect, the system resides outside the actual social network and can implement the group gift card using contributions from multiple sources, such a gift card web portal, other social networks, kiosks, and so forth. At the end of such a process, the resulting virtual gift card can be for $71 for dinner at the Olive Garden which was what most of the contributors desired to define as the scope of the virtual gift card. A group dynamic can greatly enhance the experience of generating and compiling a virtual group gift card.

A human can initiate the group virtual gift card and become an organizer for the card. The organizer can set the terms of the gift card, the contribution period, and other aspects associated with the virtual gift card. The organizer can also filter messages to the recipient from the other contributors associated with the virtual gift card, and so forth. The organizer can decide, for example, whether to enable voting for the gift card merchant and can manually select a particular vendor, item, or other restriction for the virtual gift card. In one variation, the social network is the "organizer" and can maintain that role throughout the virtual gift card creation process or can hand off that role to a human participant. In another variation, the highest contributor automatically assumes the role of the "organizer". The system can hold contributed money in a third-party account until redeemed, transferred to the recipient's account, or otherwise used by the recipient. In the event that a group gift card is rejected or cancelled before the system completes the process, the system can refund the contributed funds to the contributors directly and optionally notify them of the failed virtual gift card.

The system can further provide notifications in connection with a group virtual gift card. For example, each contributor to the virtual gift card can include a personal message with his or her contribution. Then when the system notifies the recipient of the virtual gift card, the notification can include a list of all the contributors and their respective messages. The messages can be text, images, audio, video, documents, and/or other formats. The system can provide a notification to the recipient via email, SMS, web site link, Facebook post or other social network action, a printed and mailed physical greeting card, and so forth. Similarly, when the recipient uses the virtual gift card to make a purchase using their Visa card, MasterCard, PayPal account, or other recipient payment device, the system can notify all or part of the contributors that the virtual gift card has been redeemed, what was purchased, etc. The recipient can control those notification settings, such as who gets which notification, who gets a notification at all, what they will see, and so forth. Further, contributors can opt in or opt out of these notifications.

One example of a group card in operation can be a bereavement group gift card. If a spouse passes away, a bereavement email can be sent by a friend with a gift card request. People can easily each give amounts to the surviving spouse who can get a notice of how much is available for use on their credit/debit card at a very difficult time. Thus, various types of group gift cards can be applied in the system. This makes redemption very easy for those in need.

Figure 15B:
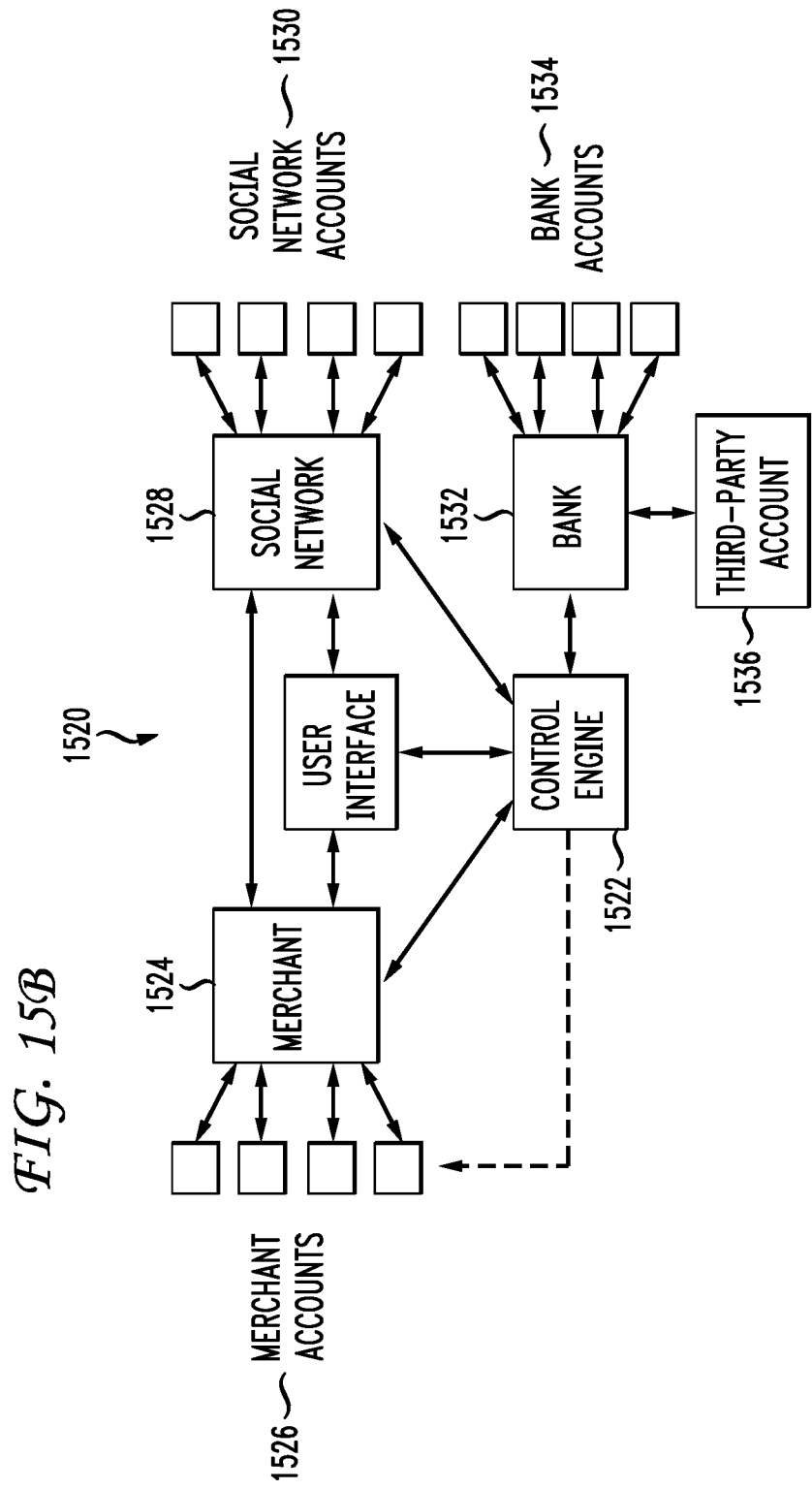
FIG. 15B illustrates an example architecture for interfacing between online merchants, social networks, and banks.

FIG. 15B illustrates an example architecture 1520 for interfacing between online merchants, social networks, and banks that can be used for individual or group virtual gift cards. This architecture 1520 allows a merchant 1524, such as Amazon.com, with established user accounts 1526 with the merchant 1524 to communicate with a social network 1528, such as Facebook or MySpace, with established user accounts 1530 with the social network 1528, for the purpose of processing (i.e. giving, receiving, managing, and redeeming) virtual gift cards. Further, a control engine 1522 can interact with the social network 1528 and/or the merchant 1524 to guide or control virtual gift card transactions. The control engine 1522 can communicate with a bank 1532 or other financial institution holding a group of bank accounts 1534 and a third-party account 1536 for holding funds in some virtual gift card scenarios. Some bank accounts 1534 correspond to the various accounts 1526, 1530 in the social network 1528 and/or the merchant 1526. The architecture 1520 can provide a user interface for the users on the social network, merchant, and/or control engine to manage virtual gift cards. The social network 1528, merchant 1524, control engine 1522, and bank 1532 can communicate with each other via established APIs for purposes relating to creating, delivering, notifying, and predicting related to virtual gift cards.

For example, multiple givers on the social network 1528 who each have a social network account 1530, want to give a virtual gift card good for a purchase at the merchant 1524 to a recipient who also has a social network account 1530. The social network 1528 communicates this information to the control engine 1522 via the API. The control engine 1522 communicates with the bank 1532 (which can represent one or more separate financial institutions) to identify bank accounts 1534 associated with the respective social network accounts 1530 of the multiple givers. The control engine 1522 reserves, withdraws, or holds funds for the virtual gift card from the identified bank accounts 1534, such as in the third-party account 1536, according to the type of account it is (e.g. credit or debit). The control engine 1522 can also identify the recipient's account 1526 at the merchant 1524 and credit the virtual gift card amount directly to that account. The control engine 1522 can also associate any policies and/or triggers with the virtual gift card. Then the control engine 1522 optionally sends a notice to the recipient of the virtual gift card via the social network 1528 or other communication modality. The recipient of the virtual gift card can then shop at the merchant 1524 and the control engine 1522 and/or the merchant 1524 applies the virtual gift card to transaction(s) according to the policy and/or triggers established.

Figure 16:
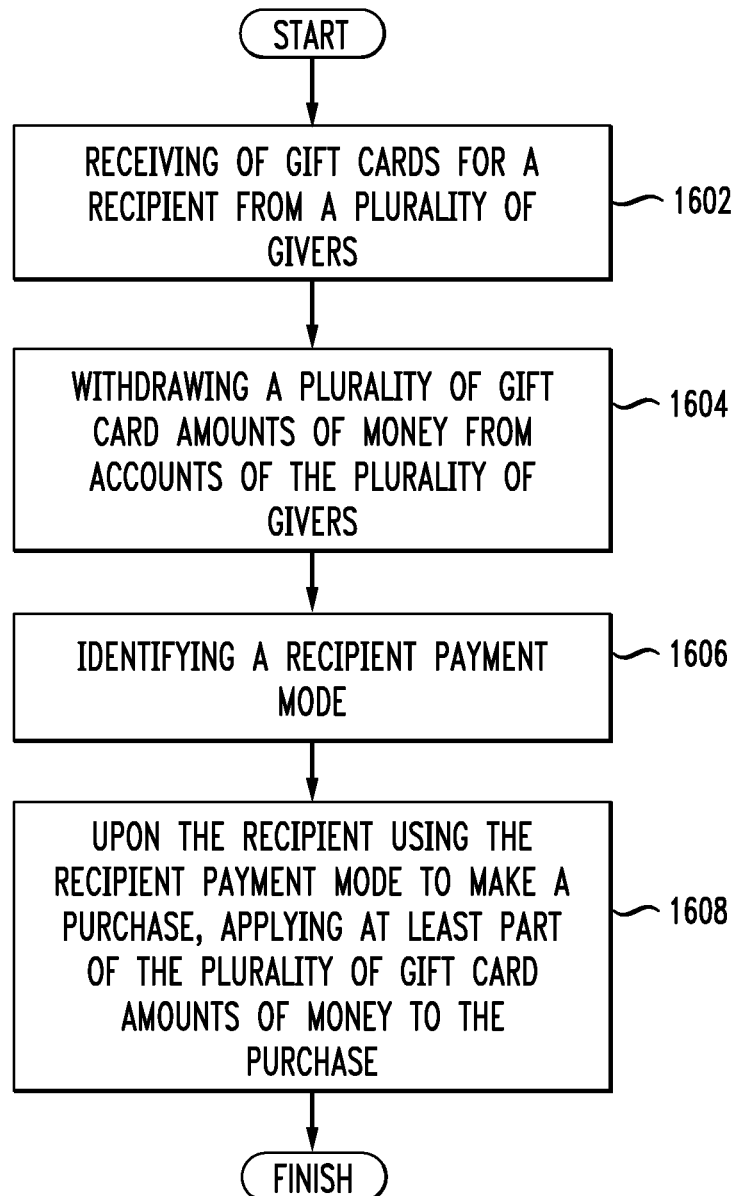
FIG. 16 illustrates an example method embodiment for a group virtual gift card.

FIG. 16 illustrates a method embodiment of this approach. In one variation, the system receives a gift card for a recipient from a group of givers (1602). Then the system withdraws a group of gift card amounts of money from accounts, or reserves credit available, of the group of givers (1604). The system identifies a recipient payment mode (1606). Then, upon the recipient using the recipient payment mode to make a purchase, the system applies at least part of the group of gift card amounts of money to the purchase (1608). The group of givers can be on a same social network, for example, or spread over multiple platforms, such as social networks, merchant environments, banks, and so forth.

Intelligent Transitions for Gift Card Options

FIGS. 17A-17D illustrate an aspect of this disclosure associated with intelligently transitioning gift card options, including virtual gift cards, at a web shopping portal such as Amazon.com. Here, a window 1700 illustrates a giver George 1704 who is shopping on Amazon. A particular context 1702 is arrived at in which an item is being viewed for purchase on Amazon. The system can present an interface to George for giving a virtual card 1706 to somebody. The interface can include a widget 1708 to enable George to select a particular person as a recipient of a virtual gift card. George can identify in other fields a particular amount of money, a message field for the recipient, an amount of money, and/or other options relating to the virtual gift card. All of this information can be combined in a widget 1708 or a small window that the giver can use to give a particular gift card to a particular recipient. The fields in window 1708 can be prepopulated based on the current context of George's searching within Amazon. For example, if George has arrived at a television set that is $800 to buy, then that amount of money can help to prepopulate information 1708 such that the virtual gift card that is ultimately generated from George can be associated with the particular product or service that is being searched on Amazon. Therefore, the virtual gift card can include a specific purchase of the item for the recipient or can include a presentation of a more standard virtual gift card for a certain amount of money. In one aspect, when a giver clicks Purchase 1710 in FIG. 17A, the virtual gift card can be created and transferred to the recipient either through an Amazon account generally or through one or more specific credit card that the recipient has on file at Amazon. In other words, if George selects to give a virtual gift card to Rachel, and Rachel has a Visa that is used in her account on Amazon to purchase items, then the virtual gift card from George can be processed through Rachel's Visa stored in her Amazon account. Otherwise, the virtual gift card can be redeemed directly via the Amazon account and not using the recipient's debit or credit card account.

Figure 17A:
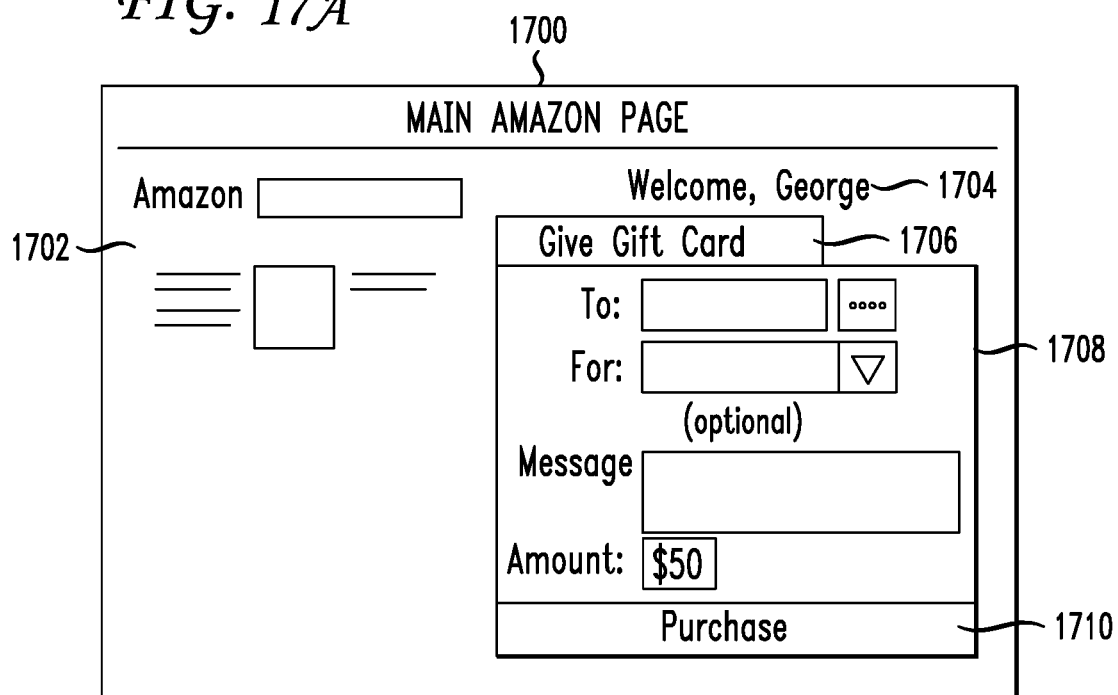
FIG. 17A illustrates a sample virtual gift card interface integrated at a main level of an online merchant.

FIG. 17A therefore illustrates an approach in which a virtual gift card interface can be presented that is dynamic based on a level of surfing an internet page. If FIG. 17A represents an initial beginning of a search at Amazon in which the giver has just logged in, then the presentation of a window 1708 can represent an opportunity for George to give a virtual gift card to somebody just for use on Amazon. This is because the context in this scenario is only based on being in the Amazon environment. Assume that George searches for the garden section and browses to the interface shown in FIG. 17B.

Figure 17B:
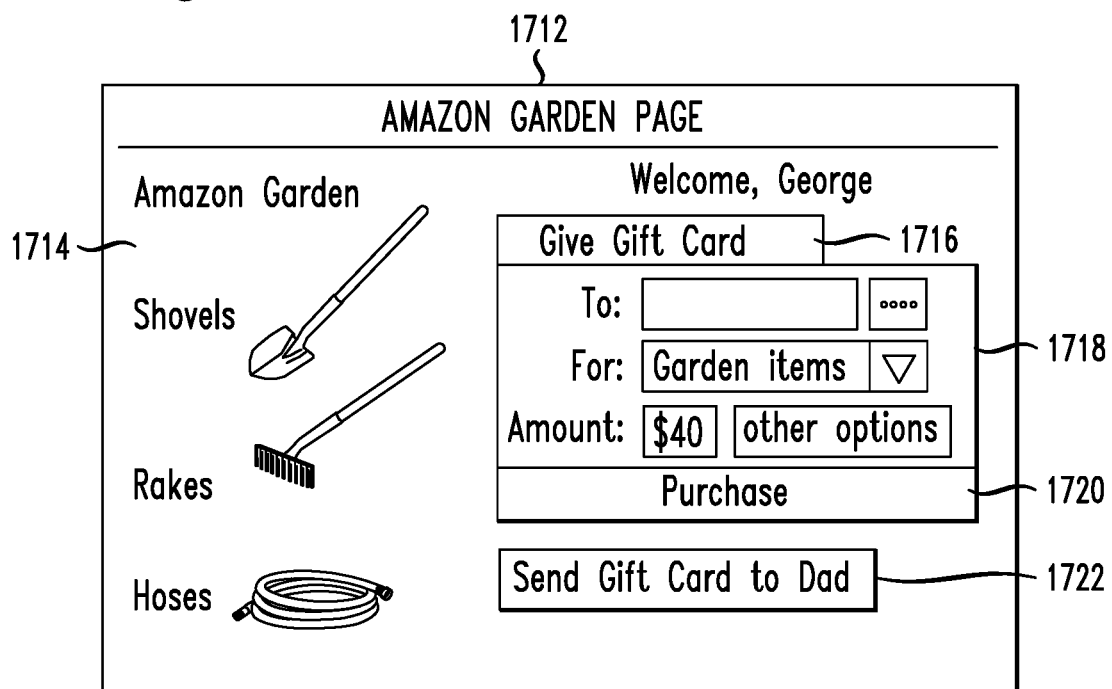
FIG. 17B illustrates a sample virtual gift card interface integrated at a general category level of an online merchant.

FIG. 17B illustrates a dynamically modifiable virtual gift card interface at a lower level. Here, assume that window 1712 represents a search such that the giver is in the Amazon garden environment 1714. Here, various garden tools and supplies are available. The widget 1718 that can be presented to give a virtual card 1716 can adapt to this context. As can be seen in window 1712, shovels, rakes and hoses that are available in the window 1718 can adapt such that the giver can select as the scope of the virtual gift card and can be dynamically modified such that garden items defines the scope of the virtual gift card. Therefore, when the giver uses field to select a recipient for the virtual gift card, and the amount is entered in field, when George hits Purchase in field 1720, then the virtual gift card that is given can have a dividable scope of garden items within the Amazon environment. Further, the system can analyze the contents of the window 1712 and generate a one-click button 1722 to create a virtual gift card for Dad or some other friend, relative, or acquaintance. George clicks on the shovel portion of the garden section and browses to the interface shown in FIG. 17C.

Figure 17C:
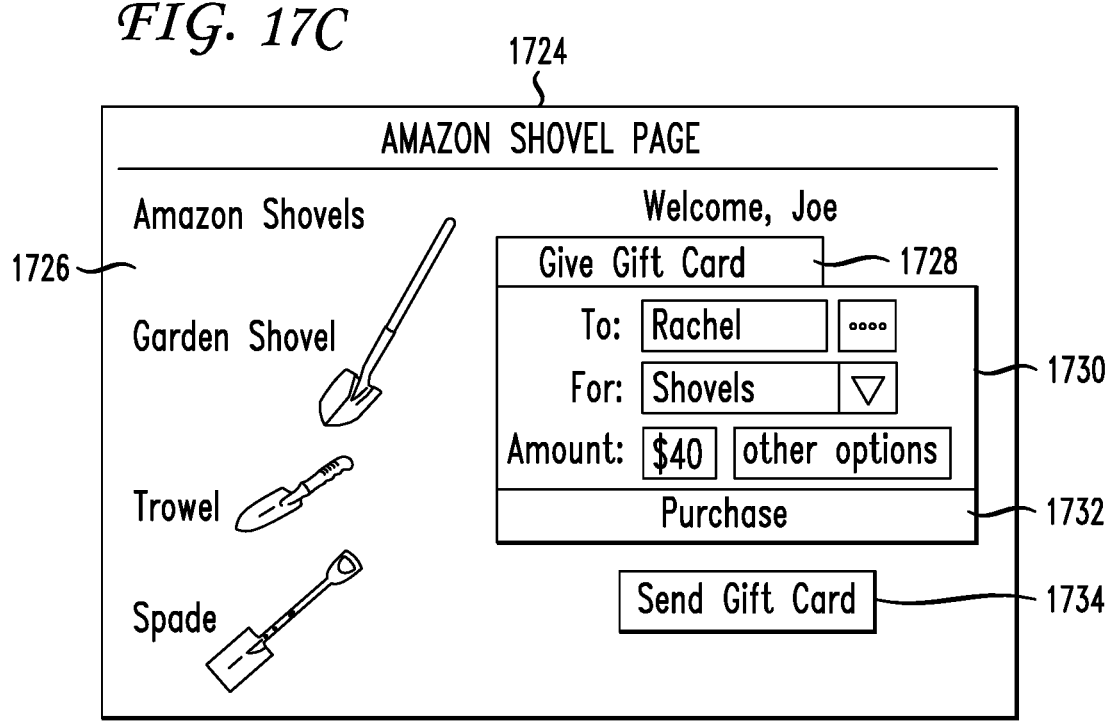
FIG. 17C illustrates a sample virtual gift card interface integrated at a specific category level of an online merchant.

FIG. 17C illustrates yet another layer. Here, assume that George has navigated to a more detailed environment within Amazon just related to shovels 1726. Window 1724 illustrates this level in which the dynamic widget 1730 presents the option to give a virtual gift card 1728 with a particular person who populates the To: field and the For: field is pre-populated with shovels. The system can also pre-populate an amount based on the average cost of a shovel and other options further tailoring the virtual gift card. The giver selects a "purchase" field 1732 and/or "send a gift card" field 1734 to send a gift card. George is sending to Rachel a virtual gift card with a scope limited to use for a shovel on Amazon.com. This is of course because of the context in which widget 1730 is presented based on the George's current search and/or other context information. George clicks on the space item of the shovel portion and browses to the interface shown in FIG. 17D.

Figure 17D:
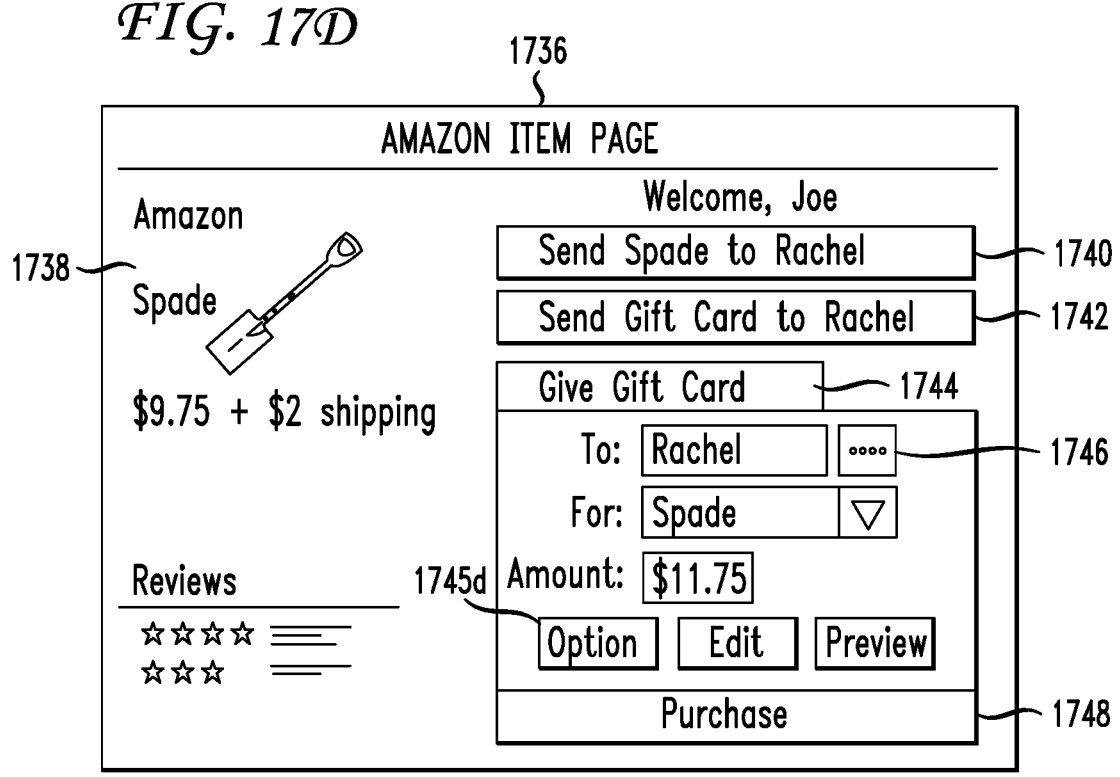
FIG. 17D illustrates a sample virtual gift card interface integrated at an item level of an online merchant.

FIG. 17D illustrates yet a more specific context of searching within Amazon in which a specific item such as a spade is identified 1738. Window 1736 shows review information and specific cost of $9.75 plus $2 shipping. Here, specific "One Click" options are presented such as "Send a Spade to Rachel" with button 1740. Another option is to send a virtual gift card to Rachel with button 1742. These specific "One Click" purchasing options can be presented in an environment such as Amazon where the various recipient and giver information is previously known. Widget 1746 also illustrates the various options of selecting who to send the virtual gift card to such as "To: Rachel" and "For: Spade" prepopulated with the particular spade that is being viewed. The system can also pre-populate an amount of $11.75 based on the price of the spade plus the estimated or actual shipping amount and provide various other buttons such as an Options button, Edit button, and a Preview button. The giver can then purchase a virtual gift card for the recipient manually, via a "one click" purchase, or purchase the spade itself and send it to the recipient.

As can be seen in the various modifications to the gift card options presented as the giver George navigates through a merchant website in FIGS. 17A-17D above, one aspect of this disclosure enables a dynamically modifiable scope when presenting an opportunity for a giver to decide whether to give a virtual gift card to a recipient. The policy that would govern the redemption of such a gift card given by George in the above example is dynamically changing based on the currently viewed web page. The system retrieved data from what is currently being viewed with respect to products, amounts, holidays (is it a Thanksgiving web page, Christmas, etc.?) the date, social networking data, etc., to dynamically predict and modify what policy would apply if the viewer were to create a gift card at that time.

FIG. 18 illustrates an example method associated with the feature discussed above. In one variation, the system identifies a giver browsing a page of a merchant web site (1802). Then the system retrieves account information of the giver (1804) and analyzes content of the page (1806). External data such as social networking data, the date, location, purchasing history, etc. of the giver and of potential recipients can also be retrieved and analyzed. The system can display a list of gift card options to the giver based on the content of the page. The gift card options can include a physical gift card for a recipient, purchasing an item for the recipient, and/or sending a gift card associated with a payment mode of the recipient such that when the recipient uses the payment mode to make a purchase, a gift card amount is applied to the purchase (1808). The system can optionally update the list of gift card options as the giver navigates to different pages of the merchant web site based on content of the different pages (1810). In a "one click" scenario, the policies, recipients, and so forth can dynamically change from page to page. On one page in which a stereo is being viewed, the system may present "George, give a $50 gift card to your dad for Amazon.com to buy this stereo for his birthday next week." George could one-click the interaction and the transaction is complete. As George browses to another page with a book about the Civil War, data may be used to present another gift card option: "George, you can, with one click, purchase this Civil War book for John who loves history and has a birthday in two weeks." Clicking on this option may present a gift card for John to purchase the book or may just purchase and send the book to John.

In another variation, the system receives information associated with the context of an internet search for an item. The system further utilizes the context for populating a virtual gift card interface for the giver. The system next receives selection information from the giver associated with generating a virtual gift card of having a scope. Finally, the system manages the redemption of the virtual gift card according to the scope such that the recipient can redeem the virtual gift card using a standard payment mechanism. In this manner, the system can intelligently populate and transition between what to offer the giver as they navigate from more general descriptions of goods and services to specific categories of goods and services down to specific items. This dynamically modifiable presentation of a potential virtual gift card will simplify and reduce the number or clicks necessary for a giver to commit to giving a virtual gift card to a recipient.

One example of the narrowing of the potential fields within a virtual gift card widget for a giver can be illustrated in the differences between FIGS. 17B and 17C. For example, the To: field in the widget 1718 of FIG. 17B does not show a prepopulated name given the context of the Amazon garden page 1714. The interface can include a prediction for the giver to send a card to Dad via the "one click" button 1722. The card would cover the scope identified in widget 1718, i.e. the card can be limited to use for garden items at Amazon and would be for $70. However, note that in FIG. 17C, the To: field in the widget 1730 is pre-populated with the name George. If the context information, which in this case is the Amazon shovels page, can provide a sufficient indicator of the likely desired recipient of that item or items or that category of items, then that information can prepopulate with widget for presenting the virtual gift card structured to the giver.

Predictive Gift Cards

Figure 19:
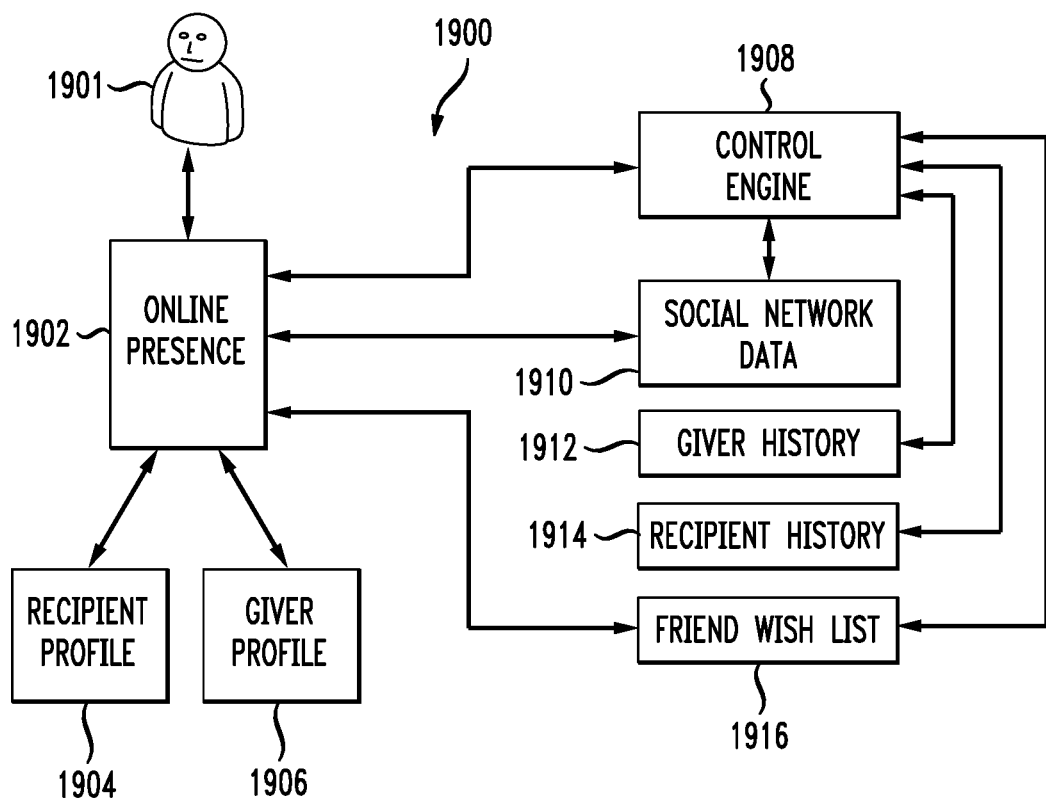
FIG. 19 illustrates an example system embodiment for providing a predictive list of virtual gift cards and/or recipients.

With respect to predictive uses of virtual gift cards, FIG. 19 illustrates a system 1900 that can be used for a predictive approach of presenting an interface for a giver of a virtual gift card. Online presence block 1902 represents an interface to the giver 1901 and what that interface presents to the giver. Specifically, with respect to predictive virtual gift cards, the interface 1902 can present to the giver 1901 certain predictions about what types of virtual gift cards the giver 1901 is likely to give. The system can tap in to and process various pieces of information in order to arrive at those predictions. For example, a recipient profile 1904 can be used for various recipients that are known to receive gift cards or virtual gift cards from the giver 1901. A giver profile 1906 can include information about the giver's previous habits, own purchases, and so forth. The system can analyze social networking data 1910 or other personal data sources to identify such information as birthdays, habits, preferences, location-based information, and activities of the giver 1901 as well as various levels information about friends, family and associates. For example, through the social network data, the control engine 1908 and/or the online presence information 1902 can retrieve birthdays of the giver's closest friends and family. This social networking data can be very valuable when predicting what virtual gift cards the giver desires to give. The giver history 1912, the recipient history 1914 and a friend wish list 1916 can also communicate with one or more of the online presence 1902 or the control engine 1908 to provide additional information that the control engine 1908 can use when predicting virtual gift card information. The control engine 1908 can utilize all or part of the various information, optionally assign weights to the various information, and combine it together to arrive at a prediction at any given time and based on any particular online presence information for the giver 1901 regarding what kinds of virtual gift cards the giver desires to or should give.

Figure 20:
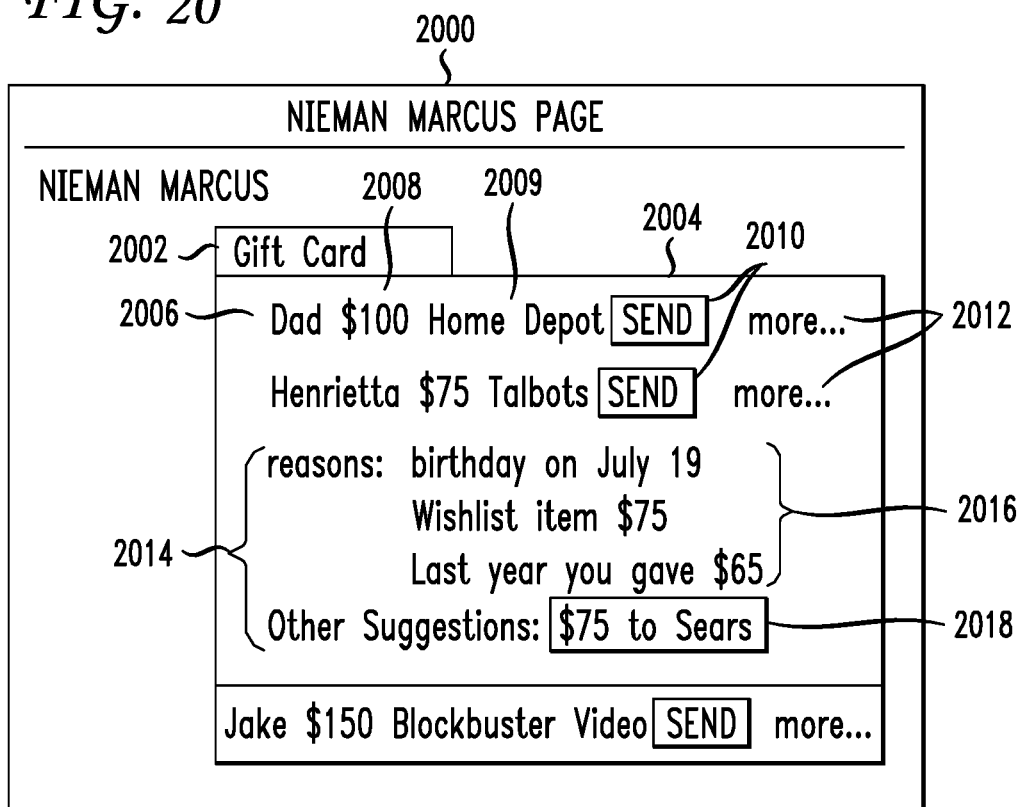
FIG. 20 illustrates an view of the example website with the predictive virtual gift card widget expanded.

FIG. 20 illustrates one example of how this approach works. Assume that window 2000 is the Neiman Marcus website and widget 2002 is presented that enables the giver to tap into and send a virtual gift card for Neiman Marcus or some other merchant. The widget 2002 can be a JavaScript or other popup, for example. A control engine can drive the behavior of the widget 2002 independent of the retailer web site. For example, the website 2000 is Neiman Marcus and the widget 2002 is offering gift cards for other retailers. The goal would be to use the predictive gift card mechanism in order to reduce the number of clicks necessary to actually have the giver purchase a virtual gift card and send it forth for processing. Assume that a giver viewing window 2000 clicks on the virtual gift card button 2002. The system can present a predicted gift card summary after the giver clicks, selects, hovers the cursor over, or provides some other suitable input related to the virtual gift card button. Given the context of information from one or more social networking data, online presence, giver history, recipient history and wish lists, and various profiles and so forth, FIG. 20 illustrates a predictive list of most likely recipients and that Dad 2006 should receive $100 2008 for Home Depot 2009. A Send button 2010 is presented such that if the giver decides to give the predicted gift card, a single click sends off that gift card to the right person with the right scope and for the right amount that Dad can redeem using his standard payment mechanism (Visa, American Express, MasterCard, etc.) at Home Depot. More information 2012 can be provided in case the giver desires to tailor the particular virtual gift card in a more detailed way. Policies can be set, modified, and so forth for governing the redemption of the gift card.

Other exemplary options shown include the potential that the giver would desire to give a gift card to Rachel for $75. The system can provide other information 2014 such as why this is as predicted. For example, if Rachel is a friend and not a Father then it might be less likely that the giver would know why Rachel's name came up below the Father. Birthday information, wish list item information and historical information are presented 2016 that can help inform the giver regarding the particular person's position within the predictive list. Other suggestions in field 2018 are also available. The giver can hit Send 2010 to send a $75 virtual gift card to Rachel. The giver can further expand the list to view more than the top persons on the predictive list and/or drill down for more information, secondary suggested gift card amounts or merchants for a particular predicted person, and so forth.

Figure 21:
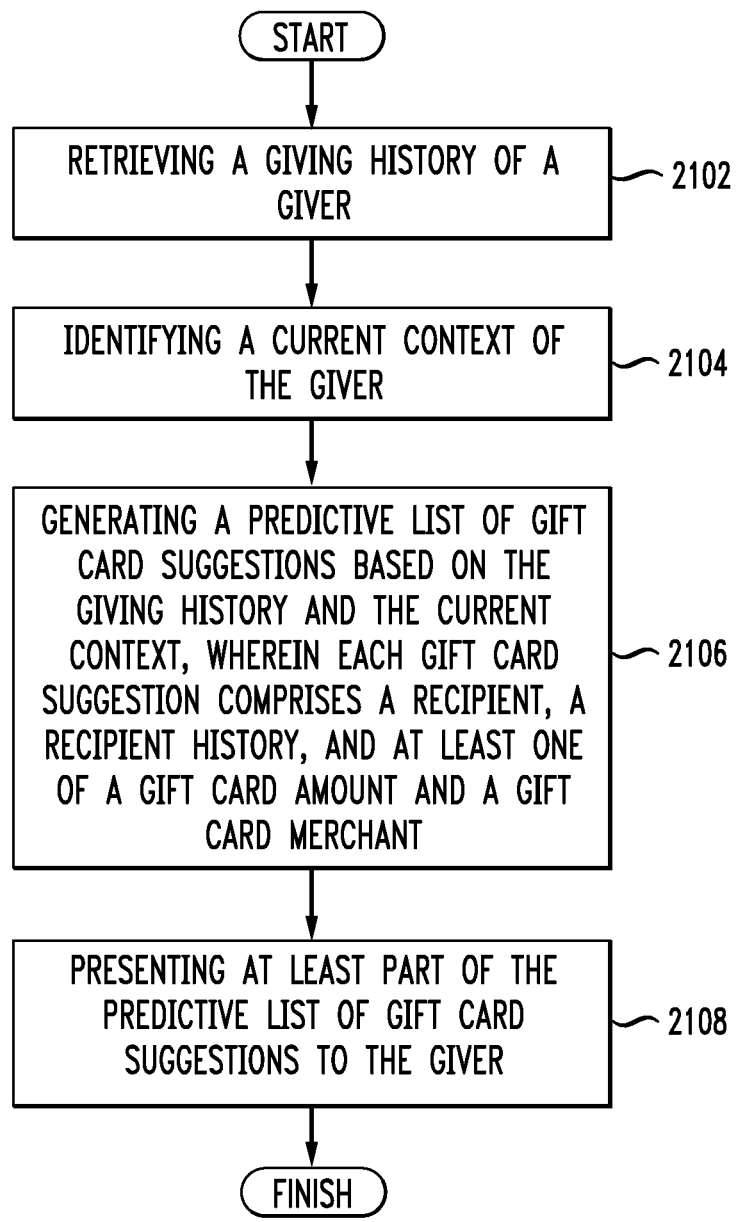
FIG. 21 illustrates a sample method embodiment for providing a predictive list of virtual gift cards and/or recipients.

FIG. 21 illustrates an exemplary method associated with the predictive process for virtual gift cards. In a first aspect, the system retrieves a giving history of a giver (2102) and identifies a current context of the giver (2104). The current context can include multiple information sources, such as a current web page view, a time, a day, recently purchased gifts, recently received gifts, a browsing history, recent communications, scheduled calendar events, debt owed, and so forth. The system then generates a predictive list of gift card suggestions based on at least one of the giving history, the current context, and other optional information (2106). A gift card suggestion can include one or more of a recipient, a recipient history, a gift card amount, and a gift card merchant, for example. Then the system presents at least part of the predictive list of gift card suggestions to the giver (2108). The predictive list can be based on a current activity and presented in the context of the current activity. Alternatively, the system can periodically (such as annually, monthly, weekly, or daily) analyze the giver's current context and send a notification, such as an email with interactive HTML components, of gift card suggestions. The gift card suggestions can include, for example, suggested amounts, recipients, and merchants. The system can provide a way for a giver to drill down and explore the reasons or motivation behind each suggestion. For example, the giver can click for more information on a suggestion for giving a $30 virtual gift card to a potential recipient for her birthday. The system can display to the user that the previous year's virtual gift card was $20 as a baseline, and explain that the suggested increase from $20 to $30 is based on inflation and on a personal or work relationship with the recipient that has grown closer over the last year. The system can also monitor the development of the giver's relationships with others, such as based on emails, social networking activity, life events, a change of school or workplace, and so forth, and suggest new virtual gift cards that are not based on a previously sent gift card.

In another variation, the system receives information from one or more sources including the social network data, giver history, recipient history, wish lists, giver profile and recipient profile. The system would process the received information to identify one or more of a predicted recipient, dollar amount, context, scope, and other data associated with the virtual gift card. The system presents to a giver according to a particular context, a predicted list associated with a potential recipient to whom the giver might give a virtual gift card. Next, the system receives a selection from the giver of one or more recipients of a virtual gift card according to the presented information. The system can then process the virtual gift cards and transfer the indicated amount from the giver to the recipient upon the recipient purchasing an item under the constraints of the virtual gift card using a standard payment mechanism. The system can present predictions via a dedicated gift card prediction portal or as an add-on to an existing destination, such as msnbc.com, yahoo.com, or amazon.com. In some cases, the system can predict and/or suggest participation in a group gift card. If the group gift card is not yet established, the system can prompt the giver to create the group gift card, perhaps based on a previously sent group gift card as a template for the amount, potential givers, message, merchant, and so forth. Group gift cards are discussed more fully below.

Virtual Gift Cards with Loyalty Cards

Figure 22:
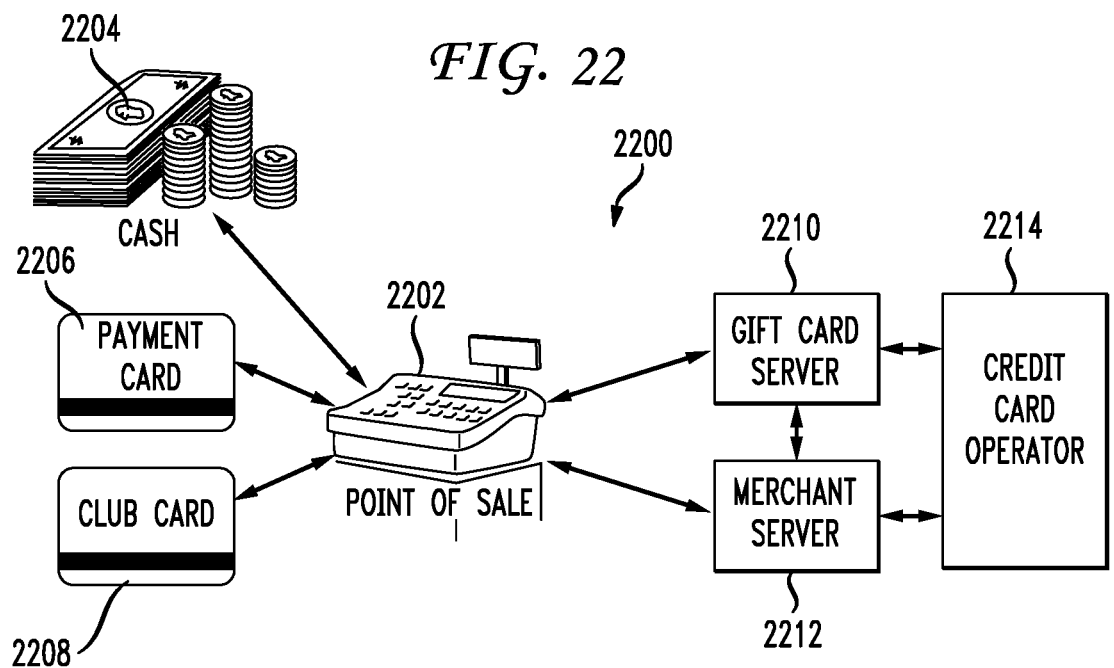
FIG. 22 illustrates an example system configuration for processing a virtual gift card in connection with a club card.

FIG. 22 illustrates another example use of the system 2200 at a point of sale 2202. A gift card recipient pays for purchases using cash 2204, check, a payment card such as a Visa or debit card 2206 in conjunction with a club card 2208. The club card 2208 can make the recipient eligible for certain promotional discounts or savings. The virtual gift card can be tied to the club card 2208 to identify transactions to which the system applies the gift card. One example of such a club card or loyalty card is a Safeway club card in which the recipient receives discounts of items purchased at Safeway when they give the person at the register either the club card or a phone number which identifies them as a member of the club. Thus, the term "club card" does not require the recipient to be part of a club and is not limited to a physical card embodiment.

In this example, the gift card server 2210 communicates with a credit card operator 2214 and a merchant server 2212 as well as hardware at a point of sale such that the virtual gift card can be applied to a particular purchase independent of whether the recipient used cash, a club card or a payment card in the normal fashion. For example, assume $10 in a virtual gift card has been presented to a recipient John. John goes to a point of sale but uses cash 2204 or a check to buy $10 worth of groceries. If the point of sale uses a club card information 2208 in order to process the transaction, the entry of the club card information can be communicated to a merchant server 2218 and/or a gift card server 2210 such that the virtual gift card amount can be applied to that purchase. The teller at the point of sale 2202 can simply inform the recipient that, as part of this transaction, a virtual gift card was used to pay $10 and thus the recipient does not have to pay anything for that transaction. This can be accomplished because usually the club card information is provided during the transaction to arrive at the final amount (since the club member gets discounts). Therefore, the final amount can include the application of the $10 in a virtual gift card.

In one example, the recipient completes the sale at a point of sale. When the teller receives the $10 in cash and identification of the club card, the sale can internally be completed but at the same time an additional transaction occurs in which the point of sale 2202 or the merchant server 2212 receives a credit of $10 from the gift card server 2210. As the recipient is receiving a receipt at the point of sale 2202, the information that $10 has been credited for that transaction can already be provided. The teller can then essentially give the recipient their $10 cash back. In one scenario, the merchant prints a receipt including a message such as "Happy Birthday, Love Mom" to notify or remind the recipient of who is giving the virtual gift card and to confirm that the virtual gift card was successfully applied.

Figure 23:
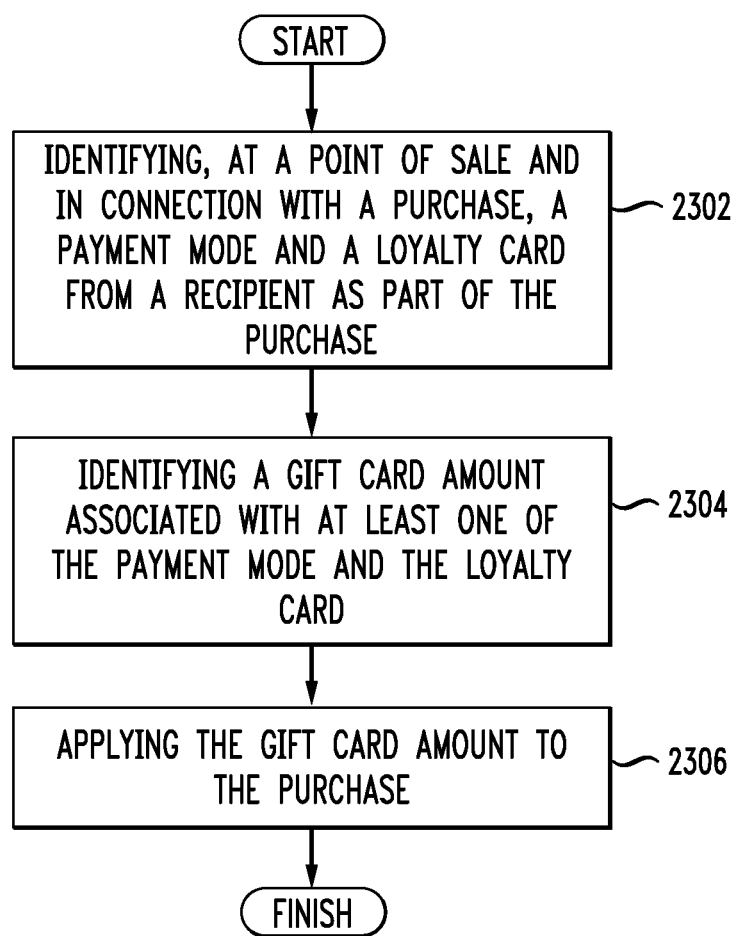
FIG. 23 illustrates an example method embodiment for processing a virtual gift card in connection with a club card.

FIG. 23 illustrates an example method embodiment for processing a virtual gift card in connection with a club card. In this example, the system identifies at a point of sale and in connection with a purchase, a payment mode and a loyalty card from a recipient as part of the purchase (2302). The system identifies a gift card amount associated with at least one of the payment mode and the loyalty card (2304). The system applies the gift card amount to the purchase (2306). The recipient can use the loyalty card with the merchant in the form of a separately scanned physical card, or a recipient-entered passcode, password, telephone number, or other information unique to the recipient. The system can intercept this transaction at the merchant or point of sale level because the recipient may pay with cash, check, EBT (e.g. food stamps), or other form of payment without an existing account, but the system can intercept these transactions at other levels if the recipient pays with a credit or debit card.

Upselling with Virtual Gift Cards

Figure 24:
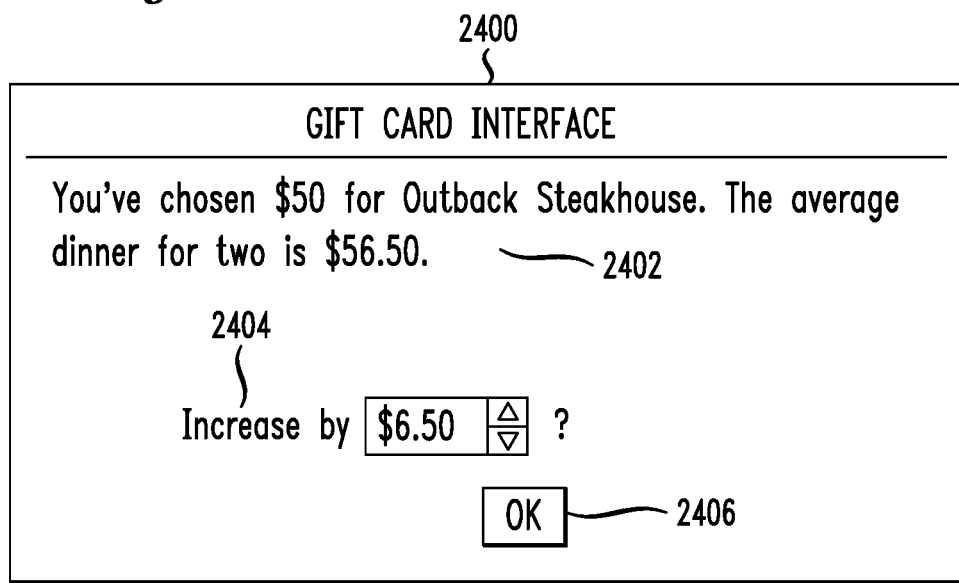
FIG. 24 illustrates an example user interface for dynamic suggestions for and adjustments to a virtual gift card by the giver.

FIG. 24 illustrates another opportunity for accessorizing, upselling, or otherwise modifying a virtual gift card based on various pieces of information that can be presented when the giver purchases the gift card, but which normally cannot be presented in a standard physical gift card scenario. The system presents exemplary window 2400 just following a giver's decision to purchase a $50 virtual gift card. The information 2402 can say something like "You Have Chosen $50 for an Outback Steakhouse virtual gift card". The system can deduce from information such as the merchant, the amount, the recipient, a recipient event, a message from the giver to the recipient, that the giver intends the gift card to be for dinner for two. The system can then determine that the average dinner for two at Outback Steakhouse is $56.50. The system can ask the giver if the giver wants to increase your virtual gift card by $6.50 2404 to meet the average dinner for two price. In another variation, the system can round the suggested increase amount, based on the actual average price, to a next round number, such as the next whole dollar or the next five dollar increment. Of course, the giver is free to adjust the increase amount up or down and can decrease the amount if the giver feels the amount is too high. Button 2406 receives the OK to increase the gift card for that amount. The window 2400 can also include additional information to guide the choice, such as average drink cost, dessert cost, tip amount, and so forth.

This interface is helpful because the giver of the gift card may not know the average cost for a particular restaurant and still desire to purchase an entire meal for the recipient and a friend or spouse. In one variation, the system accesses a database that includes data such as average meal costs, previous gift card purchases for such a merchant, and so forth, but the system can also directly poll the merchant to determine and/or confirm this or similar information. Any such information is contemplated as being used to adjust either up or down the suggested amount for a virtual gift card. For example, the opposite may be true when the giver has chosen a $50 gift card for dinner for two at McDonalds. The information 2402 can indicate that the average meal at McDonalds is $12 and actually suggest that the gift card be reduced if the desire is to present a dinner for two at McDonalds. However, the virtual gift card for $50 may be appropriate for dinner for six at McDonalds.

"Dinner and a Movie" Gift Cards

Figure 25A:
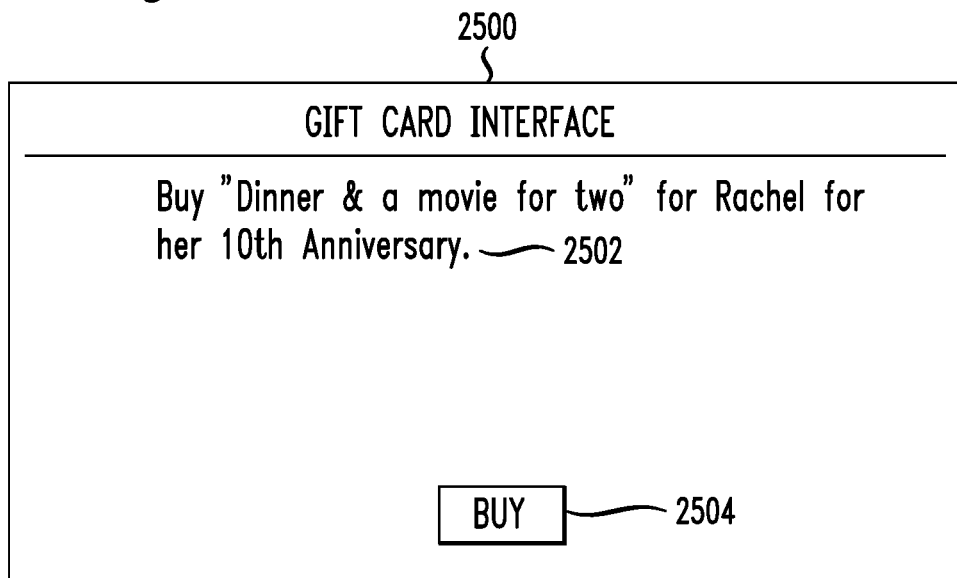
FIG. 25A illustrates a example user interface for a virtual gift card for an item of an as yet unknown value.

The disclosure now turns to a discussion of a "Dinner and a Movie" example embodiment. While the example presented herein is "Dinner and a Movie", the same principles apply to virtually any scenario where the exact dollar value of the virtual gift card is not known or indefinite until the time of the purchase. FIG. 25A illustrates another gift card interface 2500 that differs in that no particular dollar amount is presented. This example illustrates a gift card where the giver wants to buy dinner and a movie for two for Rachel for her 10th anniversary 2502 and a button 2504 to buy the gift card for dinner and a movie without a specific amount. The system can associate a number of restrictions with this gift card. The processing and/or establishment of a policy by the giver can provide an outside limit to the purchase such as $210, as well as other limitations such as location, time and so forth. In an optional variation of the interface 2500 illustrated in FIG. 25B, the system determines an estimated or actual average and/or maximum possible amount for the dinner and a movie for two and allows the giver to confirm 2504 these amounts. The interface 2500 illustrates an example estimated average cost for dinner and a movie of $89.20 and an example maximum cost of $210. The system can determine the maximum amount based on various information such as average price of restaurants around the recipient's location or restaurants the recipient frequently visits, the average cost of movies, the recipient's shopping habits, and other factors to arrive at the estimated average cost and/or a maximum cost of a virtual gift card for dinner and a movie for two. Of course, this can vary depending on zip code, restaurants in the area, and so forth. The system can rely on a database of such merchant information, such as a menu, price list, and so forth, to be able to present the gift card interface 2500.

The system can apply the virtual gift card to a purchase of dinner and a movie and items such as parking or concessions such as popcorn, candy, or drinks that all occur within a span of five hours. The system can process money from the giver's account or a third-party account to the recipient's account after the process and/or purchases are complete. If the giver presents a virtual gift card for dinner and a movie for two, and a the recipient goes out to dinner the next night but does not go to a movie, then the virtual gift card does not refund or transfer money to the recipient's account. If the recipient goes out to dinner several more times but then three weeks later goes out to dinner and then to a movie, the system can apply the gift card amount because the policy associated with the virtual gift card is that the dinner and a movie must occur within 6 hours of each other. In one such timeline for a successful dinner and a movie gift card application, the recipient pays for dinner at 6:00 pm on a Friday, and purchases movie tickets at 7:00 pm the same day, and purchases popcorn, drinks, and candy at 7:15 pm the same day. Once the recipient fulfils all the requirements, the recipient's debit card or visa card that was used to make all these purchases can then be credited with the appropriate amount to pay for all of the dinner and a movie within the bounds set by the giver. In another example, the recipient pre-purchases the movie tickets the day before, so the actual purchase is not within the six hour window. The system can base a determination that the necessary requirements were filled based on other factors than the purchase time, such as the actual show time and date associated with the purchased tickets. This can be more important for sporting event tickets that people often purchase weeks or even months in advance.

The system can present appropriate notifications, such as email communications, to let the recipient know that the virtual gift card has been redeemed and that the giver hopes they had a wonderful time at their dinner and a movie. This all becomes possible because of the use of a network based virtual gift card in which the redemption is tied to the recipient's standard existing credit/debit card. Various triggers can be used in a policy to track the various purchase events and to ensure that their inter-relationships comply with the policy.

Figure 25B:
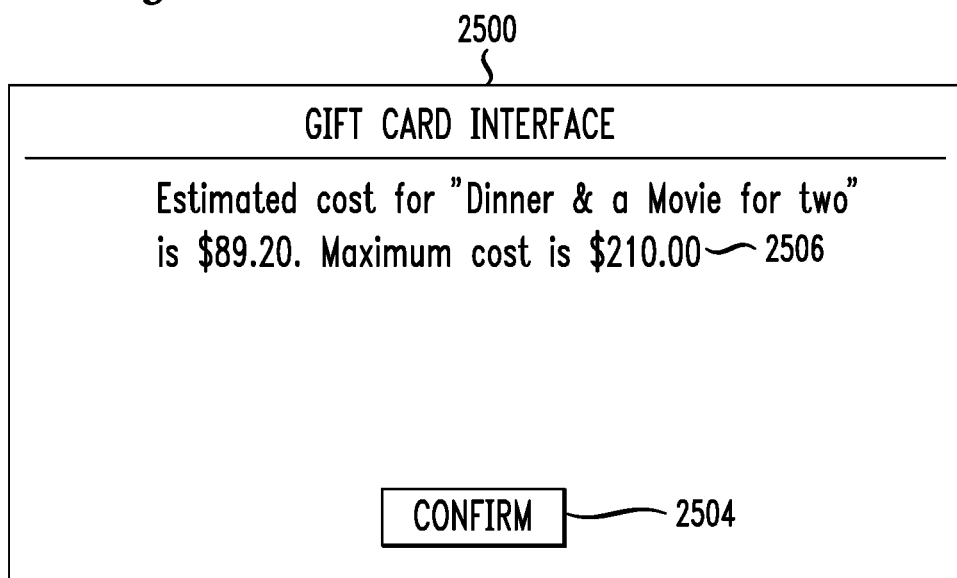
FIG. 25B illustrates an example confirmation user interface for a virtual gift card for an item of an as yet unknown value.
Figure 26:
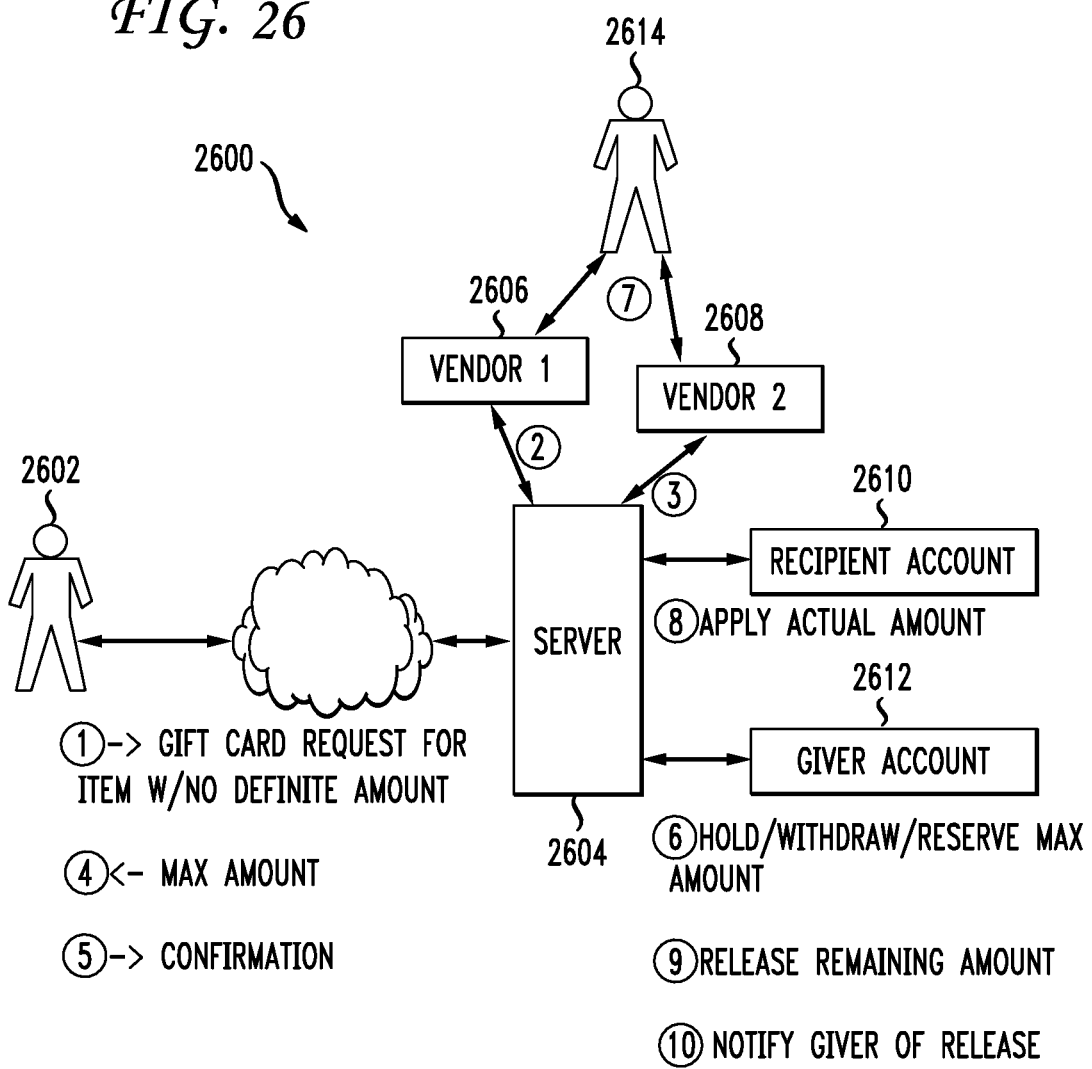
FIG. 26 illustrates a system and control flow for processing virtual gift cards for items with an as yet unknown value.

FIG. 26 illustrates a system 2600 for processing such a gift card request from item or service with no definite amount. Block 2604 represents a user interface that receives from giver 2602 a gift card request for such an item or service that has no definite amount at step 1. The request can be communicated to a server 2606. The server can then reach out and communicate with various vendors at steps 2 and 3, a first vendor 2608 and a second vendor 2610 as well as other vendors to receive estimated costs for the dinner, the movie, the bracelet, or any other item for purchase or service. Alternatively, the server 2604 performs a database lookup to estimate costs without communicating with the vendors 2606, 2608 directly. That maximum amount is communicated back to the giver 2606 in step 4. When the giver 2602 optionally confirms in step 5 that the gift card is approved, server 2606 then accesses at step 6 the giver account 2614 to either withdraw money or reserve the maximum amount for such a virtual gift card (which is $210 as shown in the example shown in FIG. 25B). Then, as is noted in the scenario above, when the recipient actually purchases the item or service, such as a dinner and a movie from the vendors 2606, 2608 via the recipient account 2612 at step 7, a final actual amount is identified is step 8 by the server. Step 8 also involves applying the actual amount from the held or reserved amounts from the giver account 2614 to the recipient's purchase. Step 9 involves releasing the remaining amount and step 10 optionally notifies the giver of the release.

In the example provided in FIG. 25B, assume that the estimated amount was $89.50. The maximum amount for the dinner and the movie was $210. According to FIG. 26, the system holds or reserves $210 from the giver account 2614. Assume that after the recipient actually went to a dinner and a movie, the actual cost was $110. From the giver's account 2614 and in accordance with the policies, the system applies $110 to the recipient account either to reimburse or to pay for the dinner and a movie according to a variety of methods. This leaves $100 as the remaining amount to be released back to the giver account 2614 into its general funds. The system can notify the giver 2612 of the release and of the amount that was actually used by the recipient for the dinner and a movie. Furthermore, the recipient can receive in association with the initial dinner and a movie virtual gift card, a notification stating, "George has given you a virtual gift card for your birthday for dinner and a movie. Redeem this gift card by going to dinner and a movie within 5 hours of each other. Once you have completed that series of purchases using your Visa card, the entire cost for the dinner and a movie will be credited to your account. Happy Birthday."

Figure 27:
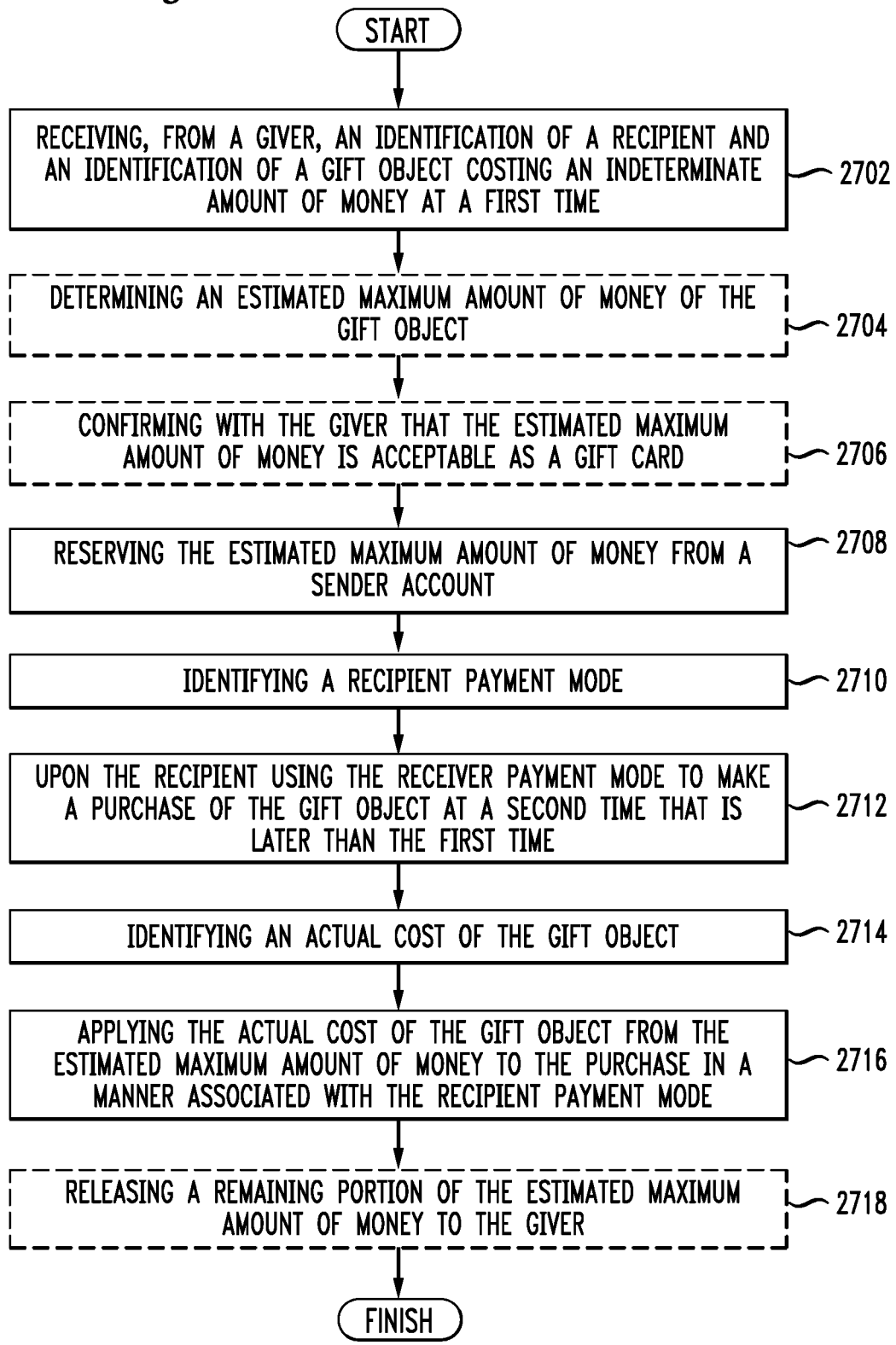
FIG. 27 illustrates an example method embodiment for processing virtual gift cards for items with a value not yet known.

FIG. 27 illustrates an example method embodiment associated with the indefinite virtual gift card. The system first receives, from a giver, a first identification of a recipient and a second identification of a gift object costing an indeterminate amount of money at a first time (2702). The system optionally determines an estimated maximum amount of money of the gift object (2704). The system can also optionally confirm with the giver that the estimated maximum amount of money is acceptable as a gift card (2706). The system reserves the estimated maximum amount of money from a giver account (2708). The system identifies a recipient payment mode (2710). Upon the recipient using the recipient payment mode to make a purchase of the gift object at a second time that is later than the first time (2712), the system identifies an actual cost of the gift object (2714) and applies the actual cost of the gift object from the estimated maximum amount of money to the purchase (2716). The system can optionally release the remaining portion of the estimated maximum amount of money to the giver (2718).

In an alternate method embodiment, the system receives from a giver a virtual gift card request for an item or a service with no definite amount. The server next optionally can retrieve information from various vendors and transmit to the giver a predicted amount of the cost for the item or service. The system can also optionally receive a confirmation from the giver for the estimated amount. The system next receives information that a recipient of the virtual gift card has used a standard purchasing mechanism to buy the item or service. The system then identifies an actual amount used in the transaction and applies from the giver account an amount of money associated with the actual amount to the recipient account. The system finally releases any remaining amount to the giver account that was held or reserved as a maximum cost associated with the indefinite amount.

Figure 29:
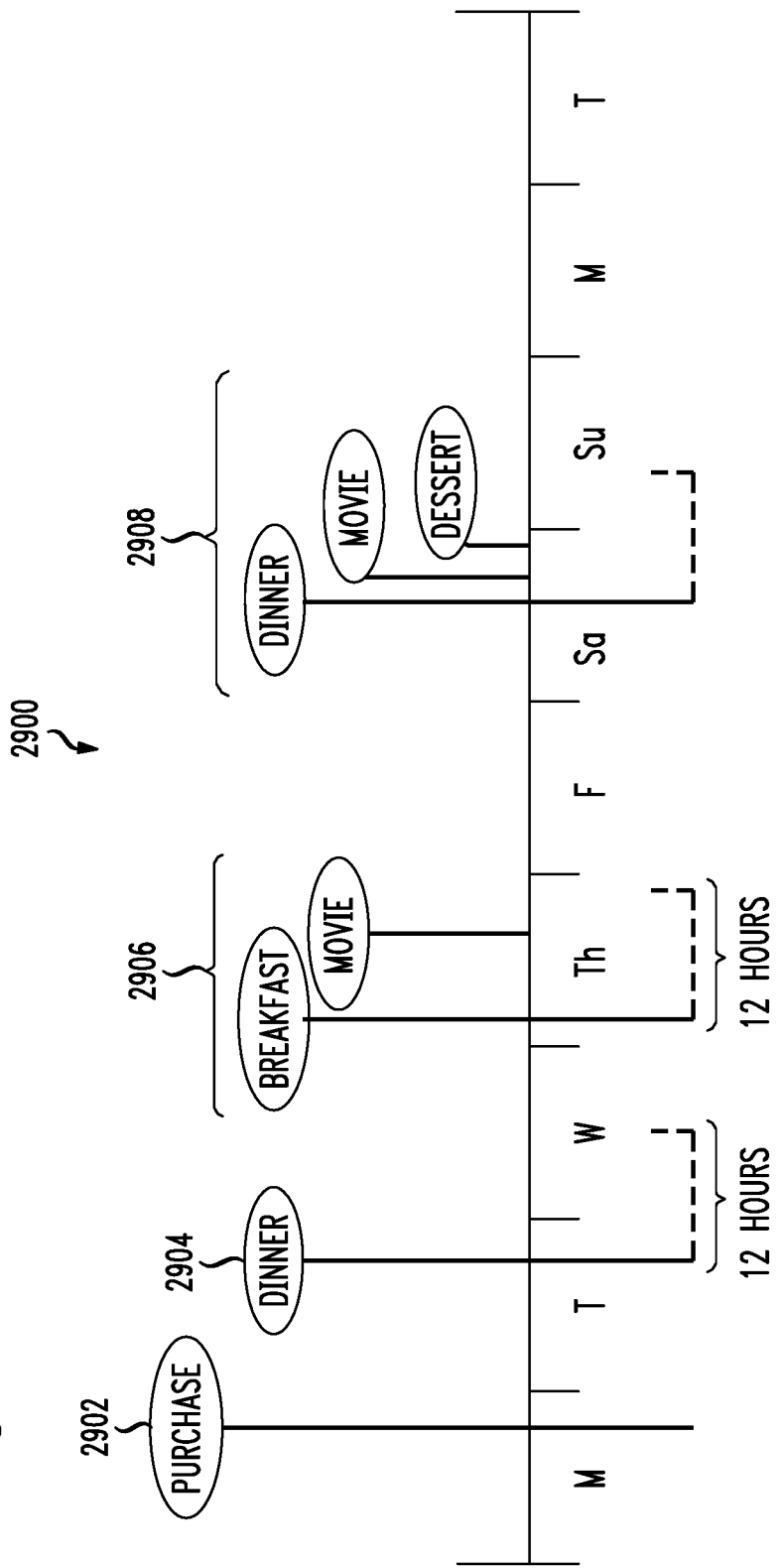
FIG. 29 illustrates a timeline for a "dinner and a movie" scenario.

FIG. 29 depicts an example timeline 2900 for a "dinner and a movie" virtual gift card scenario to further illustrate these principles. The timeline represents multiple days and events occurring in those days. On Monday, the giver purchases 2902 a virtual gift card for the recipient for "Dinner and a Movie for Two". The system establishes a policy or set of policies guiding the virtual gift card. The policies for this virtual gift card can include a dinner and two movie tickets purchased within 12 hours of each other. Other more detailed policies can include the two movie tickets must be purchased for the same showing of the same movie, the dinner must include at least two entrees, or the two movie tickets must be purchased within the same 12 hour window. On Tuesday night, the recipient purchases dinner for two 2904, which triggers a 12 hour window. If the system is monitoring the recipient purchases in real time (or substantially real time), the system can provide a notification to the recipient that a first part of the policy associated with the virtual gift card has been fulfilled. The notification can include some other suggestions and reminders of the remaining policy requirements for redeeming the virtual gift card for "Dinner and a Movie". However, the recipient does not purchase movie tickets for a movie within the twelve hour window, so the system resets that policy.

The next set of exemplary transactions 2906 shows that the recipient purchased breakfast on Thursday morning and movie tickets within the twelve hour window, but the system may or may not recognize the breakfast as a qualifying "Dinner" based on the policies. If the system recognizes the breakfast as a qualifying transaction according to the policy, then this set of transactions 2906 triggers the redemption of the virtual gift card. However, if the policy indicates that the "Dinner" must be purchased between the hours of 4:00 pm and midnight, then this set of transactions 2906 does not trigger the redemption of the virtual gift card. Turning to the third set of exemplary transactions 2908, the recipient purchases dinner for two on Saturday and restarts the twelve hour window. The system can send a notification to the recipient, such as by email, text message, via a social network, or other communication, that the transaction has started the twelve hour window for completing qualifying transactions for redeeming the virtual gift card. In that twelve hour window, the recipient sees a movie with his spouse. This can satisfy the policies associated with the virtual gift card and trigger its redemption to cover the movie and dinner. At this point, the system can send a notification to the recipient of the transactions that satisfied the policies, details of the transactions, such as the time, location, amount, merchant, and so forth. The notification can also include a description of any optional transactions that can be associated with the virtual gift card.

For example, the third set of exemplary transactions 2908 includes a dessert purchase after the movie. The policy of the "Dinner and a Movie" virtual gift card can indicate optional transactions that are included in the virtual gift card if the recipient makes such a transaction. The virtual gift card policies indicate an optional dessert purchase after the movie and still within the twelve hour window. The recipient has purchased the dessert within the twelve hour window, so the system includes the dessert purchase when calculating the virtual gift card amount and can send the recipient a notification to that effect.

The system can also send notifications to the giver as the recipient is making potentially qualifying transactions. Using this information, the system can send the giver a notification that the recipient has just purchased dinner for two at Outback Steakhouse in Annapolis. The giver can then communicate with the recipient, via phone call, text message, email, or other medium to suggest a movie theater, movie, dessert place, or just to wish the recipient well. However, this approach may be invasive to some people because the system may alert the giver even of transactions that start the twelve hour window, but do not trigger redemption of the virtual gift card. The system can also send the notifications to the giver only when the recipient has made all necessary transactions that satisfy the policy or policies.

The twelve hour windows of FIG. 29 are shown moving forward in time from a "Dinner" event, but can also be retroactive. In other words, the twelve hour window can cover a movie transaction that occurred before the dinner transaction. In some cases, the recipient purchases movie tickets hours or even days in advance, so the system can analyze a transaction history to determine if a movie ticket purchase in the past satisfies the policies. The system can determine, for example, if the movie tickets were purchased for a show time that falls within the twelve hour window. Either the dinner purchase or the movie ticket purchase can start the twelve hour window according to the established policies. The window length discussed herein is exemplary and can be longer or shorter. The window can span multiple days or weeks and can include multiple noncontiguous segments. The policies for the virtual gift card can include transactions using one or more payment mode (such as a Visa debit card and an American Express credit card) for one or more recipient (such as a husband and wife).

Where the system uses a transaction history to identify a qualifying transaction, when users register for the system to be givers and/or recipients, and provide account information, or in an existing record of their credit/debit cards, the user can provide authorization for a service to login to their accounts and perform the appropriate scan. An example service is by mint.com, which receives account and log in information for its users, automatically connects securely to the entered accounts and tracks purchases, categorizes them, and provides summaries and reports. In a similar fashion, the control entity or system in this case could operate (in one example) by also retrieving such data so that the system could periodically, or on a triggered basis, use your login information to access your account and scan for qualifying transaction to implement the gift card for that transaction. The system in this case can exchange data with a service such as mint.com that already identifies and categorizes your transactions for you. In other words, such a service may be processing your data and categorizing restaurant purchases. Therefore, if there is a gift card for Rachel for $50 at a class level of restaurants, then a service that accesses your account and categorizes all of her purchases can easily identify that transaction and provide that information to the present system for triggering the use or application of a gift card for Rachel. Such searching and categorizing algorithms can be implemented by a giver account/recipient account bank, or a separate service, or in a variety of ways to accomplish the basic function of securely identifying a qualifying transaction for the policy of a gift card.

In one scenario, the recipient has a gift card that is redeemable using two accounts, a Visa and a MasterCard. Under a "dinner and a movie" type gift card, if the recipient pays for dinner with a Visa, and the movie with a MasterCard, then the system can retrieve the purchasing history of each separate recipient account, and then perform a comparison of the purchases where the policy spans multiple purchases at specific off set based times (dinner plus a movie within at least 6 hours). An analysis of Visa purchases might reveal a restaurant purchase at 6 PM on Friday night. The MasterCard purchasing history might reveal a movie purchase at 8 PM Friday night. The system can retrieve such information from independent data provided by the different card issuing banks of the recipient, or the system may have the account and login data of the recipient and access those accounts, retrieve the data, and perform a comparison of the different purchasing histories to determine whether the policy has been met for the purchasing activity. In the example provided above, the policy would be met and the system would then manage the financial transaction in which money would be transferred from the giver account to the recipient Visa and MasterCard accounts to pay for the "dinner and a movie." This scenario applies to two or more accounts and any variety or relationship between purchases that can be retrieved and compared according to a policy.

Other examples of virtual gift cards with indeterminate values besides "Dinner and a Movie" include "Ski Vacation for Two" that covers meals, lift tickets, and weekend stay at a ski lodge, "Any single item at the Lego® store", or "a video game package" including any video game system (such as a Nintendo Wii, Microsoft XBOX 360, or Sony Playstation 3), two games, and two controllers. In each of these examples, the actual value of the virtual gift card is not determined until the purchase is made and the virtual gift card can cover multiple separately occurring purchases from different merchants. The system can automatically generate or suggest a set of policies based on what the giver intends the virtual gift card to cover, the recipient's shopping habits, and/or other relevant data.

In a related example, the giver gives the recipient a gift card for $25.00. The recipient completes a purchase of an item costing $24.99, but the transaction is $26.55 after adding tax. The system can detect if the transaction for the item is above the existing gift card amount less than a threshold value or percentage. If the purchase is below that threshold level, the system can prompt the giver asking "The recipient purchased ITEM for only $1.55 more than your virtual gift card amount of $25. Do you want to increase the virtual gift card to cover this overage?" The giver can then decide whether to increase the virtual gift card amount automatically to cover the entire transaction. The system can automatically detect how, when, and whether to send such prompts based on personal or gift card settings, a threshold amount above the virtual gift card amount, the giver's relationship with the recipient, the recipient's available funds, and so forth.

The disclosure now turns to a more detailed discussion of the processing of a "Dinner and a Movie" gift card of an indeterminate amount. A giver communicates with a control engine that includes or has access to information and intelligence. The information includes at least data associated with identification of the giver and at least one giver account and the recipient account. The giver can communicate with the control engine through an optional interface such as a company website, mobile application, telephone interface, natural language interface, text-based interface, and so on. One example of the control engine is the Amazon.com environment with additional configurations to perform the steps of providing a virtual gift card according to the principles disclosed herein. The reason for comparing the control engine to Amazon.com is that Amazon.com already includes user accounts with stored credit card numbers such that it can manage or provide instructions regarding the transfer of money from one account to another in a secure fashion. Other suitable entities can include PayPal, Facebook, Google Checkout, Yahoo shopping, shop.com, eBay, buy.com, and any other entity that stores user accounts and associated credit or debit card numbers to manage transferring funds. An optional third-party holding account is also disclosed as well as a merchant website or brick and mortar location.

As an example of the processing from start to finish, assume that the giver communicates with the control engine to direct that the virtual gift card of $50 be given to the recipient for use at the Olive Garden. Information would flow and be stored in the control engine with the details regarding the virtual gift card. The recipient account can represent a Visa card, debit card or any other payment mechanism as disclosed herein, including accounts such as a PayPal account. Information can flow from the control engine to the recipient account providing instructions to monitor the purchasing activity of the recipient because there is a pending $50 virtual gift card associated with the recipient account. Then, when the recipient purchases dinner at Olive Garden, an authorization from the Olive Garden system to the recipient account is initiated. Once the authorization information is complete, and the recipient and the basic, well-known information associated with the recipient account is confirmed, then the payment can be made from the recipient account to the Olive Garden. Because this financial transaction occurs at the Olive Garden, the recipient account, having a pending gift card, can trigger notification to the control engine regarding the purchase at the Olive Garden. The control engine can then handle the payment of the gift card in several ways.

One example mechanism is to provide an instruction to the giver account to transfer $50 to the recipient account. If the $50 is held in a third-party account, then the control engine can provide an instruction to the third party or holding account to transfer $50 to the recipient account. Other mechanisms can use various policies and/or triggers associated with different accounts as directed by the control engine to complete the transaction in a different manner. For example, once authorization notice is received from the Olive Garden system, the recipient account can notify the control engine causing the control engine to instruct the giver account or the third-party account to make the payment to the Olive Garden directly.

In a similar fashion, assume that the recipient only spends $35 at the Olive Garden. The various triggers in communications back to the control engine indicate that only $35 needs to be paid from the giver account or the third-party account to either the recipient account or the Olive Garden. The control engine has the information associated with the management of the virtual gift card such that communication can occur with the recipient via email, text messages, and so forth to notify the recipient of 15 remaining in the virtual gift card. Assume the recipient later returns to the Olive Garden and spends $40 in another transaction. The triggers and notices received from the Olive Garden and the recipient account can cause the control engine to instruct the giver account or the third-party account to pay the remaining 15 as applied to the next purchase such that the recipient account is reimbursed or the Olive Garden is directly paid the $15.

Assume that the virtual gift card is given under a program in which, after the initial visit to the Olive Garden, the system transfers the remaining money directly to the recipient account. In this scenario, the system can, in compliance with that policy, simply transfer the full $50 to the recipient account or can transfer $35 from the giver account or third-party account directly to the Olive Garden and then transfer the remaining 15 from the giver account or third-party account to the recipient account. The control engine can manage, via the various instructions to the accounts, the transfer and communication of the different funds. An advantage of this approach is that the giver account, third-party account and recipient account only needs to report activities of the recipient and receive instructions. No intelligence or monitoring of any particular policy is necessary with these accounts. The control engine manages and determines where money flows from one account to another according to policies associated with the virtual gift card.

The system may not include the third-party account or the optional user interface but the principles equally apply. The system can include a virtual gift card that is given from the giver to the recipient for dinner and a movie without any particular dollar amount. An optional estimated or actual maximum amount can be provided but it is generally assumed for this example that the giver desires to give a virtual gift card for two people to be able to go out to dinner, go to the movies, and optionally have dessert. Assume that the estimated or approximate average cost of these three activities is $200. The giver provides the "dinner and a movie" gift card to the control engine. The giver and/or the system can select or generate a policy for managing the virtual gift card. Assume that in this case the policy is that the dinner is purchased and within the following 12 hours the recipient goes to the movies as well as purchases dessert or some other activity which would fall under the "dinner and a movie" virtual gift card. One of the policies can include an approval by the giver of the purchases.

The system communicates the data associated with the virtual gift card to the recipient account. The recipient account then begins to monitor the purchasing activity of the recipient with respect to restaurants, movies, and possible locations for dessert. The information can, in one implementation, cover only these types of purchases and no other information needs to be known by the recipient account. In other implementations, additional data associated with managing the "dinner and a movie" gift card can be provided. Assume that the recipient goes to the Olive Garden for lunch on a Monday. Information is communicated from the Olive Garden to the recipient account. That information can be forwarded to the control engine that notes the time of that purchase and begins to track the purchase. However, assume that no purchase at the movies or dessert occur within the following 12 hours. The purchasing activity does not match the "dinner and a movie" gift card and the control engine begins the process anew at the next restaurant purchasing activity of the recipient.

Assume that on Friday, the recipient again goes to a restaurant at 6 pm. Information is communicated to the recipient account to complete that purchasing transaction. The data is communicated from the recipient account to the control engine. Another tracking file is associated with this activity. Assume then that the recipient at 8 pm goes to the movies and buys two movie tickets. That information is communicated to the recipient account to handle the purchasing transaction. That data is communicated to the control engine that is added to the data indicating that the movie purchase was within the 12 hour time period following the restaurant purchase. The file can continue to remain open to determine whether further purchasing activity occurs as part of "dinner and a movie" gift card. Then, assume that at 11:30 pm the recipient eats dessert at the same restaurant or at another restaurant and also charges that on the same card used previously or another payment mode associated with the recipient account. Information is communicated from that merchant to the recipient account to handle that purchasing transaction. Recipient account then communicates that purchase to the control engine. This data is also added to the file. The control engine at this stage can continue to monitor purchasing activity for the 12 hours starting at 6 pm on Friday or can consider the "dinner and a movie" activity complete. In either instance, communication can be sent from the control engine to the recipient account, instructing the recipient account to stop monitoring the purchasing activity of the recipient in association with this virtual gift card. The recipient can stop forwarding data regarding the purchasing activity of the recipient on that account.

The control engine can then provide an instruction to the giver account (or to the third-party account) to transfer money from the giver account to the recipient account. It is contemplated that this approach will occur and that the purchases made at each of the merchants will be done in a typical manner and money will be drawn from the recipient account to pay for these purchases. If the recipient account is a credit card, then the credit can be extended on behalf of the recipient in a normal fashion. Thus, when money is transferred from the giver account to the recipient account via a communication link, it can be considered a reimbursement for those purchases. The control engine can then perform other types of communication back to the giver instructing the giver regarding the ultimate cost of the "dinner and movie" gift card that was incurred by the recipient. Other types of communication can also be provided such as communications to the recipient from the control engine at one or more stages of the process. For example, after the recipient purchases dinner at the Olive Garden at 6 pm, the control engine can send an email, text, voice message, or other communication to the recipient indicating that they have 12 hours from that point to buy dinner and a movie and it will be covered by the virtual gift card from the giver.

The recipient can interact with such optional messages or the messages can be purely notice based with no interaction necessary. For example, the system can provide the recipient with an opportunity to acknowledge that they are going to a dinner and a movie that night. If such interaction occurs then the processing can be altered such that money flowing from the giver account or the third-party account can be directly applied to the various merchants. After the recipient optionally confirms their intent to view a movie after dinner, the control engine can connect to local businesses, a directory, or other information source to generate and send an email or other communication back to the recipient with information on what movies are playing in the area, available show times, theater addresses, and/or ticket prices. The communication can also include information on related optional portions of the virtual gift card, such as dessert, by displaying available desserts and/or dessert specials for that day. The communication can describe other items or services that are related to the object of the virtual gift card but are not covered by the virtual gift card as an opportunity to promote or cross-sell to a potential customer who is already out, has just saved some money, and is likely to be in a good mood.

One benefit of the approach described herein is that there is no money left over from the virtual gift card that needs to be managed after the purchasing activity. Inasmuch as the initial virtual gift card amount is indeterminate, only the exact amount need be applied from the giver account to the recipient account or to the merchant. This eliminates the forgotten residual amounts associated with a gift card that can amount to billions of dollars a year in the overall economy.

At any stage of the process, communications can be transmitted from the control engine to the giver and/or recipient and optionally received back from the giver and/or recipient to monitor the activity. For example, the control engine can notify the giver as soon as the recipient makes the first purchase at the restaurant. The giver can then confirm that they know that this is the night when the recipient is going out to a dinner and a movie. Then the giver can instruct the control engine to take the appropriate steps to communicate with and/or process the purchases that night associated with the dinner and a movie and a dessert under the policy associated with the "dinner and a movie" virtual gift card. Therefore, it is contemplated, that at any stage various communications can occur to ensure that the process flows smoothly and that both the giver and the recipient understand if the purchases will or will not be covered under this virtual gift card.

Intercepting Gift Card Transactions

Figure 28:
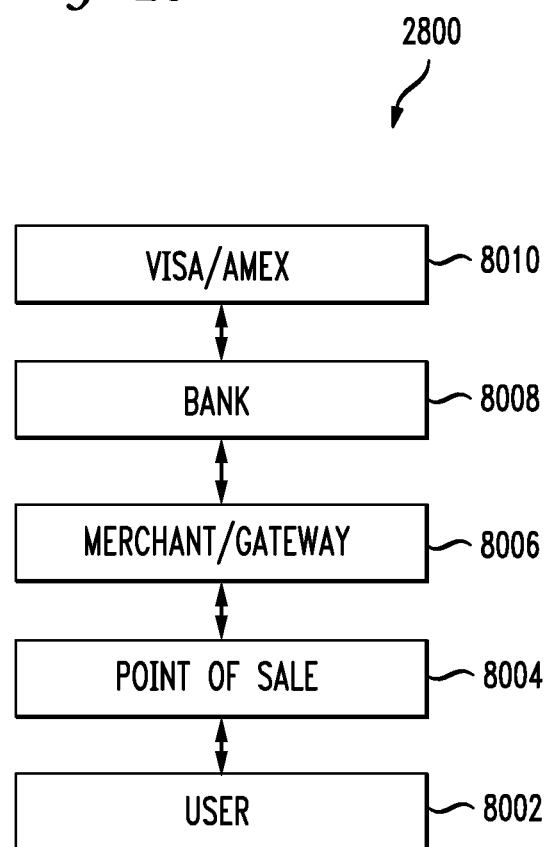
FIG. 28 illustrates an example payment processing chain.

FIG. 28 illustrates an example payment processing chain 2800. This chain 2800 is representative and can include more or less steps, including variations with multiple concurrent paths for different payment modes, such as a branch for processing credit cards and a branch for processing debit cards. The system for processing virtual gift cards can intercept transactions at any of multiple locations in the chain 2800, depending on the type of virtual gift card, the type of underlying purchase or transaction, the issuer of the virtual gift card, and other factors. In this chain, a user 8002 presents a credit/debit card or other payment instrument at a point of sale 8004. The point of sale can be at a brick and mortar retailer, such as a checkout cash register at Target, or a virtual storefront, such as Amazon.com or a mobile device store for downloading applications. The point of sale 8004 must first verify that the payment instrument is valid and is backed by sufficient funds or credit to complete the transaction. To this end, the point of sale 8004 can communicate with a merchant/gateway 8006. The system can intercept payments at the point of sale 8004 level and/or the merchant/gateway 8006 level in order to process virtual gift cards associated with club cards or loyalty cards, for example. The merchant/gateway 8006 can communicate with a bank 8008, and the bank 8008 can communicate with a credit card issuing bank 8010.

Either the bank 8008 or the credit card issuing bank 8010 confirms that credit is available and can reserve that credit for payment for the transaction or confirms that funds are available for the transaction and withdraws those funds from the user's account. Then the various entities communicate back through the chain to the point of sale 8004 to confirm that the user's payment device is valid and has sufficient funds or credit to complete the purchase. Then the point of sale can complete the purchase. The system can intercept these transactions at any stage in the chain and can intercept transactions at multiple stages. The system can intercept a transaction at a point of sale to apply part of the virtual gift card associated with a loyalty card. The system can intercept the transaction at a merchant/gateway 8006 level to apply a main portion of the virtual gift card amount, but can also intercept the same transaction at the credit card issuing bank 8010 level to apply a promotional bonus for using an American Express card.

As has been noted above as well, the system can analyze the recipient payment history for transactions that qualify under a gift card policy. If the recipient has a gift card for Olive Garden and another gift card for any hardware store, the system may every Saturday or at any interval or triggered by any event, scan the appropriate payment history (which can span from the time the gift card is given and even prior to giving the gift card if instructed), and identify qualifying transactions. If the system determines that a purchase at a hardware store was made, then the gift card for that purchase is processed and the gift card amount of money is applied to that transaction. If two weeks later a purchase is made at the Olive Garden, that transaction will be detected in the transaction history and the policy for that gift card will apply.

Reverse Gift Cards

FIG. 30 illustrates an exemplary user interface 3000 for requesting a reverse virtual gift card. The scenario in which FIG. 30 will be discussed is a group of three friends who go out to dinner together, each order food and drinks, and at the end receive a bill or check for the combined amount, including a tip, of $53. The approach described and the user interface depicted in FIG. 30 provide a way to avoid the friends having to remember to bring cash, perform mathematical calculations to determine their share, or pay using three separate credit cards. One of the friends, Bob Jones, opens a reverse virtual gift card application on his smart phone or other mobile device, which displays the user interface 3000. The reverse gift card application provides an easy way for Bob to pay for the dinner and arrange for his friends to reimburse Bob for their portions.

Bob logs in and the device retrieves Bob's credentials 3002 associated with at least one payment account 3004, in this case a MasterCard credit card. Then Bob can select multiple givers 3006, 3008 and enter the amount that each owes for the dinner bill. Alternatively, Bob can use the mobile device to capture an image of the receipt, identify each item on the bill, and assign each item on the bill to one or more individuals. The system can identify accounts associated with each of the givers that include or have access to payment accounts for the givers, such as bank accounts, credit card accounts, debit card accounts, and so forth. Bob can also add other givers 3010. The interface 3000 can also display the total remaining on the bill 3012 that may or may not correspond to Bob's share of the bill. Bob can then submit the reverse virtual gift card and the system notifies Giver 1 and Giver 2 of their proposed share of the bill, such as via text message or email, such as "You and Bob had dinner together at TGI Friday's. Bob is requesting that you pay 15 as your share of the bill." The givers can confirm the proposal, add more money to the total, or otherwise interact with the notification to revise the amount. Upon receiving the confirmations from the givers, the system debits the respective amounts of money from each giver and credits those amounts of money to Bob's account as a reimbursement for paying the entire dinner bill.

In another concrete example, having individual payment cards registered makes sharing the cost of a meal easy. Assume Rachel, George, Grant and Geoff are at dinner and it is time to pay for the bill. Via a hand held device an application can be initiated for them to help determine how to share the bill. Rachel is going to use her credit card to pay. Upon initiation, Rachel can login or enter her name, look at the receipt, and do several things. The application can enable her to enter the total amount (including tax or have the tax calculated). The tip amount can be suggested, included automatically or manually. The tip may be automatically included on the receipt. All options can be presented. Rachel can look at the times she purchased and enter that amount for her portion. Often people will not want to the exact math but will want to enter an amount that is close. If Rachel's meal was $14.75 and she purchased an appetizer for $3.90, she may just enter in $19 as her part of the meal. The application can also present an option for her to add a portion of the tip by an exact amount or by a percentage of her portion. A suggested amount can be provided.

Therefore, for each person at the meal, a user interact enables the user to enter their amount, and get a tip amount, if any, into the system and associated with that person such that a final amount is arrived at. Next, George, Grant and Geoff enter in the amounts for their meals in the same manner. This may be done on the same handheld device or their own handheld devices. Their participation in this group dinner may be pre-populated or identified based on location-based information associated with their hand held devices. Rachel may be able to login in using whatever mechanism is available or known to login. Once Rachel enters her amount, the system may know via social networking plus location based data, or based on any other data available, that George, Grant and Geoff are in the group. When Rachel hands her device to George, he may only need to click on his name (or not), and enter in the amount of his meal with the variations on how to arrive at the tip. Each person interacts in the same manner with the device. Once everyone has entered in their data, a summary can be provided of the total amount, including tip, and tax information if necessary. This can provide a brief check for someone reviewing the bill that they have enough to cover the entire bill. Additions and modifications can easily be made. For example, if George realized he missed an appetizer and the overall bill is short, he can click on button to modify his amount. If the tip amount is way above an appropriate amount, the application can be used to reduce the tip by $5.00 and distribute that savings across the group. Each user is logged in or identified to the system such that each respective amount is associated with the appropriate person. The application can include a calculator option for people to be more exact in adding their portion of the bill.

Given that each person is in the system, the various credit/debit card accounts are known. The system can then confirm a payment plan for the group. Rachel then simply pays with her credit/debit card. Everyone group member's payment mechanisms is available and the respective amounts are retrieved from each giver account and associated with the transaction made by Rachel such that she is reimbursed. Rachel does not even need to be identified in the application as the one who will be making the payment. A policy can apply under the application for each particular such that when the group is identified with the respective member amounts, the group activity is monitored. For example, after all the data is entered, Rachel may have left her credit card at home. The application knows the group, knows the amount, and if George then pays the bill (rather than Rachel), the system can automatically turn Rachel into a giver and George the recipient. Indeed, in one aspect, no person needs to be identified as the giver. Each person only needs to enter their respective amount and then one in the group will pay. One or more in the group could pay as well and the system could work out the appropriate payments to each payer such that the right reimbursement is made to the correct respective payer.

Variations can easily exist in this context. Sometimes people treat someone for dinner since it is their birthday. The system can enable the group to each enter their amount of their meal, and then a total amount on the bill. Assume that it is Geoff's birthday and he does not enter an amount. Once everyone's amount is entered, and the total bill amount is entered as well, the system can determine the difference of what is left to pay (Geoff's dinner/tip/tax) and equally distribute that amount to the payers such that they each share in the cost of Geoff's meal. Then the appropriate amounts from the givers and paid to the recipient who uses their credit/debit card at the restaurant to pay for the meal. As noted above, the above functionality can be achieved using a single handheld device (or desktop or any other device) or may be accomplished via individual user hand held devices in which each user just starts up the application on respective devices, logs in, and enters their own data and confirms. Timing data (different members in the group each accessing the application at the same time or generally the same time), location-based data (each member of the group with their own device is determined to be in close proximity when accessing the application), social networking data (each member of the group works together or are friends on a social networking site), manually entered data (Rachel selects the others in the group from a list or enters their names or identification data to organize the group for the dinner payment), and/or any other received data or methods can be used to identify a group of people who are going to be associated with a payment transaction. Thus, the system can disambiguate between multiple tables of patrons at a restaurant where people may be accessing the system. In this scenario, George may be the first to enter his data. With the social networking, location based data, etc. Grant can then enter his data, and Geoff and Rachel enter their respective data. The system can present the final listing of the group to one or more people entering the data. Thus, Geoff or Rachel may have predictive or presented a definition of the group that they can confirm via one click. Corrections can be made or a top N groups can be presented from which they can choose the definition of the group. No specific buyer of the meal (or object, service, etc.) need be identified.

FIG. 31 illustrates a method embodiment of this approach. The system receives amount information from each person in a group of people who are going to be associated with a payment transaction (3020). The system associates each member of the group with a respective payment account or payment mechanism (3022). The system receives data that one person in the group paid via their payment mechanism (3024). The system then applies a respective amount of money from each person's payment account in the group to the one person who paid (other than the paying member) (3026). All the variations discussed above apply, such as dealing with tax and tip and various ways of prepopulating members of the group, or predicting members of the group. For example, the system may know that it is grandma's birthday and predict that the three children will each be there and want to share in the payment of the meal or a gift. This group payment option applies to any purchase transaction and not just meals. The application can be varied based on the type of transaction. For example, the users may begin the application and choose a meal (in which case the tax and tip options are presented for handling those additional items) or it may be a purchase of a car or a bike or gift that is to be shared. There are many mechanisms which can be applied to organize a group around any payment transaction. This approach can make a sometimes socially awkward experience of how to divide up a bill more convenient and easy to manage.

Various graphical presentations can also be provided which demonstrate, for example, how much of the bill each person is paying in a pie chart or graph. If such information is desirable, it can be shown. Policies can be applied for each person in the group. For example, Grant in the above discussion, may want his payment applied in 15 days which is after his next paycheck is received. Such individual options can be provided which each user interaction or set in advance as they are managing their payment.

This principle can be applied to other non-dinner variations, such as arranging and paying for flowers at a funeral. An organizer can set up an open reverse gift card for flowers for the funeral. As givers commit funds to the flowers, the amount of funds available for the flower grows. In the end, the system can determine, based on various package costs and the total available funds, which package of flowers is the best fit. For example, if the givers have committed $65 dollars total, the system can select a $59 floral package for the funeral. Alternatively, the system can determine that a $75 floral package is a better fit and send a request to all or part of the givers and request an additional contribution of $10 to reach the $75 for the next higher level floral package. Alternatively, the system can purchase the $59 floral package and distribute the remaining funds, $6, to one or more giver.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data that cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of executable instructions or associated data structures represents examples of corresponding acts implementing the functions described in the steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or a combination thereof) through a communications network. In a distributed computing environment, program modules can reside in local and/or remote memory storage devices.

The various embodiments described above are provided by way of illustration only and should not be construed to limit the scope of the disclosure. For example, the principles herein are applicable to virtual gift cards associated with any type of payment mode, including cash, checks, credit cards, debit cards, loyalty cards, and so forth. The principles herein can be applied to any virtual gift card that can be redeemed by using a payment mechanism to make a purchase in the normal fashion without the recipient using a separate physical card or entering a code. Any function disclosed herein in connection with one embodiment can be blended or incorporated into another embodiment. Given generally that redemption of a virtual gift card is managed by a policy, any policy features discussed above can be blended to provide new policies, although such new policy is not specifically set forth in a single discussion of any embodiment. Those skilled in the art will readily recognize various modifications and changes that may be made to the principles described herein without following the example embodiments and applications illustrated and described herein, and without departing from the spirit and scope of the disclosure.

We claim:

1. A method comprising:
    associating, at a first time, a policy with a giver having a giver payment account and a recipient having a recipient payment account, wherein the giver payment account is independent of the recipient payment account and each of the giver payment account and the recipient payment account existed prior to the first time and are independent of each other and have no control over each other, wherein the policy is at least in part giver defined and requires at least two transactions prior to applying a gift credit, and wherein the gift credit is to be used at a later time after the first time and by the recipient purchasing an item using the recipient payment account;
    configuring a notification that is linked to the policy, the notification comprising an interactive graphical user interface that notifies the recipient of at least one of the giver, the amount of money to pay for the gift credit, an existence of the gift credit, and a condition of the policy that will trigger application of the gift credit;
    transferring the notification to a device associated with the recipient;
    receiving, via the interactive graphical user interface presented on the device, recipient input in order to redeem the gift credit;
    monitoring, at a second time which is later than the first time, in a continuous manner, and according to the policy, transactions using the recipient payment account to identify the at least two transactions; and
    upon identifying the at least two transactions being completed using the recipient payment account, performing in an automated manner, via a network-based service provider, a withdrawal of at least a portion of the gift credit from the giver payment account and a transfer the portion of the gift credit to the recipient payment account.

2. The method of claim 1, wherein the policy further comprises an associated time frame for the at least two transactions.

3. The method of claim 2, wherein transactions using the recipient payment account are monitored according to the associated time frame.

4. The method of claim 2, wherein a first qualifying transaction according to the policy starts the associated time frame.

5. The method of claim 1, wherein the at least two separate qualifying transactions comprise a first transaction at a first merchant and a second transaction at a second merchant.

6. The method of claim 1, further comprising:
    upon identifying a first qualifying transaction of the at least two separate qualifying transactions, sending the notification to the device.

7. The method of claim 6, wherein the notification indicates requirements associated with the policy for a second qualifying transaction.

8. The method of claim 1, further comprising:
    upon identifying a first qualifying transaction of the at least two separate qualifying transactions, and upon a threshold elapsed time after the first qualifying transaction, sending a reminder to the device to complete a second qualifying transaction according to the policy.

9. The method of claim 8, wherein the reminder indicates at least one of a qualifying merchant, a qualifying product category, a remaining time to complete the second qualifying transaction, a maximum gift credit for the second qualifying transaction, and other terms of the policy.

10. The method of claim 1, further comprising:
    if a purchase price of the at least two separate qualifying transactions is less than a maximum gift credit, yielding an unused portion of the gift credit:
        applying the purchase price to the recipient payment account; and
        returning the unused portion of the gift credit to one of the recipient payment account and the giver payment account.

11. A system for giving a gift, the system further comprising:
    a processor; and
    a memory storing instructions for controlling the processor which, when executed by the processor, cause the processor to perform operations comprising:
        associating, at a first time, a policy with a giver having a giver payment account and a recipient having a recipient payment account, wherein the giver payment account is independent of the recipient payment account and each of the giver payment account and the recipient payment account existed prior to the first time and are independent of each other and have no control over each other, wherein the policy is at least in-part giver defined and requires at least two transactions prior to applying a gift credit, and wherein the gift credit is to be used at a later time after the first time and by the recipient purchasing an item using the recipient payment account;

configuring a notification that is linked to the policy, the notification comprising an interactive graphical user interface that notifies the recipient of at least one of the giver, the amount of money to pay for the gift credit, an existence of the gift credit, and a condition of the policy that will trigger application of the gift credit;

transferring the notification to a device associated with the recipient;

receiving, via the interactive graphical user interface presented on the device, recipient input in order to redeem the gift credit;

monitoring, in a continuous manner, at a second time which is later than the first time and according to the policy, transactions using the recipient payment account to identify at least two transactions; and upon identifying the at least two transactions being completed using the recipient payment account, performing in an automated manner, via a network-based service provider a withdrawal of at least a portion of the gift credit from the giver payment account and a transfer the portion of the gift credit to the recipient payment account.

12. The system of claim 11, wherein the policy further comprises an associated time frame for the at least two transactions.

13. The system of claim 12, wherein transactions using the recipient payment account are monitored according to the associated time frame.

14. The system of claim 12, wherein a first qualifying transaction according to the policy starts the associated time frame.

15. A non-transitory computer-readable storage medium storing instructions which, when executed by a computing device, cause the computing device to perform steps comprising:

associating, at a first time, a policy with a giver having a giver payment account and a recipient having a recipient payment account, wherein the giver payment account is independent of the recipient payment account and each of the giver payment account and the recipient payment account existed prior to the first time and are independent of each other and have no control over each other, wherein the policy is at least in part giver defined and requires at least two transactions prior to applying a gift credit, and wherein the gift credit is to be used at a later time after the first time and by the recipient purchasing an item using the recipient payment account;

configuring a notification that is linked to the policy, the notification comprising an interactive graphical user interface that notifies the recipient of at least one of the giver, the amount of money to pay for the gift credit, an existence of the gift credit, and a condition of the policy that will trigger application of the gift credit;

transferring the notification to a device associated with the recipient;

receiving, via the interactive graphical user interface presented on the device, recipient input in order to redeem the gift credit;

monitoring in a continuous manner, at a second time which is later than the first time and according to the policy, transactions using the recipient payment account to identify the at least two transactions; and upon identifying the at least two transactions being completed using the recipient payment account, performing in an automated manner, via a network-based service provider, a withdrawal of at least a portion of the gift credit from the giver payment account and a transfer the portion of the gift credit to the recipient payment account.

16. The non-transitory computer-readable storage medium of claim 15, wherein the at least two separate qualifying transactions comprise a first transaction at a first merchant and a second transaction at a second merchant.

17. The non-transitory computer-readable storage medium of claim 15, wherein the at least two separate qualifying transactions comprise a first transaction of a first transaction category and a second transaction of a second transaction category.

18. The non-transitory computer-readable storage medium of claim 15, wherein the gift credit is associated with a maximum gift credit.

19. The non-transitory computer-readable storage medium of claim 18, wherein the gift credit is applied to the recipient payment account up to the maximum gift credit.

20. The non-transitory computer-readable storage medium of claim 18, wherein applying the gift credit to the recipient payment account is based on a purchase price associated with the at least two qualifying transactions, the instructions further causing the computing device to perform steps comprising:

if the purchase price is less than the maximum gift credit yielding an unused portion of the gift credit, returning the unused portion of the gift credit to one of the recipient payment account and the giver payment account.

* * * * *